United States Patent
Mercier et al.

(10) Patent No.: US 10,855,754 B1
(45) Date of Patent: Dec. 1, 2020

(54) ISOLATED READ CHANNEL CATEGORIES AT STREAMING DATA SERVICE

(71) Applicant: Amazon Technologies, Inc., Seattle, WA (US)

(72) Inventors: Benjamin Warren Mercier, Seattle, WA (US); Sayantan Chakravorty, Sammamish, WA (US); Yasemin Avcular, Seattle, WA (US); Charlie Paucard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/143,340

(22) Filed: Sep. 26, 2018

Related U.S. Application Data

(60) Provisional application No. 62/698,815, filed on Jul. 16, 2018.

(51) Int. Cl.
*G06F 15/173* (2006.01)
*H04L 29/08* (2006.01)
*G06F 16/28* (2019.01)

(52) U.S. Cl.
CPC ........ *H04L 67/1029* (2013.01); *G06F 16/285* (2019.01)

(58) Field of Classification Search
None
See application file for complete search history.

(56) References Cited

U.S. PATENT DOCUMENTS

| | | | |
|---|---|---|---|
| 5,692,177 A | 11/1997 | Miller | |
| 5,813,009 A | 9/1998 | Johnson et al. | |
| 6,272,598 B1 | 8/2001 | Arlitt et al. | |
| 7,386,586 B1 | 6/2008 | Headley et al. | |
| 7,496,637 B2 | 2/2009 | Han et al. | |
| 7,716,186 B2 | 5/2010 | Cannon et al. | |
| 8,095,745 B1 | 1/2012 | Schmidt et al. | |
| 8,161,255 B2 | 4/2012 | Anglin et al. | |
| 8,200,775 B2 | 6/2012 | Moore | |

(Continued)

FOREIGN PATENT DOCUMENTS

| | | |
|---|---|---|
| JP | 2002010234 | 1/2002 |
| JP | 2005250839 | 9/2005 |

(Continued)

OTHER PUBLICATIONS

U.S. Appl. No. 61/738,967, filed Dec. 18, 2012, Kathryn Marie Shih et al.

(Continued)

*Primary Examiner* — Brian Whipple
*Assistant Examiner* — Anthony T Rotolo
(74) *Attorney, Agent, or Firm* — Robert C. Kowert; Kowert, Hood, Munyon, Rankin & Goetzel, P.C.

(57) ABSTRACT

In response to a first programmatic request, metadata indicating that a first isolated read channel of a real-time category has been associated with a first target stream is stored at a stream management service. In response to another request, metadata indicating that a second isolated read channel of a non-real-time category has been associated with a second target stream is stored. In response to a read request indicating the first channel or the second channel, one or more data records of the corresponding target streams are provided.

20 Claims, 34 Drawing Sheets

(56) References Cited

U.S. PATENT DOCUMENTS

| | | |
|---|---|---|
| 8,255,730 B2 | 8/2012 | Tatsumi |
| 8,255,739 B1 | 8/2012 | Chatterjee et al. |
| 8,359,596 B2 | 1/2013 | Kobayashi et al. |
| 8,386,631 B2 | 2/2013 | Nilsson et al. |
| 8,386,771 B2 | 2/2013 | Baker et al. |
| 8,463,633 B2 | 6/2013 | Jung et al. |
| 8,488,661 B2 | 7/2013 | Menon et al. |
| 8,533,478 B2 | 9/2013 | Aguilera et al. |
| 8,543,746 B2 | 9/2013 | Roever |
| 8,572,091 B1 | 10/2013 | Sivasubramanian et al. |
| 8,712,963 B1 | 4/2014 | Douglis et al. |
| 8,812,752 B1 | 8/2014 | Shih et al. |
| 9,237,188 B1 | 1/2016 | Gabrielson et al. |
| 9,276,959 B2 | 3/2016 | Theimer et al. |
| 9,413,854 B1 | 8/2016 | Bellingan |
| 9,471,585 B1 | 10/2016 | Theimer |
| 9,483,785 B1 | 11/2016 | Corley et al. |
| 9,588,822 B1 | 3/2017 | Shih et al. |
| 9,639,589 B1 | 5/2017 | Theimer et al. |
| 9,720,980 B2 | 8/2017 | Thomas et al. |
| 9,720,989 B2 | 8/2017 | Theimer et al. |
| 9,794,135 B2 | 10/2017 | Theimer et al. |
| 9,858,322 B2 | 1/2018 | Theimer et al. |
| 2005/0015625 A1 | 1/2005 | Inoue et al. |
| 2005/0165972 A1 | 7/2005 | Miyata et al. |
| 2006/0230021 A1 | 10/2006 | Diab et al. |
| 2006/0259462 A1 | 11/2006 | Timmons |
| 2006/0265518 A1 | 11/2006 | Owens et al. |
| 2007/0011665 A1 | 1/2007 | Gandhi et al. |
| 2007/0022174 A1 | 1/2007 | Issa |
| 2007/0027937 A1 | 2/2007 | McGrattan et al. |
| 2007/0094156 A1 | 4/2007 | Isaacs |
| 2007/0220016 A1 | 9/2007 | Estrada et al. |
| 2007/0250835 A1 | 10/2007 | Kobayashi et al. |
| 2008/0168503 A1 | 7/2008 | Sparrell |
| 2009/0125362 A1 | 5/2009 | Reid et al. |
| 2009/0238262 A1 | 9/2009 | Miceli |
| 2010/0106934 A1 | 4/2010 | Calder et al. |
| 2010/0257140 A1 | 10/2010 | Davis et al. |
| 2010/0274762 A1 | 10/2010 | Murphy et al. |
| 2011/0141882 A1 | 6/2011 | Rieschl et al. |
| 2011/0161291 A1 | 6/2011 | Taleck et al. |
| 2012/0066337 A1 | 3/2012 | Wu et al. |
| 2012/0166401 A1 | 6/2012 | Li et al. |
| 2012/0209817 A1 | 8/2012 | Golab et al. |
| 2012/0250682 A1 | 10/2012 | Vincent et al. |
| 2012/0265890 A1 | 10/2012 | Carlson et al. |
| 2012/0297249 A1 | 11/2012 | Yang et al. |
| 2012/0303999 A1 | 11/2012 | Calder et al. |
| 2012/0317274 A1 | 12/2012 | Richter et al. |
| 2013/0073724 A1 | 3/2013 | Parashar et al. |
| 2013/0124483 A1 | 5/2013 | Furuhashi et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2015/0049163 A1 | 2/2015 | Smurro |
| 2015/0125042 A1 | 5/2015 | Haden et al. |
| 2015/0134626 A1 | 5/2015 | Theimer et al. |
| 2015/0134795 A1 | 5/2015 | Theimer et al. |
| 2015/0134797 A1 | 5/2015 | Theimer et al. |
| 2016/0352796 A1* | 12/2016 | Thippesh ............... H04L 65/605 |
| 2018/0131593 A1* | 5/2018 | Jain ........................ H04L 12/66 |
| 2019/0354412 A1* | 11/2019 | Bivens ................ G06F 11/3024 |

FOREIGN PATENT DOCUMENTS

| | | |
|---|---|---|
| JP | 2010146067 | 7/2010 |
| JP | 2012-80417 | 4/2012 |
| JP | 2013069205 | 4/2013 |
| WO | 2012168365 | 12/2012 |

OTHER PUBLICATIONS

Alejandro Abdelnur, "Oozie Specification, a Hadoop Workflow System," Oct. 8, 2010, retrieved from http://rvs.github.com/oozie/releases/2.2.1/ WorkftowFunctionaiSpec.html on Feb. 11 , 2013. pp. 1-37.

Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.

"Oozie—Design," retrieved from http://rvs.github.com/oozie/design.html on Feb. 11, 2013. pp. 1-2.

"Quartz Scheduler 2.1.x Documentation," retrieved from http://quartz-scheduler.org/files/documentation/Quartz-2.1.x-Documentation.pdfon Feb. 11, 2013. pp. 1-140.

U.S. Appl. No. 13/465,978, filed May 7, 2012, Jonathan B. Corley et al.

U.S. Appl. No. 14/136,624, filed Dec. 20, 2013, Marvin Michael Theimer.

Pierre Dorion, "IBM Tivoli Storage Mangers backup tips", Apr. 2009, http://searchdatabackup.techtarget.com/tip/IBM-Tivoli-Storage-Manager-backup-software-tips.

U.S. Appl. No. 14/570,937, filed Dec. 15, 2014, Ian Matthew Gary Meyers.

Michael Meisinger, "CIAD DM OV Ingestion", Oct. 25, 2012, Retrieved from URL: https://confluence.oceanobservatories.org/display/syseng/CIAD+DM+OV+Ingestion, pp. 1-4.

Extended European Search Report from PCT/US2014065052, dated Mar. 27, 2017, Amazon Technologies, Inc., pp. 1-8.

Apache Kafka, "A High-Throughput Distributed Messaging System", pp. 1-42, Oct. 8, 2013.

Amazon Web Services, "Amazon Simple Queue Service (Amazon SQS)", pp. 1-5, Oct. 8, 2013.

Apache Software Foundation, "Hadoop Streaming", pp. 7-17, 2008.

SIGMOD Record, "Parallel Data Processing with MapReduce: A Survey", Kyong-Ha Lee, et al., pp. 11-20, Dec. 2011.

Splunk Inc., "Splunk for Application Management", pp. 1-2, 2012.

GitHub, "Rationale", pp. 1-2, Oct. 8, 2011.

GitHub, "Tutorial", pp. 1-8, Oct. 8, 2013.

U.S. Appl. No. 14/136,645, filed Dec. 20, 2013, Marvin Michael Theimer.

Kitagami, et al., "M2M Data Analysis Service System based on Open Source Software Environment," The Institute of Electronics, Information and Communication Engineers, 2012, pp. 33-38 plus partial English translation.

Robert Chansler, et al., "The Architecture of Open Source Applications: The Hadoop Distributed File System", Retrieved from URL: https://web.archive.org/web/20131110025205/http://www.aosabook.org/en/hdfs.html on Jul. 18, 2017, pp. 1-12.

Tom White, "Cloudera Engineering Blog: The Small Files Problem", Retrieve from URL: http://blog.cloudera.com/blog/2009/02/the-small-files-problem/ on Jul. 18, 2017, pp. 1-17.

Ashish Thusoo, et al., "Hive—A Warehousing Solution Over a Map-Reduce Framework", ACM, VLDB '09, Aug. 24-28, 2009, pp. 1-4.

Wilhelm Kleiminger, "Stream Processing in the Cloud", Imperial College of Science, Technology and Medicine Department of Computing, Jun. 2010, pp. 1-91.

"Amazon Kinesis Streams—Developer Guide", Amazon Web Services, Updated Apr. 19, 2016, pp. 1-136.

U.S. Appl. No. 15/444,131, filed Feb. 27, 2017, Sayantan Chakravorty, et al.

\* cited by examiner

Factors used to define isolated read channel (IRC) categories 1510

Propagation delay requirements 1511 (real-time applications may need to access new stream DRs as soon as feasible, e.g., with max delay = T ms, while non-real-time applications may be able to accommodate larger propagation delays)

Storage device type or repository type 1515 (e.g., volatile memory only, primary persistent repository acceptable, secondary/primary persistent repository acceptable,...)

Virtualization type 1517 (e.g., virtual vs. physical, specific-VM-type, ... )

Tenancy type 1519 (e.g., multi-tenant vs. single-tenant)

Special purpose 1521 (e.g., specifically for fast catch-up)

Client-customized IRC 1523 (e.g., with performance and functional properties specified by SMS client, expected to be re-used by client)

ISOLATED READ CHANNEL CATEGORIES AT STREAMING DATA SERVICE

This application claims benefit of priority to U.S. Provisional Application No. 62/698,815 filed Jul. 16, 2018, titled "Isolated Read Channel Categories At Streaming Data Service," which is hereby incorporated by reference in its entirety.

BACKGROUND

As the costs of data storage have declined over the years, and as the ability to interconnect various elements of the computing infrastructure has improved, more and more data pertaining to a wide variety of applications can potentially be collected and analyzed. For example, monitoring tools instantiated at various resources of a data center may generate information that can be used to predict potential problem situations and take proactive actions. Similarly, data collected from sensors embedded at various locations within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. In addition to computing platforms, some large organizations also provide various types of storage services built using virtualization technologies. Using such storage services, large amounts of data (including streaming data records) can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources. Different types of stream analysis operations may have very different needs regarding how quickly streaming data records have to be processed—some applications may need near instantaneous analysis, while for other applications it may be acceptable to examine the collected data after some delay. The failures that naturally tend to occur with increasing frequency as distributed systems grow in size, such as the occasional loss of connectivity and/or hardware failure, may also have to be addressed effectively to prevent costly disruptions of stream data collection, storage or analysis.

BRIEF DESCRIPTION OF DRAWINGS

FIG. 15 illustrates example factors that may be used to define categories of isolated read channels that may be configured at a stream management service, according to at least some embodiments.

Figure 1:
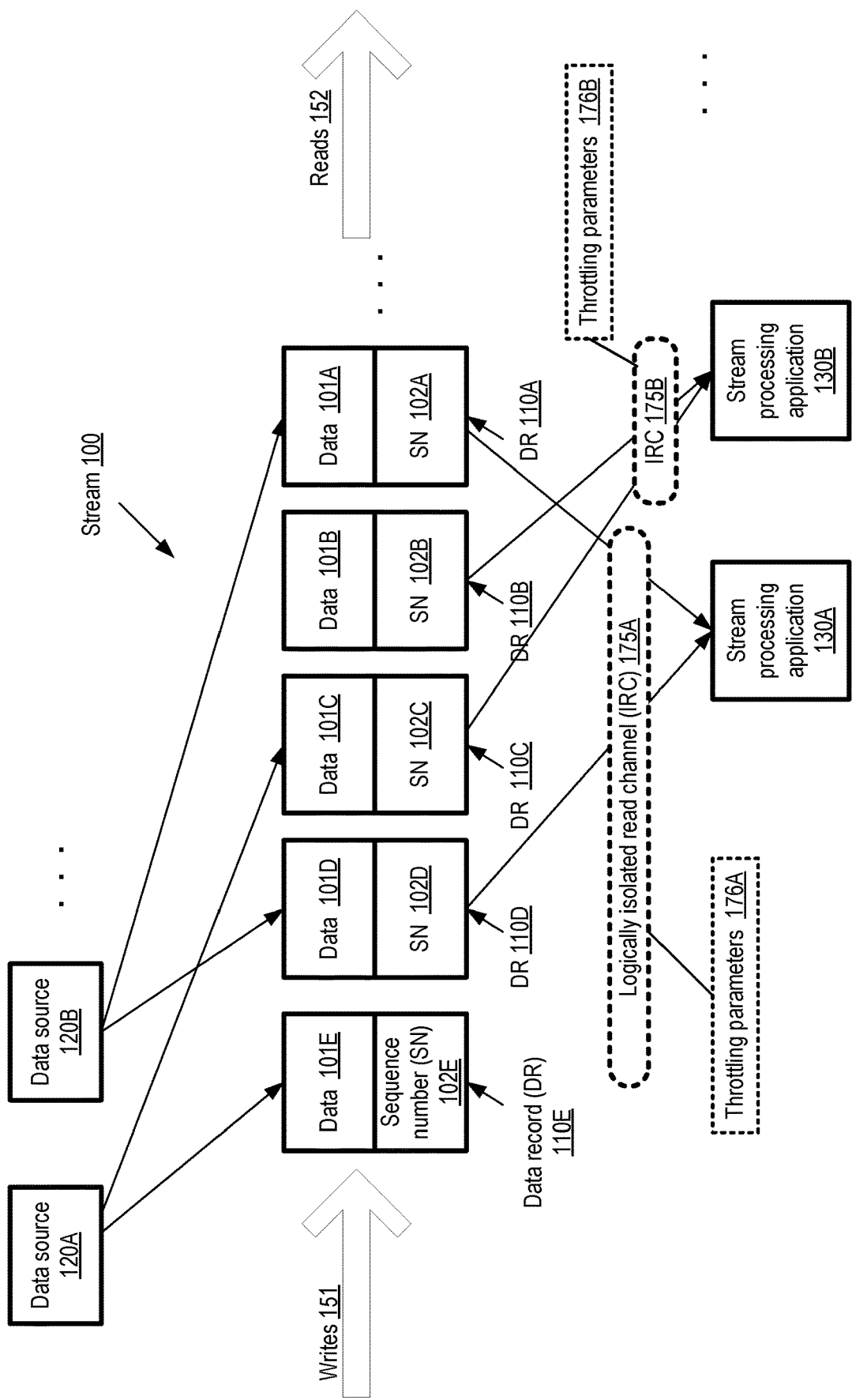
FIG. 1 provides a simplified overview of data stream concepts, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting customizable read scalability and read isolation at a network-accessible data stream management service are described. The term "data stream", as used in various embodiments, may refer to a sequence of data records that may be generated by one or more data sources and accessed by one or more data destinations, where each data record is assumed to be an immutable sequence of bytes. A data stream management service (SMS) may provide programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. Some types of stream operations (such as stream creation or deletion, registration or deregistration of isolated read channels, or dynamic repartitioning operations) that involve interactions with SMS administrative or control components may be referred to as "control-plane" operations in various embodiments, while operations such as data record submissions, storage and retrievals that typically (e.g., under normal operating conditions) do not require interactions with control components may be referred to as "data-plane" operations. Dynamically provisioned sets of compute, storage and networking resources may be used to implement the service in some such embodiments, based for example on various partitioning policies that allow the stream management workload to be distributed in a scalable fashion among numerous service components, as described below in further detail. Data streams may be referred to simply as streams in much of the remainder of this description, and a data stream management service may be referred to as a stream management service.

In various embodiments, stream partitioning policies and associated mappings may be implemented at an SMS, e.g., to distribute subsets of the data records of a given data stream between different sets of computing resources using one or more partitioning keys per data record. In some embodiments, for example, a respective dynamically configurable chain of storage nodes may be used to store copies of contents of a given partition. More than one stream processing application may be permitted to read from a given partition of a given stream in various embodiments, and such applications may have differing needs regarding the rates at which they consume the data records of the partition. Some applications may, for example, be designed to work very quickly on the most recently-written data records—e.g., they may have to respond to a write to the partition in real time, such as within a few milliseconds. Other applications may be designed to work with a greater acceptable delay between the time at which a given data record is written, and the time at which it is analyzed at the application. In order to help ensure that such diverse needs of different stream reading and processing applications can be met, while reducing the probability that any given application interferes with the reads of other applications, in some embodiments respective logically isolated read channels (IRCs) may be configured for individual applications. For example, in one embodiment, for a given stream whose data records are to be read by five different applications, five IRCs may be set up, each with its respective read performance limits which are enforced independently of each other.

In various embodiments, the SMS may attempt to ensure, using a variety of techniques such as proactive migration or partition storage reconfiguration, that sufficient resources are dedicated to a given stream or partition to allow the read requirements of all the IRCs associated with the stream or partition to be satisfied. A variety of control plane and data plane programmatic interfaces may be implemented by the SMS in different embodiments to enable clients to register or create IRCs, subscribe to a given IRC to perform reads using a push mechanism (in which the stream processing application is automatically provided with data records that are written to a partition, without for example having to poll for new records), and so on. In at least some embodiments, multiple categories of IRCs may be supported—e.g., a respective category for processing applications with real-time requirements and non-real-time requirements may be implemented by an SMS. According to at least one embodiment, techniques designed to assist stream processing applications that happen to be lagging behind the writes to a particular partition or stream to catch up with the writes may be implemented, e.g., using multiple tiers of storage device types and/or special-purpose IRCs. Stream processing applications may be referred to as stream reading applications in some embodiments. In some embodiments, persistent network connections may be used to transmit stream data records to processing applications; in some cases, a given persistent connection may be used to transfer records of more than one partition, or to more than one application. Some workload management decisions at components of the SMS, such as decisions as to whether to accept or reject new subscriptions or other read requests, may be made based on metrics aggregated at the persistent connection level in some embodiments.

As one skilled in the art will appreciate in light of this disclosure, certain embodiments may be capable of achieving various advantages, including some or all of the following: (a) enabling a wide variety of applications which read streaming data records to meet their respective performance and functional requirements, including propagation delay requirements or objectives, without for example interfering with the resources used for other applications, thereby reducing overheads and/or delays which may result if sufficient resources are not set aside in advance, (b) reducing the CPU and/or networking resources needed (e.g., for connection establishment) for transferring a given amount of stream data to applications, (c) enhancing the user experience of clients and operators of a stream management service, e.g., by providing metrics and/or log records at a granularity (such as channel level granularity) that enables debugging and analysis to be performed more easily, and/or (d) providing automated assistance to stream processing applications that have begun to lag behind the writes being inserted into the stream, thereby preventing the applications from entering states in which they fall so far behind the stream writers that they cannot implement their intended functionality.

According to some embodiments, a system may comprise one or more computing devices of a data streams management service (SMS). The computing devices may include instructions that upon execution on a processor cause the computing devices to determine, based at least in part on an estimate of a number of isolated read channels (IRCs) expected to be programmatically associated with a data stream, a storage configuration comprising one or more storage nodes to be used for the stream. For example, an estimate of the average or maximum number of read operations per second to be performed using a given IRC, and/or an average or maximum number of megabytes of stream data expected to be read per second per given IRC, may be translated into a requirement for storing a particular number of replicas of one or more partitions of the stream using a selected type of storage device technology, and the replica count may in turn be translated into some number of storage nodes in one embodiment. At least an initial portion of the storage configuration may be allocated for the stream or its partitions, e.g., using resources at one or more repositories of the SMS in various embodiments.

A respective set of metadata corresponding to one or more IRCs associated with the stream may be stored, e.g., at a control plane metadata repository of the SMS in various embodiments in response to respective programmatic requests to register or establish the IRCs. Individual ones of the IRCs may have associated read performance limits (expressed for example in terms of read operations per second, and/or bandwidth units such as megabytes/second), and in some cases the specific performance limits may be stored as part of the metadata. Read operations directed to one or more partitions of the stream may be initiated using the IRCs that have been associated—e.g., using application programming interface (API) calls to which an IRC identifier is provided as a parameter in various embodiments. A number of different types of programmatic read interfaces such as APIs may be supported in different embodiments, including for example push-mode or subscription interfaces (using which data records written to the partition are automatically propagated to an application or destination), pull-mode interfaces which may involve polling the SMS to obtain data records, and so on. Respective sets of read operation metrics (e.g., read operation rates per second, read bandwidth etc.) may be captured for each IRC separately in some embodiments, e.g., using a variety of monitoring tools at various levels of the hardware, software and/or networking stack being used. Using the captured metrics and the per-IRC performance limits, one or more throttling operations may potentially be performed on a per-IRC basis, e.g., independently of the throttling decisions made for other IRCs or the same partition (or other IRCs of different partitions/streams) in various embodiments. Throttling may, for example, refer to delaying, rejecting or canceling one or more I/O operations, or a set of I/O operations during a selected time interval, at any of various granularities in some embodiments. For example, based on determining that the difference between the performance limit designated for the IRC and the observed metrics is below a threshold, one or more reads of data records via a first IRC may be delayed or rejected in some embodiments, where the decision to throttle is not dependent on metrics of read operations using any other IRC. The IRC read performance limit may be referred to as a throttling triggering limit (or simply as the throttling limit) in some embodiments. The terminology "reads via an IRC" may be used in some embodiments to refer to read operations in which stream data records are transferred in response to a request (e.g., a subscription/push-mode request or a polling/pull-mode read request) which indicates the IRC as a parameter.

Similarly, a decision to provide the contents of one or more data records via a different IRC may be made in such embodiments based on determining that the captured read metrics associated with that different IRC are sufficiently below the maximum set for the IRC, without taking into consideration any metrics or throttling decisions made with respect to the first IRC. In effect, individual ones of the IRCs may be assigned a logical bucket of read performance capacity, such that reads may be implemented as long as the bucket has not been exhausted, independent of any other bucket in such embodiments. Such buckets may be referred to as "throttling" buckets in some embodiments. It may even be the case in one embodiment that multiple IRCs (e.g., IRC1 and IRC2) are configured for a single application (App1) to read from the same partition (partition p) of the same data stream; even in such a scenario, the throttling (if any) of reads may be performed independently for IRC1 and IRC2, so App1 may be able to receive data records via IRC1 during some time interval in which reads via IRC2 are prevented or throttled.

In at least one embodiment, the metadata indicative of a given IRC may be stored in response to a respective programmatic request (such as a registration or association request indicating the target stream and/or one or more partitions). Respective metrics (e.g., number of data records read per second, number of kilobytes read per second, lag between the latest writes and the latest reads) may be collected and/or presented to SMS clients and/or other interested authorized parties via programmatic interfaces at the per-IRC level in some embodiments. In at least one embodiment, log records generated for the reads may also include IRC identifiers, so that debugging and/or analysis on the read operations and associated applications may be performed on a per-IRC level if desired.

In at least some embodiments, not all the applications that read data from a given partition or stream may need to access all the data of that partition or stream; accordingly, in some embodiments, when defining or requesting an IRC, a filter predicate based on some attributes of the data records (or attributes of the contents of the data records) may be indicated and such predicates may be stored along with the IRC metadata. In one such embodiment, tags, labels or schemas that can be used to specify such predicates may be included in the write requests directed to the stream—thus, individual ones of the data records may have tags or labels that can be used to filter the data records to be provided to a stream processing application if desired, while record schemas may be used to filter contents within individual records for stream processing applications if desired. In some embodiments, such predicates and/or schemas may be defined at the per-partition level.

In at least one embodiment, a client may specify IRC read performance requirements or limits of various kinds, e.g., when programmatically requesting the creation or association of an IRC with a stream or a set of partitions. In some embodiments, reconfigurations of the storage set aside for a given stream or a set of stream partitions (e.g., lengthening a replication chain, copying/moving a portion or all of the data records of one or more partitions to faster storage devices, etc.) may be triggered when the number of IRCs associated with that stream or set of partitions reaches a threshold. In at least one embodiment, based on one or more factors including for example resource utilization or capacity levels at the storage devices being used for reads and/or the capacity of stream processing applications to process newly read records, the throttling limits for one or more IRCs may be relaxed at least temporarily by the SMS. For example, if the utilized fraction of the read performance capacity of storage servers designated for a partition is below a threshold level, and if an application is able to keep up with records of the partition at a higher rate than the maximum performance limit of the IRC being used by the application, the rate of reads may be increased beyond the throttling-triggering limit temporarily in one embodiment. The determination of whether a given processing application is able to keep up may be based, for example, on determining the number of written data records of the partition that have not yet been read at one or more points in time, and/or based on comparing time differences or timestamps (e.g., of the most-recently-read record and the most-recently-written record of the partition). In some embodiments, a client of the SMS may be permitted to programmatically modify the performance limits associated with one or more of the IRCs established on their behalf; such changes may in some cases lead to reconfigurations similar to those indicated above. In at least one embodiment, an SMS client may programmatically indicate one or more types of storage device (e.g., rotating disks, solid state drives, or volatile memory) to be used for their stream partitions, or for the partitions being accessed via respective IRCs. Reads may be implemented using a variety of programmatic interfaces in different embodiments—e.g., APIs that read one data record at a time, a set of data records within a timestamp range or a sequence number range, or a notification-based mechanism may be used in various embodiments. In some embodiments, persistent network connections may be used to read a plurality of data records via an IRC. In other embodiments, respective connections may be used for individual per-record or per-record-group read API calls.

A number of techniques may be employed to register new IRCs in various embodiments, e.g., without disrupting the level of service and responsiveness being provided for existing IRCs and stream processing applications. In some embodiments, a system may comprise one or more computing devices of a data streams management service (SMS). The computing devices may include instructions that upon execution on a processor cause the computing devices to store a set of metadata indicating that a first data stream (which may comprise at least a first partition) has been created in response to a first programmatic request from a client. In response to a channel registration request received via a programmatic interface, where the channel registration request indicates the first stream as the target from which data records are to be read, the computing devices may verify that (a) a channel count limit associated with the targeted stream has not been reached and/or (b) a storage configuration of the targeted stream meets a first read performance capacity criterion in various embodiments. If the verification succeeds, a second set of metadata indicating that a new IRC has been associated with the target stream may be stored. The new IRC may have a collection of one or more read performance limit settings (e.g., either selected by the SMS, or selected by the client requesting the IRC) in various embodiments. In response to a read request directed to the stream (e.g., to a particular partition of the stream), where the read request includes or indicates an identifier of the new IRC, the computing devices may verify, using the second set of metadata, that the new IRC has been associated with the first stream before causing one or more data records of the stream to be transmitted to a destination in at least some embodiments. In at least one embodiment, a channel registration request may indicate one or more performance objectives or limits for the IRC. In some embodiments, an IRC may be registered or associated with a stream, and then reads may later be directed to or requested from a specific partition of the stream using requests (e.g., subscription requests) that indicate the IRC as a parameter. In such embodiments, the IRC may potentially be used to read data from one partition for some time, and then from a different partition if desired. In other embodiments, an IRC may be registered or associated with one or more partitions rather than with a stream, and may remain bound to the partition(s).

In some embodiments, a number of different application programming interfaces related to administering IRCs may be supported by an SMS. For example, one such API may be used to list the set of IRCs that have been registered or associated with one or more streams or one or more partitions. Another API may be used, for example, to de-register or disassociate a previously established IRC, while yet another API may be used to obtain a description of various properties including a current status of an IRC. In one embodiment, one or more IRCs may be automatically registered or associated with a stream, or with one or more partitions of a stream, at the time that the stream is created— e.g., a separate registration step may not be required for at least a default number of IRCs.

In at least one embodiment, a registration request for an IRC may trigger a proactive storage reconfiguration of at least a portion of the stream or partition(s) with which the IRC is to be associated—e.g., while the current configuration may be sufficient for the newly-associated IRC to be used for reads up to the IRC's performance limits, the SMS may start an asynchronous or background reconfiguration operation (e.g., using additional storage nodes, faster storage devices etc.) such that future IRC associations can be handled while still being able to meet the performance limits/obligations associated with the existing IRCs. In some embodiments, a client may be able to update one or more properties (e.g., an IRC category or a performance limit, or a targeted partition) of a currently-associated IRC via a programmatic interface, and such changes may potentially trigger partition storage reconfigurations. According to one embodiment, an SMS client may programmatically provide information (e.g., as a value of "share-unused-capacity-with" parameter of an IRC registration request) about one or more other IRCs, clients or users with whom the read performance capacity designated for a given IRC may be shared (e.g., during periods when the read performance capacity used is lower than the maximum setting). According to another embodiment, an SMS client may programmatically provide information (e.g., as a value of a "burst-Periods" parameter of an IRC registration request) indicating future time periods in which higher-than-average rates of reads should be anticipated. Such information may, for example, be useful to the SMS control plane to potentially allocate additional resources and relax throttling conditions during the specified time periods. In one embodiment more general schedule-based workload information may be provide programmatically by an SMS client, indicating for example periods when read workloads are expected to be lower than average, specifying expected maximum read workloads as a function of the time of the day or the day of the week, and so on, which may also be helpful in making temporary throttling adjustment decisions, resource reconfiguration decisions etc. In at least some embodiments in which filtered reads of the kind mentioned above are supported, an IRC registration request may include a filter predicate to be used to reduce the amount of data that is to be provided to a stream processing application—e.g., a predicate that can be used to filter out whole data records which do not meet some criterion, or a predicate that can be used to filter out portions of contents of some or all data records may be specified.

In some embodiments, several different categories of isolated read channels (IRCs) may be supported at an SMS, with the categories differing from one another along various dimensions such as read performance, storage device types to be used, cost to the clients on whose behalf the IRCs are set up, and so on. In one such embodiment, a system may comprise one or more computing devices of a data streams management service (SMS). The computing devices may include instructions that upon execution on a processor cause the computing devices to provide, via a programmatic interface, an indication of a plurality of categories of IRCs configurable for one or more data streams, including at least a first real-time category and a first non-real-time category. Records read via an IRC of the real-time category, which may also be referred to as a short-propagation-delay category, may generally have to be read within as short a time of their being written into the stream as feasible, e.g., with a maximum delay set to some configurable number of milliseconds in one embodiment. Stream processing applications that use the non-real-time IRC category may typically be able to tolerate longer delays between writes and reads of the stream records in various embodiments.

A first channel establishment request may be received at the SMS via a programmatic interface, indicating (a) at least a first target data stream (e.g., an entire stream, or one or more partitions of the stream) and (b) the first real-time category. In response, the SMS computing devices may verify that a first storage configuration of the first target data stream meets a performance capability criterion corresponding to the first real-time category in some embodiments, and store metadata indicating that a first IRC of the first real-time category has been established and associated with the first target stream. Similarly, a second channel establishment request may be received via the same or a different programmatic interface, indicating (a) at least a second target stream (which may be the first stream with which the real-time IRC is associated, or a different stream) and (b) the first non-real-time category. In response to the second request, the SMS computing devices may verify that a second storage configuration of the second target stream meets a performance capability criterion corresponding to the first non-real-time category in some embodiments, and store metadata indicating that a second IRC of the first non-real-time category has been established and associated with the second target stream. After the IRCs of the respective categories have been set up, read requests directed via the respective IRCs (e.g., using programmatic requests which indicate the IRC as a parameter) may be satisfied in accordance with the respective performance settings of the IRCs, e.g., by providing/transmitting data records from the respective storage configurations to one or more destinations from the SMS in various embodiments.

In at least some embodiments, IRCs belonging to different categories may be associated with a given stream (or even a given partition), e.g., based on the specific needs of respective applications accessing data records of the stream. In some embodiments, depending on the category of the IRC that is to be established, background and/or foreground storage reconfiguration operations may be initiated by the SMS, proactively in anticipation of future IRC associations and/or to cater to the needs of the currently-requested IRCs. In some embodiments, IRC categories may differ from one another based on the type of storage devices to be used— e.g., some applications may be designed or intended to read data records only from main memory or volatile memory devices of the SMS, while others may read from persistent storage devices of various types. In one embodiment, some IRC categories may be set up specifically for filtered reads— e.g., for reading only data records that meet a specified criterion, or for reading portions of the contents of data records. In some embodiments, one or more categories of IRCs may be designed for special functions—e.g., to enable applications that are lagging behind the writers of a particular partition/stream to catch up, or at least accelerate the reads of already-written records using special optimization techniques. Such an IRC category may be labeled a "fast-catch-up" category in some embodiments. In at least one embodiment, an SMS client may submit a request to create a new IRC category, e.g., by providing a specific set of performance, functional and/or other requirements, and/or by providing an indication of an existing IRC whose properties (which may have been specified or modified by the client) can be used as a template for additional IRCs.

In one embodiment, a client may submit a set of desired or targeted properties (e.g., read performance properties) and a set of constraints (e.g., budget constraints), and the SMS may identify a supported IRC category that satisfies, or comes closest to satisfying, the combination of properties and constraints. The client may then establish one or more IRCs of that category for use by their applications. Clients may submit programmatic requests to change the category of an existing IRC in some embodiments—e.g., after a stream processing application has completed one phase of its operations which required very short propagation delays, a real-time IRC that was set up for that application may be modified to a non-real-time IRC. Such category changes may trigger reconfiguration operations in at least some embodiments at the SMS, e.g., involving changes to the storage nodes/devices being used for one or more partitions with which the modified IRCs are associated. In at least some embodiments, metrics collected at the SMS may be presented at the per-IRC-category granularity, e.g., in response to programmatic requests.

According to some embodiments, one or more optimization techniques to assist stream record processing applications that are lagging behind the writers of the stream may be implemented. In one such embodiment, a system may comprise one or more computing devices of a data streams management service (SMS). The computing devices may include instructions that upon execution on a processor cause the computing devices to assign one or more storage servers of a first stream records repository to store at least a first partition of a first stream. In response to determining that a first set of data records of the first stream or partition meet a first criterion (such as an aging criterion indicating how long ago the records were written into the stream), the first set may be written to (e.g., copied to, or moved to) a second stream records repository. In some embodiments, the relative arrangement of the records may differ on the storage devices used in the two repositories: e.g., individual data records of the first set may be interleaved with one or more data records of one or more other partitions at the first repository (based on the respective sequence of arrival or write times of the records of the different partitions stored on a given storage node or device), while a rearranged version of the first set, in which data records of a given partition are contiguous with one another, may be stored at the second repository. The first repository may be referred to as a primary repository in some embodiments, while the second repository may be referred to as a non-primary or secondary repository.

In some embodiments, the computing devices of the SMS may determine, e.g., based at least in part on examining one or more properties such as a read progress indicator of a read operation or subscription directed to the first stream, that the number of data records of the first stream that have not been consumed by a first read requester application meets a first triggering criterion for an optimized read lag reduction operation. In effect, the SMS may determine that the read requester application has been unable (at least for some recent time interval) to keep up with the rate at which writes are being submitted to the stream or partition being read, and that it may therefore be useful to provide a faster mechanism enabling the read requester to reduce its lag relative to the writes. The rearrangement of the records at the second repository may enable fast sequential reads of the portion of the first partition that has been copied to the second repository in at least some embodiments; accordingly, as part of the read lag reduction operation, at least some data records may be provided to the read requester application using the rearranged version in such embodiments. In some embodiments, the records may be read directly from the second repository; in other embodiments, the rearranged records may be read into an intermediary set of memory or persistent storage devices (e.g., at the first repository) before being transmitted to the requesting application.

In at least some embodiments, the second repository may comprise resources of an object storage service implementing a web services interface. In one embodiment, an SMS client on whose behalf a stream or partition has been established may provide an indicating of the criteria (e.g., the aging criteria) to be used to copy or move records from the first repository to the second repository, and/or the particular storage service to be used as the second repository. In one embodiment, a client may submit a programmatic request to transfer or copy the rearranged records back from the second repository to the first repository or some other destination. Note that at least in some embodiments, there may be an overlap among the set of data records that are stored at the first repository (and/or at main memories of one or more hosts of the SMS) and the second repository, at least at some points in time—that is, a given data record of a given partition may exist concurrently in the main memory of one or more hosts, persistent storage devices of the first repository, and persistent storage devices of the second repository. A given repository may in some embodiments comprise one or more of volatile and persistent storage devices. In at least one embodiment, a client of the SMS may provide an indication of how long data records of a stream or partition are to be retained at one or more of the repositories. In at least one embodiment, a special IRC category may be used to read the rearranged data to support optimized catch-up operations. In some embodiments, respective IRCs may be used to read from the first and second repositories. In one embodiment, a client may indicate a set of constraints (e.g., a budget) for a stream or partition, and the SMS may determine the appropriate criteria to be used to transfer data records from one repository to another to satisfy the constraints.

According to some embodiments, as indicated earlier, persistent network connections may be employed to obtain stream data records from an SMS at stream processing applications. In one such embodiment, a system may comprise one or more computing devices of an SMS. The computing devices may include instructions that upon execution on a processor cause the computing devices to determine that a subscription request to provide a plurality of data records to a first stream processing application using a "push" model (without polling the SMS using the equivalent of respective HTTP (HyperText Transfer Protocol) GET-like read requests) has been submitted. The subscription request may include several parameters, indicating for example credentials of the requesting application, one or more target partitions of a data stream from which data records are to be provided using the push model, an identifier of an isolated read channel with which the requested subscription is to be associated, position indicators (e.g., sequence numbers, timestamps etc.) within the partitions from which the transmission of the records is to be started, etc. In at least some embodiments, the subscription request may be transmitted using client-side components (e.g., a connection mapping manager, a client library, etc.) of the SMS that are configured or installed on the application execution platform from which the subscription request is submitted. In some such embodiments, a client-side component of the SMS may participate in the establishment of a persistent network connection (e.g., a Transmission Control Protocol or TCP connection) with an SMS front-end component (e.g., a retrieval subsystem node) for a given subscription request, or select an existing TCP connection (which may potentially also be used for other subscription requests and the corresponding data records flows) for the subscription request. In one embodiment, networking protocols other than those of the TCP/IP protocol family may be used.

Upon receiving the subscription request, a number of operations may be performed at the SMS to determine whether the request should be accepted—e.g., the credentials of the requester may be checked, the registration of the isolated read channel indicated in the request may be verified, the rate at which recent subscription requests have been directed to the target partitions may be checked to determine whether a threshold subscription request rate has been reached, etc. If a decision is made to accept the subscription request, in at least some embodiments, the SMS (e.g., a front-end component of the retrieval subsystem) may store metadata indicating the subscription (e.g., an identifier, an expiration time, a lease object, etc.) and begin transmitting or pushing data records of the target partition(s) to the requesting application, e.g., via the same persistent network connection (PNC) that was used for the subscription request. In one embodiment, a different persistent network connection may be used to push the data records than was used for the subscription request. In at least some embodiments, the transmission of the contents of one or more data records may cause respective events to be detected at the stream processing application, and event handler code at the processing application may initiate the analysis and/or processing tasks as the record transmissions are detected.

At the SMS, metrics pertaining to the rate (e.g., in aggregated bandwidth units such as MB/sec, data record units such as records per second etc.) at which data is being pushed per subscription and/or per PNC may be collected in various embodiments. If the computing devices of the SMS detect that a transfer throttling condition associated with a particular subscription (or with an IRC with which the particular subscription is associated) has been satisfied, a decision to pause the flow of data records may be taken. In some embodiments, throttling parameters may also or instead be applied with respect to individual PNCs. In a scenario in which a decision to throttle the data record flow of a subscription is made, in some embodiments a time interval after which transmission of additional data records is to be resumed may be determined. After the time interval has elapsed, additional data records of the partition(s) may be transmitted if available, e.g., using the same PNC as before the pause, causing new events to be detected at the application.

In at least some embodiments, a given subscription may have an associated expiration time (e.g., a configurable parameter of the SMS). Such expiration settings may, for example, be used to periodically re-check that the stream processing application is authorized to read the target partitions in some embodiments; for example, in some use cases authorization credentials to read stream records may be granted for relatively short periods to any given application to enhance the security of the stream data. If the credentials were not checked frequently, for example, the probability of unauthorized use of the credentials may increase (e.g., if a network intruder is somehow able to start reading data records of a given subscription without acquiring the credentials, the intruder could keep reading records indefinitely if credentials were not re-checked). When an expiration period has elapsed, the SMS may provide an indication of the expiration (e.g., an expiration message may be sent via the same PNC that was being used for the data records) to the stream processing application in some embodiments. An event indicating the expiration may be detected at the application in various embodiments. In at least some cases, there may be some outstanding data records of one or more target partitions that have not yet been transmitted to the stream processing application when the subscription expires. If desired, the application may submit a request (comprising the necessary authorization credentials) to obtain a new subscription to continue reading the records, or in effect renew/refresh the subscription in some embodiments. In some embodiments, the same PNC may be used for the new subscription request or renewal request; in other embodiments, a different PNC may be selected by the SMS client-side components. In some embodiments, when the SMS provides an indication that a particular subscription has expired or is being terminated, and some number of data records of a target partition of that subscription remain unread, an indication of a position at which reading of the data records may be resumed (e.g., a sequence number or timestamp of the next available data record that has not yet been pushed, or the last data record that was pushed) may be provided in the expiration indicator provided to the stream processing application whose subscription has expired or been terminated. Such an indicator may enable the application to resume reading at the appropriate position or offset within the target partition using the renewed subscription or a new subscription.

Using the approach outlined above, PNCs may in effect be multiplexed (e.g., in some cases in a multi-tenant mode) to support a desired number of subscriptions or push-mode flows of data records to stream processing applications in various embodiments. For example, data records corresponding to more than one subscription (e.g., subscriptions S1 and S2 to different partitions or the same target partition, on behalf of the same SMS client or different SMS clients) may be pushed or transmitted using a given PNC. In at least one embodiment, the maximum rate at which new subscription request can be directed may be limited by an additional throttling parameter enforced by the SMS—e.g., in one implementation, no more than N subscription requests per second from a given client, or directed to a given target partition or IRC, may be supported. Similarly, in at least one embodiment, the maximum number of subscriptions for which data records are being provided from a given target partition may be limited using another throttling parameter of the SMS. In at least one embodiment, a version of the HyperText Transfer Protocol (e.g., HTTP/2 or HTTP 2.0) may be employed for at least some of the communication between stream processing applications and the SMS.

In some embodiments in which persistent network connections (PNCs) are used to transmit data records to stream processing applications from an SMS, the rate at which data records are transmitted may vary substantially from one subscription to another, and hence from one (potentially multiplexed) PNC to another over time. The rates may vary for a number of reasons in different embodiments—e.g., because the rate at which data records are written to the SMS by various data sources may vary, because the rates at which stream processing applications process data records may vary, and so on. In order to cope with such fluctuations, a number of workload management techniques may be employed in different embodiments, e.g., at the front end platforms of the SMS retrieval subsystem to which persistent connections are established from the stream processing applications. An SMS may comprise a set of computing devices in various embodiments. The computing devices of the SMS may include instructions that upon execution on a processor cause the computing devices to establish (or participate in establishing), associated with individual ones of a plurality of platforms (e.g., front-end platforms of the SMS) at which stream data retrieval requests are handled or processed, a respective set of one or more persistent network connections (PNCs) over which contents of stream data records are to be provided to one or more stream processing applications. At least some of the PNCs may be used for push-mode subscriptions of the kind discussed above in various embodiments. A given front end platform may have several PNCs set up to communicate with, and push data to, some number of application platforms at which the stream processing applications run. In some embodiments, a load balancer (acting as an intermediary between the application platforms and the SMS) may be used to select, from a fleet of front-end SMS nodes, a particular front-end node to which a subscription request is to be submitted via a PNC. The intermediary load balancer may use any of a number of algorithms to select the target front-end node for a given subscription request in different embodiments, such as random selection, round-robin selection, hash-based selection (in which some attributes of a subscription request or requesting applications are used as input to a hash function, and the output of the hash function is used to identify a target front-end node), and/or an algorithm that takes the number of PNCs or subscriptions that are currently set up with different front-end nodes into account. In at least some embodiments, however, the intermediary load balancer may not necessarily be aware of the rates at which traffic is flowing on already-established PNCs, or for specific subscriptions. In different embodiments, intermediary load balancers may run at any of a variety of types of computing devices and/or network management devices.

A particular front end platform of the SMS may be selected to receive a new subscription request in some embodiments, e.g., based on a decision made at least in part by an intermediary load balancer. Despite the fact that the load balancer has selected the particular front end platform, however, the front end platform may nevertheless reject the subscription request, e.g., based on determining that a metric collected regarding the cumulative data transfer rates of the existing set of one or more PNCs of the front end platform exceed a threshold. An indication that the request has been rejected may be provided by the front end platform. In some embodiments, in which a particular PNC was used for the subscription request, that PNC (or one of the other PNCs) may be closed at the initiative of the front end platform upon detecting that the subscription request should be rejected. In some embodiments, despite the rejection of a new subscription request, the PNC that was used for the rejected request may be kept open, e.g., because it may be currently being used for other subscriptions or in anticipation of future re-use for other subscriptions. In at least one embodiment, one or more existing PNCs or subscriptions may be terminated by the front end platform on its own initiative based on local workload measurements, e.g., without being triggered by a new subscription request. In effect, the workload-based decisions made at the front end platform may act as another layer of load balancing, which takes measured per-PNC or per-subscription data transfers into account.

As discussed earlier, the total number and/or rate of subscription requests, or the intervals between successive subscription requests e.g., directed to a given partition or a given IRC, may also be used to throttle subscriptions in some embodiments. Protocols such as HTTP/2 may be employed in various embodiments over the PNCs as mentioned earlier. In various embodiments, throttling of reads at the per-IRC (isolated read channel) level may also or instead be implemented by the SMS. In at least some embodiments, metadata indicating the liveness of different subscriptions (and corresponding front end nodes) may be stored at the SMS—e.g., a given front end node may transmit a heartbeat message periodically to a control plane data store indicating that one or more data records associated with a given subscription have been transmitted since the last heartbeat. In one such embodiment, such heartbeats (or a lack of heartbeats over some duration) may be used to determine whether a given subscription should be retained or terminated. In one embodiment, a lease mechanism may be implemented for managing subscriptions—e.g., a lease object with an expiration period may be created at the time that a subscription associated with some set of requester credentials is accepted. In some scenarios, e.g., in embodiments in which the stream data is being processed in real time, the SMS may allow expedited lease transfers or "lease stealing"—e.g., if, before a lease L1 for a subscription has expired, a new lease request with the same credentials that were used to obtain L1 is received, L1 may be transferred to the new requester, without necessarily checking the status of the original requester of L1. Such an approach may be employed, for example, to enable read time stream processing application managers to react quickly to "stuck" or unresponsive application threads—e.g., instead of trying to resolve the problem that causes the thread to be stuck, a new application thread may be quickly enabled to start reading stream data records (using the newly-transferred lease) that were previously being read by the stuck thread.

In at least some embodiments, the stream management service may be implemented as a multi-tenant managed network-accessible service using virtualization techniques at a provider network or cloud computing environment. That is, various physical resources (such as computer servers or hosts, storage devices, networking devices and the like) may at least in some cases be shared among streams of different customers or clients in such embodiments, without necessarily making the customers aware of exactly how the resources are being shared, or even making a customer aware that a given resource is being shared at all. Control components of the managed multi-tenant SMS may dynamically add, remove, or reconfigure nodes or resources being used for a particular stream or partition based on various applicable policies, some of which may be client-selectable. In addition, the control components may also be responsible for transparently implementing various types of security protocols (e.g., to ensure that one client's stream application cannot access another client's data, even though at least some hardware or software may be shared by both clients), monitoring resource usage for billing, generating logging information that can be used for auditing or debugging, and so on. From the perspective of clients of the managed multi-tenant service, the control/administrative functionality implemented by the service may eliminate much of the complexity involved in supporting large-scale streaming applications. In some scenarios, customers of such multi-tenant services may be able to indicate that they do not wish to share resources for at least some types of stream-related operations, in which case some physical resources may be designated at least temporarily as being single-tenant for those types of operations (i.e., limited to operations performed on behalf of a single customer or client). For example, in one embodiment a client may indicate that a given isolated read channel (IRC) is to be implemented in a single-tenant mode, so a separate storage configuration whose nodes are not shared with streaming data of a different client may be used for the partition with which the single-tenant IRC is associated.

A number of different approaches may be taken to the implementation of SMS control-plane and data-plane operations in various embodiments. For example, with respect to control-plane operations, in some implementations a redundancy group of control servers or nodes may be set up. The redundancy group may include a plurality of control servers, of which one server is designated as a primary server responsible for responding to administrative requests regarding one or more streams or stream partitions, while another server may be designated to take over as the primary in the event of a triggering condition such as a failure at (or loss of connectivity to) the current primary. In another implementation, one or more tables created at a network-accessible database service may be used to store control-plane metadata (such as IRC associations and metrics, partition maps etc.) for various streams, and various ingestion, storage or retrieval nodes may be able to access the tables as needed to obtain the subsets of metadata required for data-plane operations.

According to some embodiments, an SMS may comprise a plurality of independently configurable subsystems, including a record ingestion subsystem primarily responsible for obtaining or collecting data records, a record storage subsystem primarily responsible for saving the data record contents in accordance with applicable persistence or durability policies, and a record retrieval subsystem primarily responsible for responding to read requests directed at the stored records (e.g., using isolated read channels or other shared, non-isolated channels). A control subsystem may also be implemented in some embodiments, comprising one or more administrative or control components responsible for configuring the remaining subsystems, e.g., by dynamically determining and/or initializing the required number of nodes for each of the ingestion, storage and retrieval subsystems at selected resources such as virtual or physical servers. Each of the ingestion, storage, retrieval and control subsystems may be implemented using a respective plurality of hardware and/or software components which may collectively be referred as "nodes" or "servers" of the subsystems in some embodiments. Individual resources of an SMS may thus be logically said to belong to at least one of four functional categories: ingestion, storage, retrieval or control. In some implementations, respective sets of control components may be established for each of the other subsystems, e.g., independent ingestion control subsystems, storage control subsystems and/or retrieval control subsystems may be implemented. Each such control subsystem may be responsible for identifying the resources to be used for the other nodes of the corresponding subsystem and/or for responding to administrative queries from clients or from other subsystems. In some implementations, pools of nodes capable of performing various types of SMS functions may be set up in advance, and selected members of those pools may be assigned to new streams as needed. In at least one embodiment, elements of one or more of the subsystems may be implemented using a common group of hardware and/or software elements at an execution platform or host—e.g., a given process or virtual machine may serve as part of the retrieval subsystem as well as the storage subsystem.

Stream partitioning policies and associated mappings may be implemented in at least some embodiments, e.g., to distribute subsets of the data records between different sets of ingestion, storage, retrieval and/or control nodes. Stream partitions, individual ones of which may comprise respective subsets of the data records of a stream, may be referred to as shards in some embodiments. Based on the partitioning policy selected for a particular data stream as well as on other factors such as expectations of record ingestion rates and/or retrieval rates, the number of isolated read channels expected to be used, and so on, a control component may determine how many nodes (e.g., processes or threads) should be established initially (i.e., at stream creation time) for ingestion, storage and retrieval, and how those nodes should be mapped to virtual and/or physical machines. Over time, the workload associated with a given stream may increase or decrease, which (among other triggering conditions, such as the registration of additional IRCs) may lead to repartitioning (or other types of reconfigurations, such as partition migration) of the stream. Such re-partitioning may involve changes to one or more parameters in some embodiments, such as the function to be used to determine a record's partition, the partitioning keys used, the total number of partitions, the number of ingestion nodes, storage nodes or retrieval nodes, and/or the placement of the nodes on different physical or virtual resources. In at least some embodiments, at least some types of reconfiguration operations such as stream repartitioning or migration may be implemented dynamically without interrupting the flow of the data records being read/written by applications. Different partitioning schemes and reconfiguration-triggering criteria may be used for different data streams in some embodiments, e.g., based on client-provided parameters or on heuristics of the SMS control nodes. In some embodiments, it may be possible to limit the number and/or frequency of reconfigurations, e.g., based on client preferences, the expected lifetime of a stream, or other factors.

A number of different record ingestion policies and interfaces may be implemented in different embodiments. For example, in some embodiments, clients (e.g., executable components or modules configured to invoke the programmatic interfaces of the SMS on behalf of customers of the SMS) may utilize either in-line submission interfaces, or by-reference submission interfaces. For in-line submissions, the contents or body of the data record may be included as part of the submission request in such embodiments. In contrast, in a by-reference submission request, an address (such as a storage device address, a database record address, or a URL (Uniform record Locator)) may be provided from which the contents or body of the data record can be obtained. In some implementations, a hybrid submission interface may also or instead be supported, in which up the first N bytes of the data record may be included in-line, while the remaining bytes (if any) are provided by reference. In such a scenario, short records (whose bodies are less than N bytes long) may be fully specified by the submission request, while portions of longer records may have to be obtained from the corresponding address.

In addition to the different alternatives for specifying record contents during ingestion, in some embodiments a variety of acknowledgement or de-duplication related ingestion policies may also be implemented. For example, for some stream applications, clients may wish to ensure that each and every data record is ingested reliably by the SMS.

In large distributed stream management environments, packets may be lost, or various failures may occur from time to time along the path between the data sources and the ingestion nodes, which could potentially result in some submitted data being lost. In some embodiments, therefore, an SMS may implement an at-least-once ingestion policy, in accordance with which a record submitter may submit the same record one or more times until a positive acknowledgement is received from the ingestion subsystem. Under normal operating conditions, a record may be submitted once, and the submitter may receive an acknowledgement after the receiving ingestion node has obtained and stored the record. If the acknowledgement is lost or delayed, or if the record submission request itself was lost, the submitter may resubmit the same data record one or more times, until eventually an acknowledgement is received. The ingestion node may, for example, generate an acknowledgement for each submission, regardless of whether it is a duplicate or not, based on an expectation that the record would not be resubmitted if an acknowledgement had already been received by the submitter. The ingestion node may, however, be responsible in at least some embodiments for recognizing that the same data record has been submitted multiple times, and for avoiding storing new copies of the duplicate data unnecessarily. In some embodiments, a decentralized technique for de-duplication may be used, in which local de-duplication tables are instantiated at each ingestion node to store de-duplication signatures for only the partitions for which the ingestion node is responsible.

In one embodiment, at least two versions of an at-least-once ingestion policy may be supported—one version (which may be termed "at-least-once ingestion, no-duplication") in which the SMS is responsible for de-duplicating data records (i.e., ensuring that data is stored at the SMS storage subsystem in response to only one of a set of two or more submissions), and one version in which duplication of data records storage by the SMS is permitted (which may be termed "at-least-once, duplication-permitted"). The at-least-once, duplication-permitted approach may be useful for stream applications in which there are few or no negative consequences of data record duplication, and/or for stream applications that perform their own duplicate elimination. Other ingestion policies may also be supported, such as a best-effort ingestion policy in which acknowledgements are not required for every data record submitted. The loss of a few data records may be acceptable if a best-effort ingestion policy is in effect in at least some embodiments. Clients may select which ingestion policies they wish to use for various streams in various embodiments.

With respect to the storage of stream records, a number of alternative policies may also be supported in at least some embodiments. For example, a client may be able to choose a persistence policy from among several supported by the SMS, which governs such aspects of record storage as the number of copies of a given data record that are to be stored, the type of storage technology (e.g., volatile or non-volatile RAM, rotating disk-based storage, solid state devices (SSDs), network attached storage devices, and the like) to be used for the copies, and so on. For example, if a client selects an N-replica persistence policy to disk-based storage, a data record submission may not be considered complete until N copies of the record have been safely written to N respective disk devices. A chained replication technique may be used in some embodiments, in which the N copies are written to N storage locations in sequential order, as described below in further detail.

In at least some embodiments, as indicated earlier, more than one repository may be used to store stream data records persistently at an SMS—e.g., one repository in which data records of different partitions are stored (at least potentially, depending on the order in which they are received) in an interleaved manner, and a second repository in which the records of individual partitions are stored contiguously, thereby facilitating fast sequential reads of the records of a given partition. Sequence numbers may be generated for (and stored with) data records using various techniques as described below, including for example timestamp-based techniques that enable ordered record retrieval based on ingestion times. In some implementations, in accordance with a retention policy (selected by a client or by the SMS) or a de-duplication time window policy (indicating the time period, subsequent to a submission of any given data record, during which the SMS may be required to ensure that no duplicates of that given data record are stored in the SMS storage subsystem, even if some duplicates are submitted), at least some data records may be archived to a different types of storage service or repository and/or deleted after a time period from the SMS. Such removal operations may be referred to in various embodiments as stream "trimming". Clients may submit stream trimming requests in some embodiments, e.g., notifying the SMS that specified data records are no longer needed and can therefore be deleted from the perspective of the client submitting the trimming request, or explicitly requesting the deletion of specified data records. In scenarios in which there may be multiple clients consuming the data records of a given stream, the SMS may be responsible for ensuring that a given record is not deleted or trimmed prematurely, before it has been accessed by all the interested data record readers. In some implementations, if there are N applications reading from a given stream, before deleting a given record R of the stream, the SMS may wait until it has determined that all N readers have read or processed R. The SMS may determine that R has been read by all the reading applications based on respective trimming requests from the applications, for example, or based on respective indications of how far within the stream the applications have progressed. In some embodiments, some types of data consumers (such as testing-related applications) may accept the deletion of at least a small subset of data records before they have been accessed. Accordingly, applications may be able to notify the SMS regarding the acceptability of data deletion prior to retrieval in at least some embodiments, and the SMS may schedule deletions in accordance with the notifications. In some embodiments, an archival policy may be implemented, e.g., as part of the data retention policy, indicating for example the repositories or types of storage devices to which stream data records should be copied, and the scheduling policies to be used for such copies.

In at least some embodiments, a plurality of programmatic interfaces may also be supported for record retrieval, e.g., implementing a "pull" model in which a stream processing application is expected to poll the SMS to retrieve additional records, or a "push" model in which the SMS automatically transmits records to applications that have subscribed to obtain automated notifications from stream partitions. In one embodiment, an iterator-based approach may be used, in which one programmatic interface (e.g., getIterator) may be used to instantiate and position an iterator or cursor at a specified logical offset (e.g., based on sequence number or timestamp) within a partition of a stream. A different programmatic interface (such as getNextRecords) may then be used to read a specified number of data records sequentially starting from the current position of the iterator. The instantiation of an iterator may in effect allow a client to specify an arbitrary or random starting position for record retrieval within the stream partition.

Data Stream Concepts and Overview

FIG. 1 provides a simplified overview of data stream concepts, according to at least some embodiments. As shown, a stream 100 may comprise a plurality of data records (DRs) 110, such as DRs 110A, 110B, 110C, 110D and 110E. One or more data sources 120 (which may also be referred to as data producers or data generators), such as data sources 120A and 120B, may perform write operations 151 to generate the contents of data records of stream 100. A number of different types of data sources may generate streams of data in different embodiments, such as, for example, sensor arrays, social media platforms, logging applications or system logging components, monitoring agents of various kinds, and so on. One or more stream processing applications 130 (such as application 130A or 130B) may perform read operations 152 to access the contents of the data records generated by the data sources 120. In some embodiments, stream processing applications 130 may be referred to as data destinations or stream data consumers. As shown, in at least some embodiments, respective logically isolated read channels (IRCs) 175 (e.g., 175A or 175B) may be configured for individual stream processing applications at an SMS as discussed below in further detail. As a result of establishing such IRCs 175, respective sets of throttling parameters (such as 176A or 176B) which control the decisions used to delay or reject read operations may be applied independently for the different IRCs, thereby preventing SMS resource usage of one application from affecting the performance of reads of another application.

In at least some embodiments, a given data record 110 as stored in an SMS may comprise at least a data portion 101 (e.g., data portions 101A, 101B, 101C, 101D and 101E of DRs 110A, 110B, 110C, 110D and 110E respectively) and a sequence number SN 102 (e.g., SNs 102A, 102B, 102C, 102D and 102E of DRs 110A, 110B, 110C, 110D and 110E respectively). The sequence number 102 may be indicative of the order in which the DRs are received at a stream management system (or at a particular node of a stream management system) in the depicted embodiment. The data portions 101 may comprise immutable un-interpreted byte sequences in some implementations: that is, once a write operation 151 is completed, the contents of the DR generated as a result of the write may not be changed by the SMS, and in general the SMS may not be aware of the semantics of the data in such implementations. In some implementations, different data records of a given stream 100 may comprise different amounts of data, while in other implementations, all the data records of a given stream may be of the same size. In at least some implementations, nodes of the SMS (e.g., ingestion subsystem nodes and/or storage subsystem nodes) may be responsible for generating the SNs 102. The sequence numbers of the data records need not always be consecutive in some embodiments. In one implementation, clients of an SMS may provide, as part of a write request, an indication of a minimum sequence number to be used for the corresponding data record. In some embodiments, data sources 120 may submit write requests that contain pointers to (or addresses of) the data portions of the data records, e.g., by providing a storage device address (such as a device name and an offset within the device) or a network address (such as a URL) from which the data portion may be obtained.

The stream management service may be responsible for receiving the data from the data sources 120, storing the data, and enabling stream processing applications 130 to access the data in one or more access patterns in various embodiments. In at least some embodiments, the stream 100 may be partitioned or "sharded" to distribute the workload of receiving, storing, and retrieving the data records. In such embodiments, a partition or shard may be selected for an incoming data record 110 based on one or more attributes of the data record, and the specific nodes that are to ingest, store or retrieve the data record may be identified based at least in part on the partition. In some implementations, the data sources 120 may provide explicit partitioning keys with each write operation which may serve as the partitioning attributes, and such keys may be mapped to partition identifiers. In other implementations, the SMS may infer the partition ID based on such factors as the identity of the data source 120, the IP addresses of the data sources, or even based on contents of the data submitted. In some implementations in which data streams are partitioned, sequence numbers may be assigned on a per-partition basis—for example, although the sequence numbers may indicate the order in which data records of a particular partition are received, the sequence numbers of data records DR1 and DR2 in two different partitions may not necessarily indicate the relative order in which DR1 and DR2 were received. In other implementations, the sequence numbers may be assigned on a stream-wide rather than a per-partition basis, so that if sequence number SN1 assigned to a data record DR1 is lower than sequence number SN2 assigned to data record DR2, this would imply that DR1 was received earlier than DR2 by the SMS, regardless of the partitions to which DR1 and DR2 belong. In some embodiments, a stream may by default comprise a single partition, so at least some of the techniques described herein specifically with respect to partitions may be implemented at the stream level, and similarly, techniques described specifically with respect to streams may be implemented at the partition level. In one embodiment, streams may not be divided into partitions.

The retrieval or read interfaces supported by an SMS may allow applications 130 to access data records sequentially and/or in random order in various embodiments. In one embodiment, a subscription model may be supported, in which when a data record of a stream becomes available, the SMS may pass the record to one or more functions or methods of the application 130 in an automated fashion, without requiring the application to poll the SMS. In some embodiments, such subscriptions may be associated with respective IRCs—e.g., an IRC may be specified as a parameter when requesting a subscription to a stream partition. In other embodiments, a client may subscribe to automated callbacks or notifications regardless of whether an IRC is used or not. An iterator-based set of read application programming interfaces (APIs) may be supported in some embodiments. An application 130 may submit a request to obtain an iterator for a data stream, with the initial position of the iterator indicated by a specified sequence number and/or a partition identifier. After the initiator is instantiated, the application may submit requests to read data records in sequential order starting from that initial position within the stream or the partition. If an application is to read data records in some random order, a new iterator may have to be instantiated for each read in such embodiments. In at least some implementations, the data records of a given partition or stream may be written to disk-based storage in sequence number order relative to one another.

Example System Environment

Figure 2:
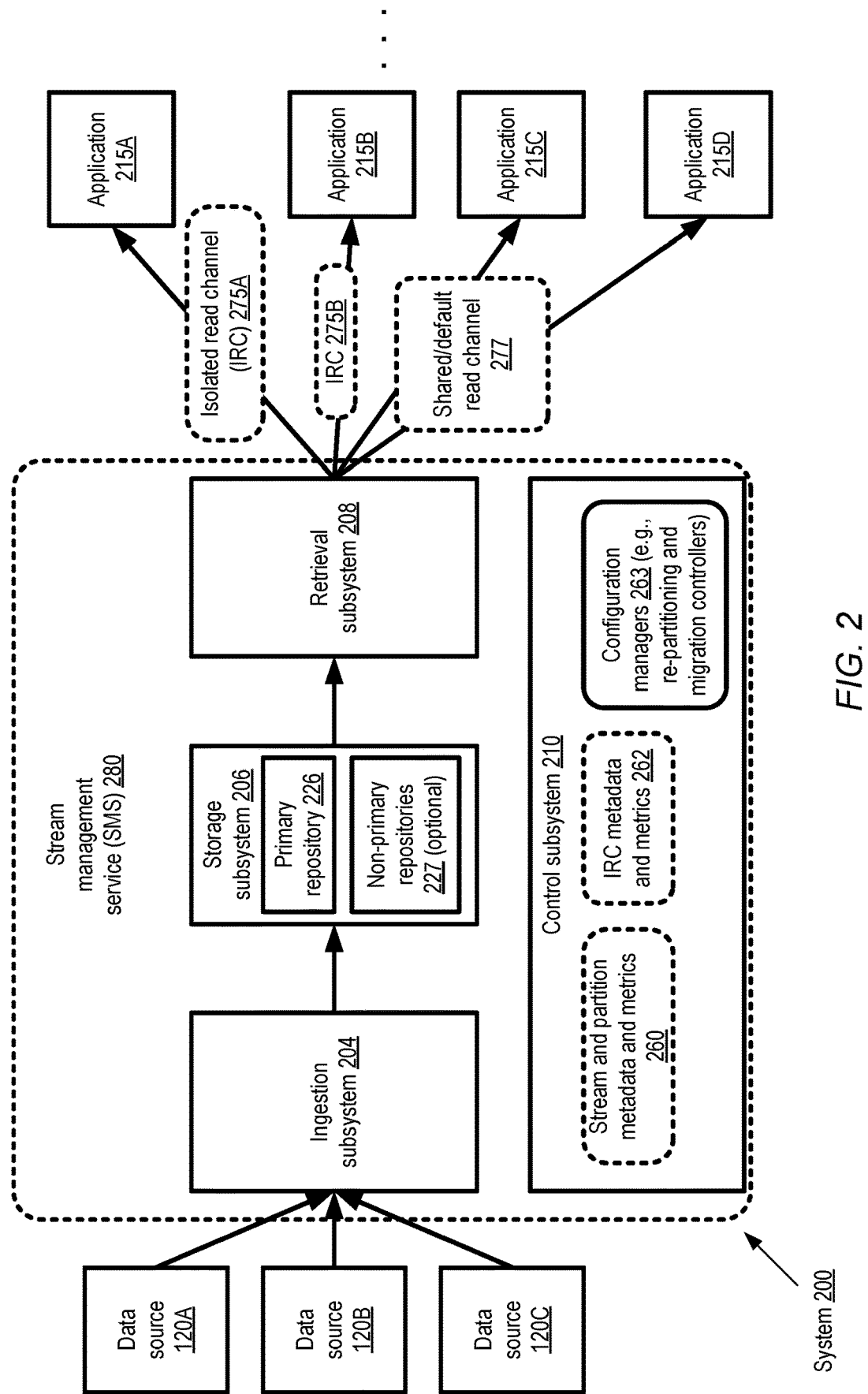
FIG. 2 illustrates an example system environment in which a stream management service (SMS) which supports isolated read channels may be implemented, according to at least some embodiments.

FIG. 2 illustrates an example system environment in which a stream management service (SMS) which supports isolated read channels may be implemented, according to at least some embodiments. As shown, an SMS 280 in system 200 may comprise an ingestion subsystem 204, a storage subsystem 206, a retrieval subsystem 208, and a control subsystem 210. Each of the SMS subsystems may include one or more nodes or components, implemented for example using respective executable threads or processes instantiated at various resources of a provider network (or a client-owned or third-party facility). Nodes of the ingestion subsystem 204 may be configured (e.g., by nodes of the control subsystem 210) to obtain data records of a particular data stream from data sources 120 (such as 120A, 120B, and 120C), and each ingestion node may pass received data records on to corresponding nodes of the storage subsystem 206, e.g., based on a partitioning policy in use for the stream. The storage subsystem nodes may save the data records on any of various types of storage devices in accordance with a persistence policy selected for the stream. Nodes of the retrieval subsystem 208 may respond to read requests, (including for example subscription requests resulting in data records being pushed automatically to the requesters) from stream processing/reading applications 215, such as applications 215A, 215B, 215C and 215D.

In at least some embodiments, at least some of the nodes of the subsystems and processing stages shown in FIG. 2 may be implemented using provider network resources. Networks set up by an entity such as a company or a public sector organization to provide one or more network-accessible services (such as various types of cloud-based database, computing or storage services) accessible via the Internet and/or other networks to a distributed set of clients may be termed provider networks in various embodiments. Provider networks may also be referred to as private cloud environments in some embodiments. Some of the services may be used to build higher-level services: for example, computing, storage or database services may be used as building blocks for a stream management service. At least some of the core services of a provider network may be packaged for client use in service units called "instances": for example, a virtual machine instantiated by a virtualized computing service may represent a "compute instance", and a storage device such as a block-level volume instantiated by a storage service may be referred to as a "storage instance", or a database management server may be referred to as a "database instance". Computing devices such as servers at which such units of various network-accessible services of a provider network are implemented may be referred to as instance hosts, virtualization hosts or more simply as "hosts" in some embodiments. Nodes of the ingestion subsystem 204, the storage subsystem 206, the retrieval subsystem 208, and/or the SMS control system 210, may comprise threads or processes executing at various compute instances on a plurality of instance hosts and/or other execution platforms in some embodiments. A given instance host may comprise one or more compute instances, and the collection of compute instances at a particular instance host may be used to implement nodes for various different streams of one or more clients. Storage instances may be used for storing the data records of various streams in some embodiments. Over time, control subsystem nodes may modify the populations of other subsystems dynamically in response to various triggering conditions, e.g., by adding or removing nodes, changing the mappings of nodes to processes or compute instances or instance hosts, migrating or re-partitioning a given stream while still continuing to receive, store and process data records, and so on. Instance hosts and storage hosts may also be referred to in some embodiments as execution platforms. In some embodiments, virtualized resources may not necessarily be used for at least some components of the SMS.

In some embodiments in which provider network resources are used for stream-related operations, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of a provider network. Clients of one service may themselves be implemented using resources of another service—e.g., a stream data reader (a client of a stream management service) may comprise a compute instance (a resource provided by a virtualized computing service). One or more clients of a service may be associated with, or configured on behalf of, a given customer of the service in some embodiments. Various types of preferences, objectives or requests of a given customer with regard to streams, which may be expressed via programmatic or communication interfaces using a client, may in some embodiments be referred to as the client's preferences, objectives or requests.

A given provider network may include numerous data centers (which may be distributed across different geographical regions) hosting various resource pools in some embodiments, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services of a provider network in various embodiments. Clients may interact with resources and services at the provider network from devices located at client-owned or client-managed premises or data centers external to the provider network, and/or from devices within the provider network. It is noted that although provider networks serve as one example context in which many of the stream management techniques described herein may be implemented, those techniques may also be applied to other types of distributed systems than provider networks, e.g., to large-scale distributed environments operated by a single business entity for its own applications.

In the embodiment depicted in FIG. 2, at least two types of logical constructs may be used by applications for reading stream data records: isolated read channels (IRCs) 275, such as 275A or 275B, and/or shared/default read channels 277. An IRC 275 may be established or registered for reading records of one or more partitions of a given stream at a respective application 215 in some embodiments. Individual IRCs may have respective read performance limits set in various embodiments, such that (under most operating conditions, with some exceptions discussed below) if the application 215 utilizing a given IRC attempts to read at a rate higher than the performance limit, such reads may be throttled (e.g., rejected or delayed/deferred). In some embodiments in which a subscription or notification-based model is used for providing data records automatically to applications 215, the SMS may similarly delay or defer notifications if read metrics collected for an IRC indicate that the performance limit has been reached (or is about to be reached). In effect, decisions regarding whether specific data transfers for read operations should be completed or throttled (e.g., rejected/delayed) may be made independently for different IRCs in various embodiments. As implied by the name, IRCs may in general help isolate the read actions of one application from another—e.g., the storage configurations used for the stream partitions may be organized in such a way that there is sufficient capacity to provide the maximum read rates of any given IRC without impacting reads of other IRCs.

In contrast to IRCs, one or more shared or default read channels 277 may also or instead be made available to SMS clients in at least some embodiments. For those applications which use a shared or default read channel, throttling versus read acceptance decisions may be made taking the read workload of multiple applications (such as 215C and 215D) into account together in the depicted embodiment. It may thus be possible that the read rate or read throughput of one application (such as 215C) utilizing the shared or default channel 277 may impact the read rate or read throughput of another application (such as 215D) utilizing the shared or default channel in some embodiments. In at least one embodiment, when using an IRC, the identifier of the particular IRC to be used for a read or a set of reads may have to be provided in a programmatic read request (such as a subscription request), but when using the shared or default channel, a channel identifier may not be required. In such an embodiment, the default channel may be implicit instead of having to be specified explicitly.

The SMS control subsystem 210 may include, among other artifacts and resources, stream and partition metadata and metrics 260, IRC metadata and metrics 262, and a set of one or more configuration managers 263 (e.g., responsible for reconfiguration operations such as stream re-partitioning, partition migration and the like). As indicated earlier, in at least some embodiments, the creation, registration or use of IRCs 275 may in some cases trigger reconfiguration operations (e.g., proactive migration or repartitioning so that the workload associated with IRCs which may be configured in the future may be accommodated in a seamless manner at the SMS). In at least some embodiments, the storage subsystem 206 may comprise more than one type of persistent storage repository, such as a primary repository 226 and one or more optional non-primary repositories 227. Data records of different partitions/streams may potentially be stored in an interleaved manner at a primary repository in some embodiments, e.g., based on the order in which there are received relative to each other. In at least one embodiment, in contrast, records of individual partitions may be stored contiguously at one or more non-primary repository, so that (for example) a portion of a given partition may be read from the non-primary repository using sequential disk reads. In various embodiments, nodes of the retrieval subsystem 208 may, for example comprise processes that act as front end intermediary request processors for applications 215, obtain data records of streams from the back-end storage subsystem resources, and transmit the data records to the applications 215. In at least one embodiment, some nodes of the retrieval subsystem may be implemented at the same set of computing devices as some nodes of the storage subsystem; that is, in such an embodiment, retrieval and storage subsystem functions may both be implemented at a set of common execution platforms.

Support for Read Isolation at SMS Front End and Back End

Figure 3:
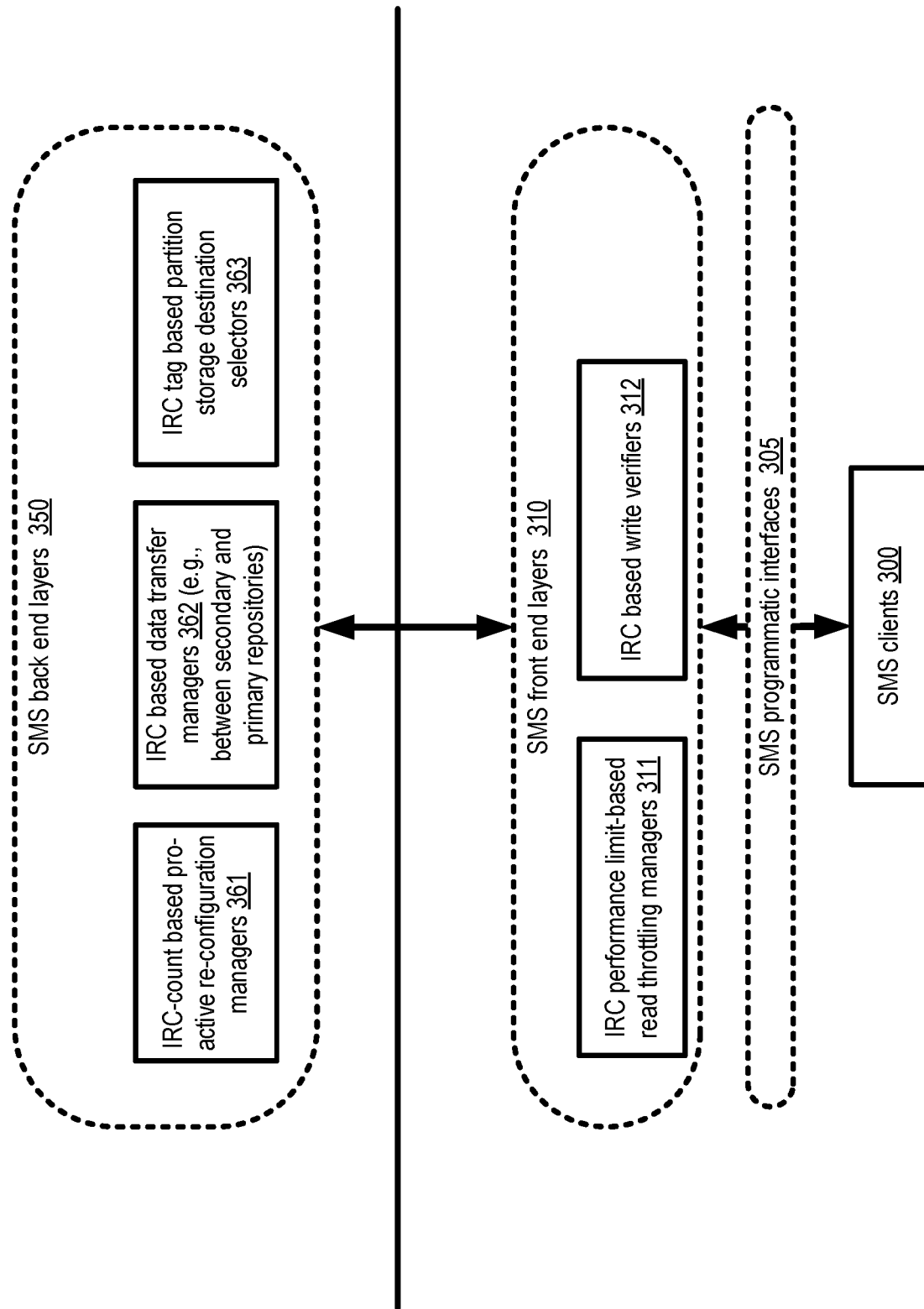
FIG. 3 illustrates an example division of responsibilities regarding isolated read channel support between front-end and back-end components of a stream management service, according to at least some embodiments.

FIG. 3 illustrates an example division of responsibilities regarding isolated read channel support between front-end and back-end components of a stream management service, according to at least some embodiments. In the depicted embodiment, components of the SMS to which clients 300 may submit requests via programmatic interfaces 305 (e.g., APIs, web-based consoles, command-line tools, graphical user interfaces and the like) of the SMS may be referred to collectively as front-end layers 310, while components of the SMS that are typically not (under most normal operating conditions) directly reachable by clients may be referred to collectively as back end layers 350. In at least some embodiments, for example, at least a subset of resources of the ingestion subsystem, the control subsystem and/or the retrieval subsystem may be included in the front-end layers, while other components of such subsystems may be included in the back end layers. In one embodiment, resources of the storage subsystem of an SMS may primarily or entirely be considered part of the back end.

In the embodiment shown in FIG. 3, IRC performance limit-based read throttling managers 311, which may for example be implemented using one or more software and/or hardware components of the retrieval subsystem of an SMS, may be responsible for ensuring that the use of resources for reads via a given IRC does not impact (or has as small an impact as possible) on the reads being performed using any other IRC. In order to so, the throttling managers may for example reject or delay reads via an individual IRC when collected read performance metrics associated with that IRC indicate that the maximum permissible read rate for that IRC has been, or is about to be, reached in the depicted embodiment. In at least some embodiments, the throttling limits, and associated metrics such as the fraction of the maximum read data transfer rates that a given application is currently utilizing, may be provided on demand to SMS clients via programmatic interfaces (e.g., a graphical or visualization interface may be used to show the limits and the current usage).

In some embodiments, IRCs may be associated with tags or labels assigned to data records, such that individual IRCs may be used to read only those data records which satisfy a particular predicate expressed using the tags or labels. In one such embodiment, one or more IRC based write verifiers 312, implemented for example at one or more front-end resources of the SMS ingestion subsystem, may be employed to verify that individual data records have tags that are correctly formatted. For example, consider a scenario in which a client indicates that (a) all reads to a particular stream partition are to be performed using IRCs, and (b) all IRCs are to use filters expressed in terms of a set of permissible tags {T} to indicate which subset of the data records they are to read. In such a scenario, an IRC based write verifier 312 may be responsible for checking, for example, that if a given data record has a tag, that tag is a member of {T}, and for rejecting writes of improperly tagged records.

At the SMS back end layer 350, a number of different types of operations may be performed to support isolation of reads of different applications. For example, proactive re-configuration managers 361, implemented using resources of a control subsystem, may be responsible for initiating storage reconfigurations in advance of potential IRC establishment/registration operations to ensure that enough resources are set aside to meet future IRC read performance targets. In one embodiment, for example, given a current number $N_{now}$ of established IRCs being used to read a partition or stream, the re-configuration managers 361 may be responsible for initiating migration of at least a subset of data records of the partition or stream (e.g., records arriving in the future) to a different set of storage devices which can, together with the current set of allocated storage devices, collectively support the needs of ($N_{now}$+k) IRCs. In effect, in such embodiments, the registration or establishment of a given IRC may (a) reserve some subset of read capacity for the newly registered IRC, from a pool of capacity set aside for the stream earlier, and (b) potentially trigger reconfigurations to enable the SMS to handle some number of additional IRCs that may be registered in the future. In at least some embodiments, the reconfigurations may be triggered based on a combination of factors—e.g., not just on the number of IRCs established or anticipated, but also on measurements of resource utilizations at various SMS nodes/servers that may be used for storing the data records and/or handling read requests.

In some embodiments, as mentioned earlier, more than one type of storage repository may be used for stream records. Depending on the performance requirements and/or specific functionality (e.g., fast catch-up support) to be provided using a given IRC, one or more data transfer managers 362 may be responsible for initiating transfers of stream data records between the repositories in the depicted embodiment. To help optimize filter-based reads via IRCs, in some embodiments the specific storage devices or nodes at which data records which comprise a particular tag or label may be selected using storage destination selectors 363 at the back end layers 350. For example, if a client indicates that one or more IRCs which are intended for reading data records with a particular tag T1 have very stringent read responsiveness requirements (e.g., a very short propagation delay between the time such a T1-tagged record is written and the time it is to be read), fast-access storage devices may be selected at the back end layer for such data records by a destination selector 363 in some embodiments. Other types of operations, not shown in FIG. 3, may be performed in at least some embodiments to support IRCs at the front end or back end of an SMS.

Example Programmatic Interfaces

Figure 4:
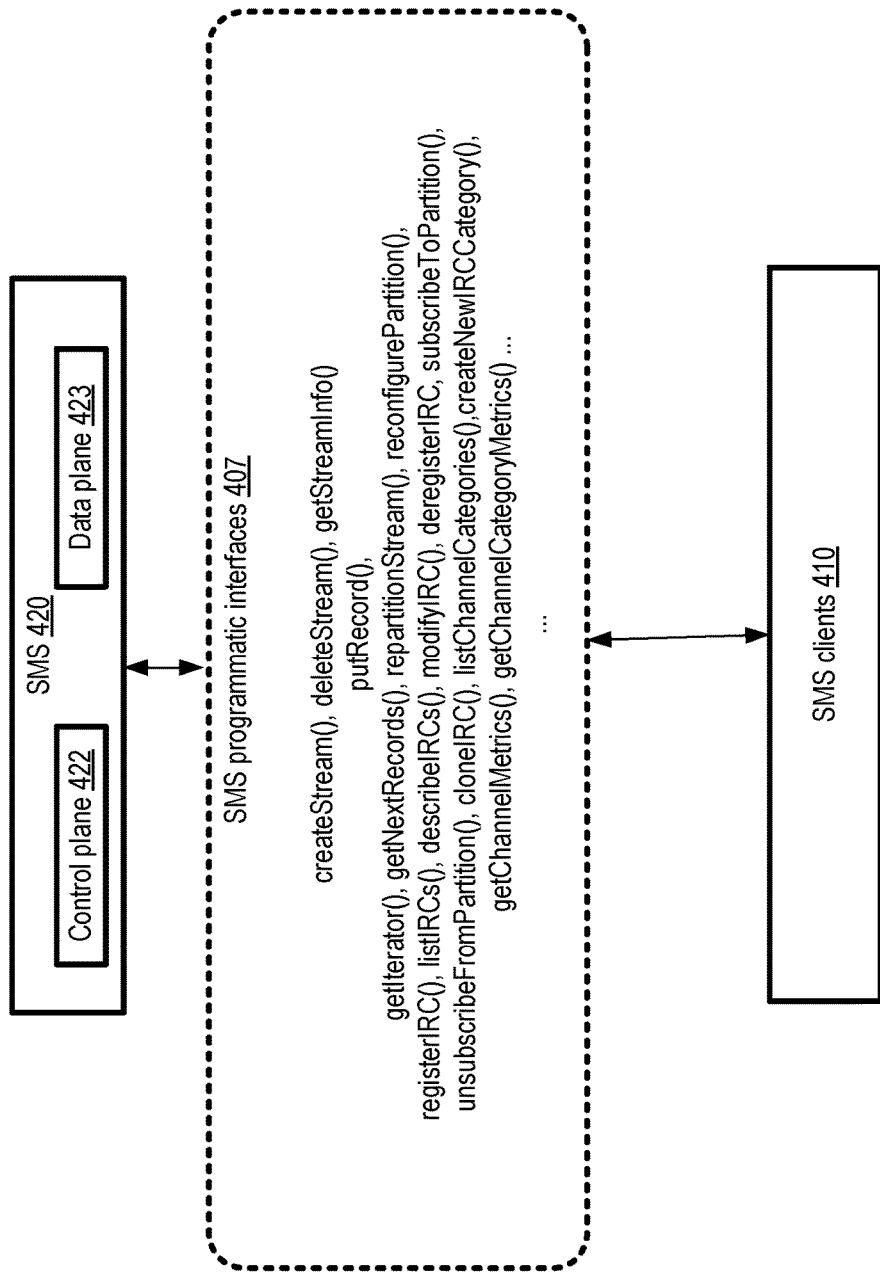
FIG. 4 illustrates example programmatic interfaces that may be implemented at a stream management service, according to at least some embodiments.

FIG. 4 illustrates example programmatic interfaces that may be implemented at a stream management service, according to at least some embodiments. As mentioned earlier, a number of types of programmatic interfaces, including web-based consoles, application programming interfaces (APIs) that can be invoked by programs, graphical user interfaces, command-line tools and the like may be implemented by an SMS in different embodiments. In at least some embodiments, at least some of the client interactions via consoles, command-line tools, or graphical user interfaces may be translated into corresponding API calls. By way of example, only the names of a number of APIs are shown in FIG. 4; equivalent functionality may be supported using the other types of interfaces such as web-based consoles and the like in various embodiments. The APIs illustrated are not intended to be exhaustive lists of those supported in any given implementation, and some of the illustrated APIs may not be supported in a given implementation.

Some of the SMS APIs 407, such as createStream (used to create a data stream, e.g., with a specified number of partitions), registerIRC (used to establish and associate an isolated read channel or IRC with a stream or a partition) in the depicted embodiment and the like may be administrative in nature, and may be handled primarily by the SMS control plane resources 422. Others, such as putRecord (used to "put" or write a data record to a stream), getNextRecords (used to read some number of records from within a partition or stream), and subscribeToPartition (to start receiving stream records automatically at the requesting application, e.g., using a specified IRC and without polling the SMS) may be considered data-plane requests, and may be handled at the ingestion or retrieval layers of the data plane 423 of the SMS 420. Brief explanations of some of the other SMS APIs shown are provided below.

The deleteStream API may be used to delete a specified stream (which may also result in the deletion of metadata representing any IRCs registered/associated with the stream), while the getStreamInfo API may be used to obtain metadata for a stream, such as the number of IRCs registered, the number of active subscriptions, and so on in the depicted embodiment. The getIterator API may for example be used to obtain an iterator construct that can be used to start reading iteratively from a partition, starting from a specified position (specified for example using a sequence number or timestamp within a given partition). A repartitionStream interface may be used to request dynamic repartitioning of a specified stream in some embodiments. A reconfigurePartition API may be used to request that the storage configuration of a particular partition be modified, e.g., by adding storage nodes to a chain being used for the partition, by transferring records of the partition to a different storage device type, etc., which may be useful to help enable the level of read performance needed for one or more IRCs which may be used for reading from the partition. The reconfigurePartition API may, for example, be invoked by a client prior to requesting the establishment of one or more IRCs in some embodiments.

A listIRCs API may be used to obtain a list of the IRCs associated or registered with one or more partitions in some embodiments. The describeIRCs API may be used to obtain properties (e.g., maximum performance settings, current state and the like) of one or more IRCs. A modifyIRC API may be used to change one or more properties of an IRC, such as its performance limits, the category of the IRC, and so on. A deregisterIRC API may be used to disassociate an IRC from a partition and delete the corresponding metadata in some embodiments. An unsubscribeFromPartition API may be used to indicate that no more reads are to be performed via the subscription model by the requesting application in the depicted embodiment.

The cloneIRC API may be used to request the establishment of a new IRC that has similar (or identical) properties to an existing IRC in some embodiments. In some embodiments in which several different pre-defined categories of IRCs (and in some cases a default or shared channel category) are supported by the SMS, a listChannelCategories API may be used to obtain the list of supported channel categories or types. In some embodiments, a client may wish to create a template for a new category of channels, which may be done using a createNewIRCCategory API or the equivalent. Various performance, availability, usage, age, and/or other metrics of individual IRCs may be obtained using a getChannelMetrics API in some embodiments. Similarly, in at least one embodiments, such metrics may be obtained for specified IRC channel categories using an API such as getChannelCategoryMetrics. As indicated earlier, various other SMS APIs may also be implemented in other embodiments (such as APIs to obtain subscription-specific information, including for example getSubscriptionMerics to obtain performance metrics associated with a specified subscription), and some of the APIs listed in FIG. 4 may not be implemented in some embodiments.

Figure 5:
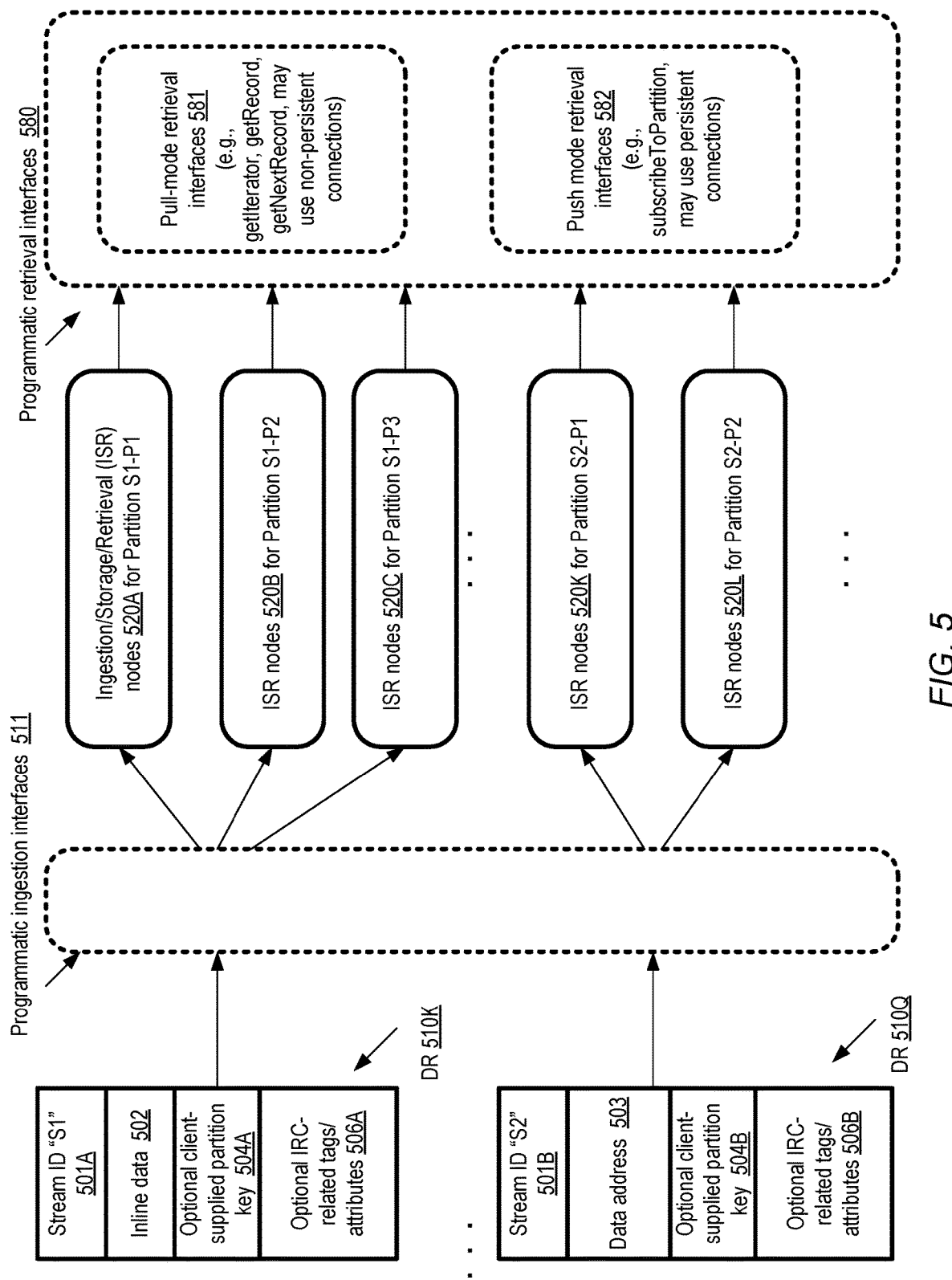
FIG. 5 illustrates example elements of data records and example categories of retrieval interfaces of a stream management service, according to at least some embodiments.

FIG. 5 illustrates example elements of data records and example categories of retrieval interfaces of a stream management service, according to at least some embodiments. Data records (DRs), such as 510K and 510Q, may be submitted via various types of programmatic ingestion interfaces 511 (e.g., the putRecord API discussed above) to the SMS in the depicted embodiment. A DR 510 may comprise at least four types of elements in some embodiments: a stream identifier such as 501A (for stream "S1") or 501B (for stream "S2"), an indication of the data or body of the record, an optional partition key 504 (such as 504A or 504B), and one or more optional IRC-related tags/attributes 506 (such as 506A and 506B). The data itself may be provided in-line in some data records (e.g., inline data 502 of DR 510K), while for other data records a pointer or address 503 may be provided, indicating to the SMS a network-accessible location (or an address at a local device that does not require network transfers). In some embodiments, a given stream may support both inline and by-reference (address-based) data record submissions. In other embodiments, a given stream may require data sources to supply all the data inline or all the data by reference. In some implementations, a data record submission may include a partition identifier to be used for the record. Tags 506 may, for example, be used to distinguish among groups of data records that are to be read and processed by different applications—e.g., a given application A1 may process data records with tag T1 and in effect ignore data records with other tags, another application A2 may process data records with a tag T2 and ignore data records with other tags, and so on. In at least some embodiments, filter predicates expressed in terms of such tags 506 or attributes/schemas may be included in the properties of one or more IRCs.

The incoming data records 510 may be directed to respective ingestion and/or storage nodes based on a partitioning policy in the depicted embodiment. Similarly, record retrieval may also be partition-based—e.g., one or more retrieval nodes may be designated for responding to read requests directed to records of a given partition. For some streams, data sources may be required to provide an explicit partition key with each data record write request. For other streams, the SMS may be able to distribute the data records according to a partitioning scheme that relies on metadata or attributes other than explicitly-supplied partition keys—for example, identification information pertaining to the submitting data source may be used as a partition key, or a portion or all of the submitting data source's IP (Internet Protocol) address may be used, or a portion of the data being submitted may be used. In some implementations, a hash function may be applied to a partition key to obtain an integer value of a certain size, such as a 128-bit integer. The total range of positive integers of that size (e.g., from 0 to $2^{128}-1$) may be divided into N contiguous sub-ranges, with each sub-range representing a respective partition. Thus, in such an example implementation, any given partition key determined or supplied for a data record would be hashed to a corresponding 128-bit integer, and the contiguous sub-range of 128-bit integers to which that integer belongs may indicate the partition to which the data record belongs. Other partitioning algorithms and policies may be used in other embodiments.

The set of nodes responsible for ingesting or accepting the data records of the particular partition, storing the data records, and responding to read requests for the particular partition, may collectively be referred to as ISR (ingestion, storage and retrieval) nodes in some embodiments. The notation Sj-Pk is used to indicate the kth partition of stream Sj. In the illustrated embodiment, ISR nodes 520A are configured for ingesting, storing and retrieving records of partition S1-P1, ISR nodes 520B are set up for records of partition S1-P2, ISR nodes 520C are set up for records of partition S1-P3, ISR nodes 520K are set up for records of partition S2-P1, and ISR nodes 520L are set up for records of partition S2-P2. In some embodiments, a given node of an ingestion subsystem, a storage subsystem, or a retrieval subsystem may be configured to handle data records of more than one partition (or more than one partition of more than one stream). In some embodiments, the records of a single partition of a given stream may be ingested, stored or retrieved by more than one node. The number of ingestion nodes designated for a given partition Sj-Pk may in at least some cases differ from the number of ingestion nodes designated for a different partition Sj-Pl, and may also differ from the number of storage nodes designated for Sj-Pk and/or the number of retrieval nodes designated for Sj-Pk. With respect to ingestion and/or retrieval, SMS control nodes may implement APIs in some embodiments to allow clients to determine which specific nodes are responsible for which partitions. The mappings between data records and partitions, and between partitions and ISR nodes (or control nodes) configured, may be modified over time. In some embodiments the work associated with ingestion, storage and/or retrieval of the data records of a given partition or stream may be performed on a single computing device, e.g. using respective processes/threads as the nodes of at least some of the different layers.

In some embodiments, as indicated earlier, several different types of programmatic interfaces 580 may be implemented for retrieving or reading stream data records from a given partition. As shown in FIG. 5, some of the interfaces 581 may be characterized as pull-mode interfaces—that is, the application may issue explicit retrieval APIs such as getIterator, getRecord or getNextRecord to obtain one or more data records at a time. The use of such pull-mode operations may be referred to as polling the SMS in various embodiments. The getIterator API may be used, for example, to instantiate an iterator or read cursor at or after a data record with a specified sequence number in some embodiments, while a getRecord API may be used to read a data record with a specified sequence number in at least one embodiment. Other pull-mode retrieval interfaces may be implemented for sequential retrieval, such as getNextRecords (an interface requesting that N records be read from the current position of an iterator, in order of increasing sequence number). In the depicted embodiment, at least some of the pull-mode APIs may use respective network connections for individual API invocations or polling interactions—e.g., a given getNextRecords API call that retrieves 10 data records may use one TCP (Transmission Control Protocol) connection to the SMS, while the next getNextRecords API call that retrieves 15 more data records may use a different TCP connection. Pull-mode retrieval APIs may be referred to as polling APIs in some embodiments.

In the depicted embodiment, one or more push mode retrieval interfaces 582, such as subscribeToPartition, may also be supported by the SMS. Using such an API, a client may specify a starting position (e.g., using a sequence number, a timestamp, a relative timing indicator which can be used to indicate that records no older than S seconds before now are to be read via the subscription, etc.) within a specified partition, and a destination or recipient application may then begin to receive data records starting at the specified starting position automatically as they become available, without having to issue any more API calls in some embodiments. In at least one embodiment, a single persistent network connection (e.g., a TCP connection) may be used, at least by default and in the absence of failures, for all the records transmitted from the SMS in response to a given subscribeToPartition API call. In one embodiment, a subscribeToPartition API may include one or more parameters indicating subscription properties such as the maximum number of records to be returned, the maximum time duration before the subscription is automatically terminated, and so on. In at least some implementations, lower propagation delays (the interval between when a data record is written into a partition, and when the contents of that record reaches a stream processing application) may be achievable via the subscription or push mode interfaces than via the pull mode interfaces, making the subscription interfaces more suitable for real-time and other high performance applications.

Ingestion Subsystem

Figure 6:
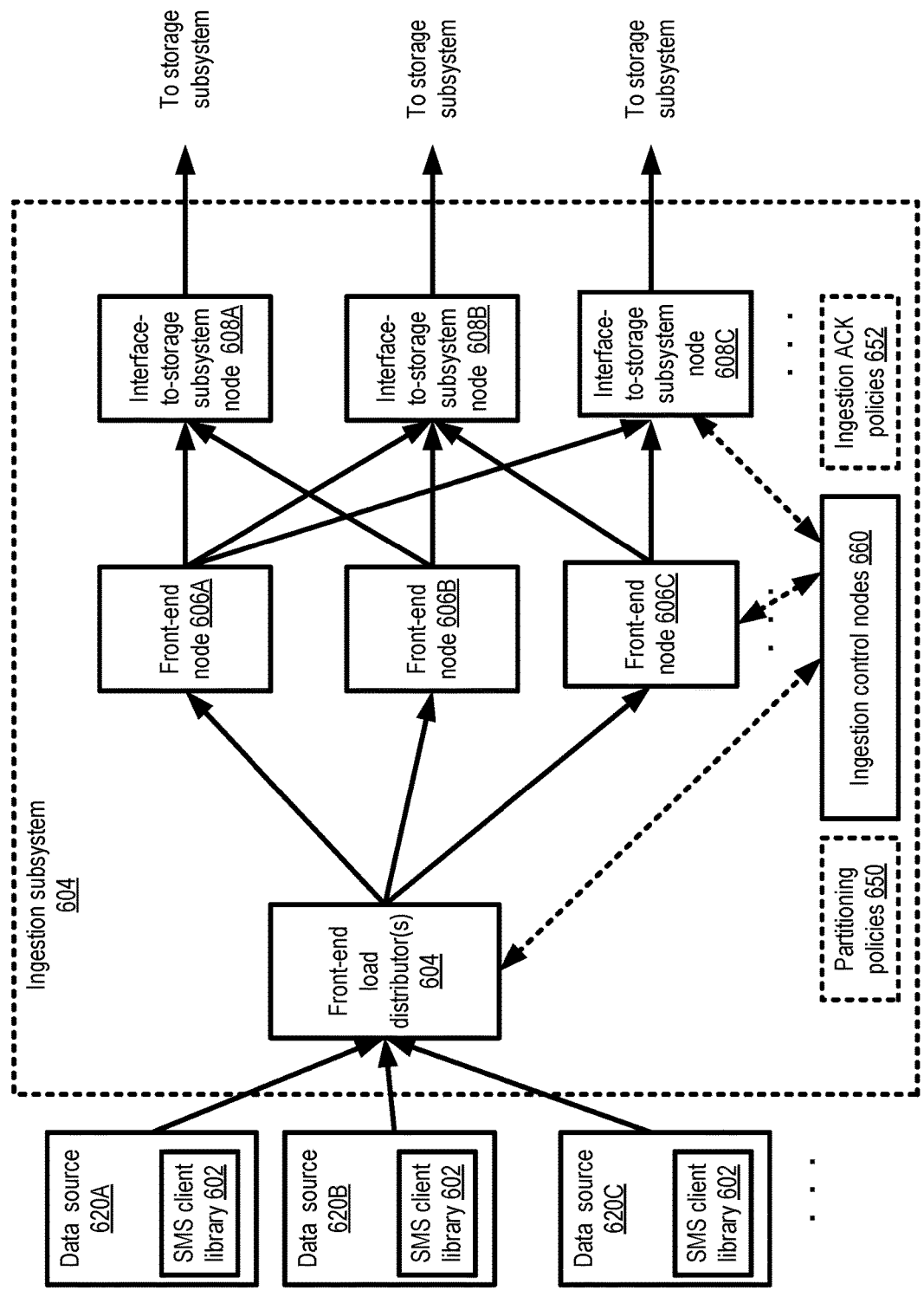
FIG. 6 illustrates example elements of an ingestion subsystem of a stream management service, according to at least some embodiments.

FIG. 6 illustrates example elements of an ingestion subsystem of an SMS, according to at least some embodiments. In the depicted embodiment, operations performed at ingestion subsystem 604 of an SMS similar to that shown in FIG. 2 are logically divided into front-end and back-end functions, with the front-end functions involving interactions with data sources 620 (e.g., 620A, 620B or 620C), and back-end functions involving interactions with an SMS storage subsystem. Such a front-end/back-end split (which may in some cases also be employed at the SMS retrieval subsystem) may have several advantages in the depicted embodiment, such as enhancing the security of the storage subsystem and avoiding having to provide partitioning policy details to data sources. SMS client libraries 602 may be provided for installation at various data sources 620, and the data sources may invoke programmatic interfaces included in the libraries 602 to submit data for ingestion. For example, in one embodiment the data sources 620 may comprise logging or monitoring agents instantiated at hundreds or thousands of physical and/or virtual servers of a provider network. Such agents may collect various log messages and/or metrics at their respective servers and periodically submit the collected messages or metrics to a front-end load distributor 604 endpoint instantiated by one or more ingestion control nodes 660 of the SMS. In some embodiments, one or more virtual IP addresses (VIPs) may be established for the load distributors, to which the data sources may submit the stream data. In one implementation, a round-robin DNS (Domain Name System) technique may be used for a VIP to select a particular load distributor from among several equivalently configured load distributors to which data is to be sent by data sources 620.

The received data records may be directed to any of several front-end nodes 606 (e.g., 606A, 606B or 606C) in the depicted embodiment. In at least some embodiments, the load distributor 604 may not be aware of the partitioning policy 650 in use for the data records, and the front-end node 606 may therefore be chosen for a given data record using round-robin load balancing (or some other general-purpose load balancing algorithm) rather than partition-based load balancing. The front-end nodes 606 may be aware of the partitioning policies 650 for various streams, and may interact with the ingestion control nodes 660 to obtain the identities of the specific back-end ingestion node 608 (e.g., 608A, 608B or 608C) that is configured for a given partition's data records. Thus, in the depicted embodiment, the front-end nodes 604 may each transmit data records to a plurality of back-end nodes 606, based on the respective partitions to which the data records belong. As noted earlier, the partition to which a data record belongs may be determined based on any combination of various factors, such as a partition key supplied by the data source, one or more other attributes such as the identity or address of the data source, or the contents of the data.

The back-end nodes 606 may each receive data records belonging to one or more partitions of one or more streams, and transmit the data records to one or more nodes of the storage subsystem. The back-end nodes may be referred to as "PUT servers" in some embodiments in which the data is submitted via HTTP (HyperText Transfer Protocol) "PUT" web service APIs. A given back-end node may determine the set of storage subsystem nodes to which its data records are to be transmitted by submitting a query to a control node 660 (which in turn may submit a corresponding query to a control node of the storage subsystem in embodiments in which control functions for the different subsystems are handled by separate sets of nodes).

In at least some embodiments, a number of different ingestion acknowledgement policies 652 may be supported, such as an at-least-once ingestion policy or a best-effort ingestion policy. In an at-least-once policy, the data sources 620 may require positive acknowledgements for each data record submitted, and may repeatedly submit the same data record (if an acknowledgement of the first submission is not received) until an acknowledgement is eventually received. In the best-effort ingestion policy, positive acknowledgements may not be required for at least some data records submitted (although the ingestion subsystem may still provide occasional acknowledgements, or may respond to explicit requests for acknowledgements from the data sources). In some embodiments in which the ingestion subsystem 604 is required to provide acknowledgements to the data sources, the back-end ingestion node 608 responsible for a given data record may wait until the required number of replicas of the data records have been successfully created at the storage subsystem (e.g., in accordance with a persistence policy established for the stream), before generating an acknowledgement. In various embodiments, a sequence number may be generated by the ingestion subsystem for each data record received, e.g., indicative of the order in which that record was ingested relative to other records of the same partition or stream, and such a sequence number may be returned to the data source as an acknowledgement, or as part of an acknowledgement. The acknowledgement and/or sequence number may be transmitted back to the data source via a front-end node 606 in some implementations. In at least one implementation, the at-least-once policy may be implemented between the front-end and the back-end nodes of the ingestion subsystem itself—e.g., a given front-end node 606 may repeatedly submit a data record to the appropriate back-end node 608 until the back-end node provides an acknowledgement.

Ingestion control nodes 660 may be responsible for, among other functions, instantiating the front-end and back-end nodes, monitoring the health and workload levels of the nodes, orchestrating failovers as needed, providing responses to queries regarding which nodes are responsible for a given partition or to policy-related queries, for ingestion-related configuration operations resulting from dynamic repartitioning of streams. The number of ingestion control nodes designated for a given set of one or more streams may itself be changed over time in some embodiments, e.g., one or more master control nodes may be responsible for reconfiguring the control node pool as needed. It is noted that the multi-layered ingestion subsystem architecture illustrated in FIG. 6 may not be implemented in some embodiments, e.g., only a single set of ingestion nodes may be configured in some scenarios.

Storage Subsystem

Figure 7:
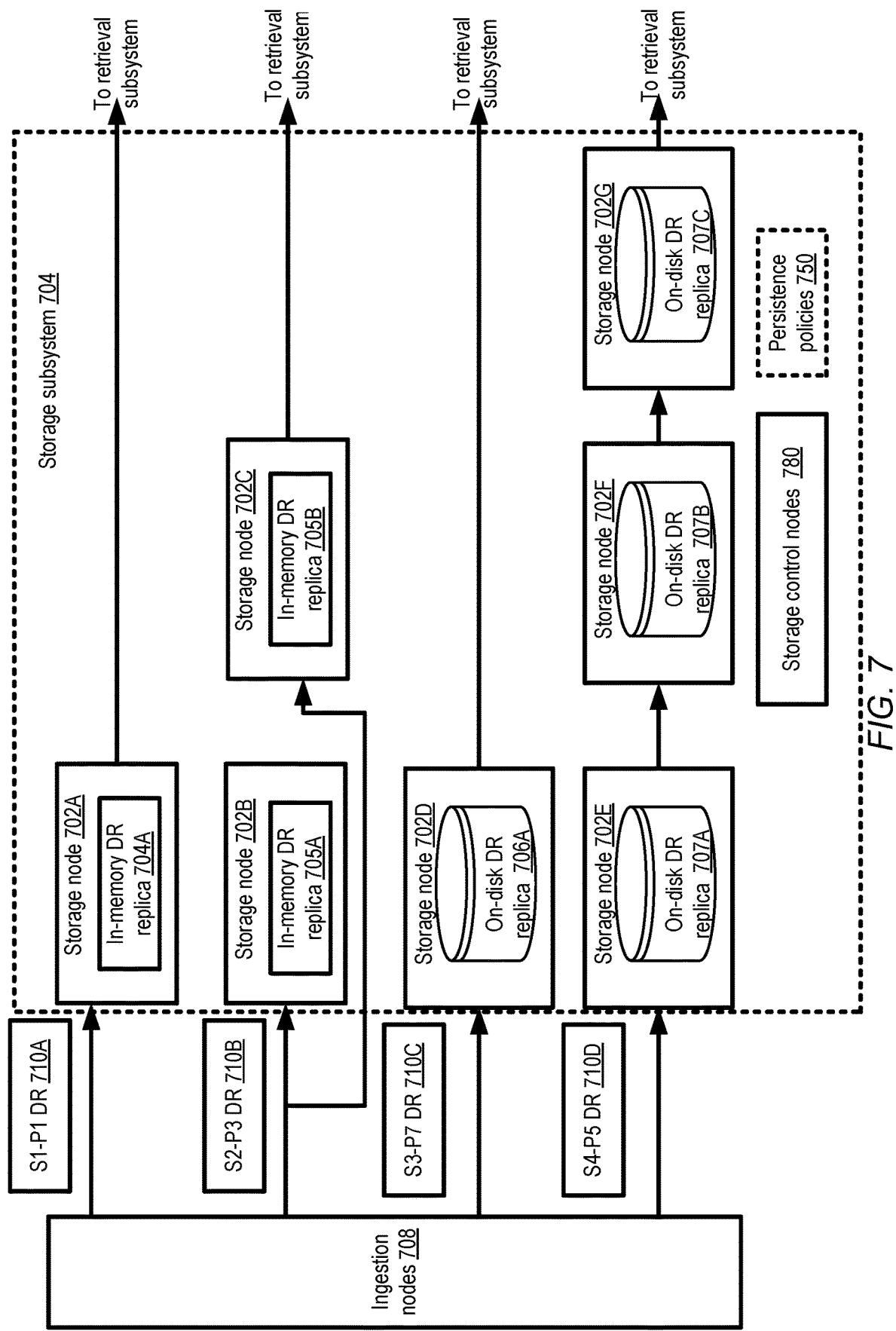
FIG. 7 illustrates example elements of a storage subsystem of a stream management service, according to at least some embodiments.

FIG. 7 illustrates example elements of a storage subsystem of a stream management service, according to at least some embodiments. As shown, ingestion nodes 708 (e.g., similar to back-end ingestion nodes shown in FIG. 6 in embodiments in which front-end and back-end ingestion responsibilities are handled by different sets of nodes) may transmit data records of one or more partitions of a stream to respective storage nodes 702 configured for those partitions in an SMS storage subsystem 704 in the depicted embodiment. For example, data record 710A of partition S1-P1 is sent to storage node 702A, data record 710B of partition S2-P3 is sent to storage nodes 702B and 702C, data record 710C of partition S3-P7 is sent to storage node 702D, and data record 710D of partition S4-P5 is sent initially to storage node 702E. Storage control nodes 780 may be responsible for enforcing the persistence policies 750 that are applied to data records of the different streams, configuring and reconfiguring storage nodes as needed, monitoring storage node states, managing failovers, responding to storage configuration queries or storage policy queries, and various other administrative tasks in the depicted embodiment.

Persistence policies 750 may differ from one another in various ways in different embodiments. For example, a persistence policy P1 applied to stream Sj may differ from a policy P2 applied to stream Sk in (a) the number of replicas of each data record to be stored, (b) the type of storage device or system on which the replicas are to be stored (e.g., whether replicas are to be stored in volatile memory, non-volatile caches, rotating disk-based storage, solid-state drives (SSDs), storage appliances of various kinds, RAID (redundant arrays of inexpensive disks) of various kinds, in database management systems, at nodes of a storage service implemented by a provider network, and so forth), (c) the geographical distribution of the replicas (e.g., whether the stream data is to be made resilient to large-scale failures or certain types of disasters by placing replicas in different data centers), (d) the write acknowledgement protocol (e.g., if N replicas are to be stored, how many of the N copies have to be written successfully before an acknowledgement should be provided to the ingestion node), and/or (e) whether, in cases in which multiple replicas of data records are to be stored, the replicas should be created in parallel or sequentially. In some cases in which multiple replicas are to be stored, as in the case of data record 710D, a given storage node may transmit the data record to another storage node (e.g., storage node 702E sends data record 710D for further replication to storage node 702F, and storage node 702F sends it on to storage node 702G). In other cases in which a multiple-replica persistence policy is used, as in the case of data record 710B for which two in-memory replicas are to be stored, the ingestion node may initiate the multiple replications in parallel. In at least some embodiments, the client's chosen persistence policy may not specify the type of storage location to be used for stream data records; instead, the SMS may select the appropriate types of storage technology and/or locations based on various criteria, such as cost, performance, proximity to data sources, durability requirements, and so on. In one embodiment, either the client or the SMS may decide to use different storage technologies or storage location types for different partitions of a given stream, or for different streams. In some embodiments, a network-accessible storage service, such as a block storage service or an object storage service, may be used for storing some or all of the partitions of a given stream. In one embodiment, the processing actions of a given storage node may be performed on a particular computing device (e.g., a virtualization host of a virtualized computing service), while the data of the partition may be stored at one or more storage devices accessed from the particular computing device via a network. In at least some embodiments in which isolated read channels (IRCs) are supported, properties of the IRCs that are established (or are expected to be established) may influence the storage configuration used for a given set of one or more partitions of a stream. For example, some IRCs may have associated filtering predicates involving tags associated with individual data records, and a subset of data records that have the same tag may be stored using a particular collection of storage nodes in one embodiment, in effect segregating data records by tag.

In the example shown in FIG. 7, the persistence policy applied to stream S1 (or at least partition S1-P1 of stream S1) is a single-replica in-memory policy, while for stream S2 a two-parallel-replica in-memory policy is applied. Accordingly, an in-memory replica 704A of data record 710A is created at storage node 702A, while two in-memory replicas 705A and 705B corresponding to data record 710B are created in parallel at storage nodes 702B and 702C. For stream S3's data record 710C, a single on-disk replica 706A is created. For stream S4, a sequential three-replica-on-disk policy is applicable, and as a result respective on-disk replicas 707A, 707B and 707C are created sequentially at storage nodes 702E, 702F and 702G. Various other types of persistence policies may be applied to data streams in different embodiments. Nodes of the retrieval subsystem may obtain the data records from the appropriate storage nodes in response to invocations of various types of retrieval APIs by data reading/processing applications.

Retrieval Subsystem

Figure 8:
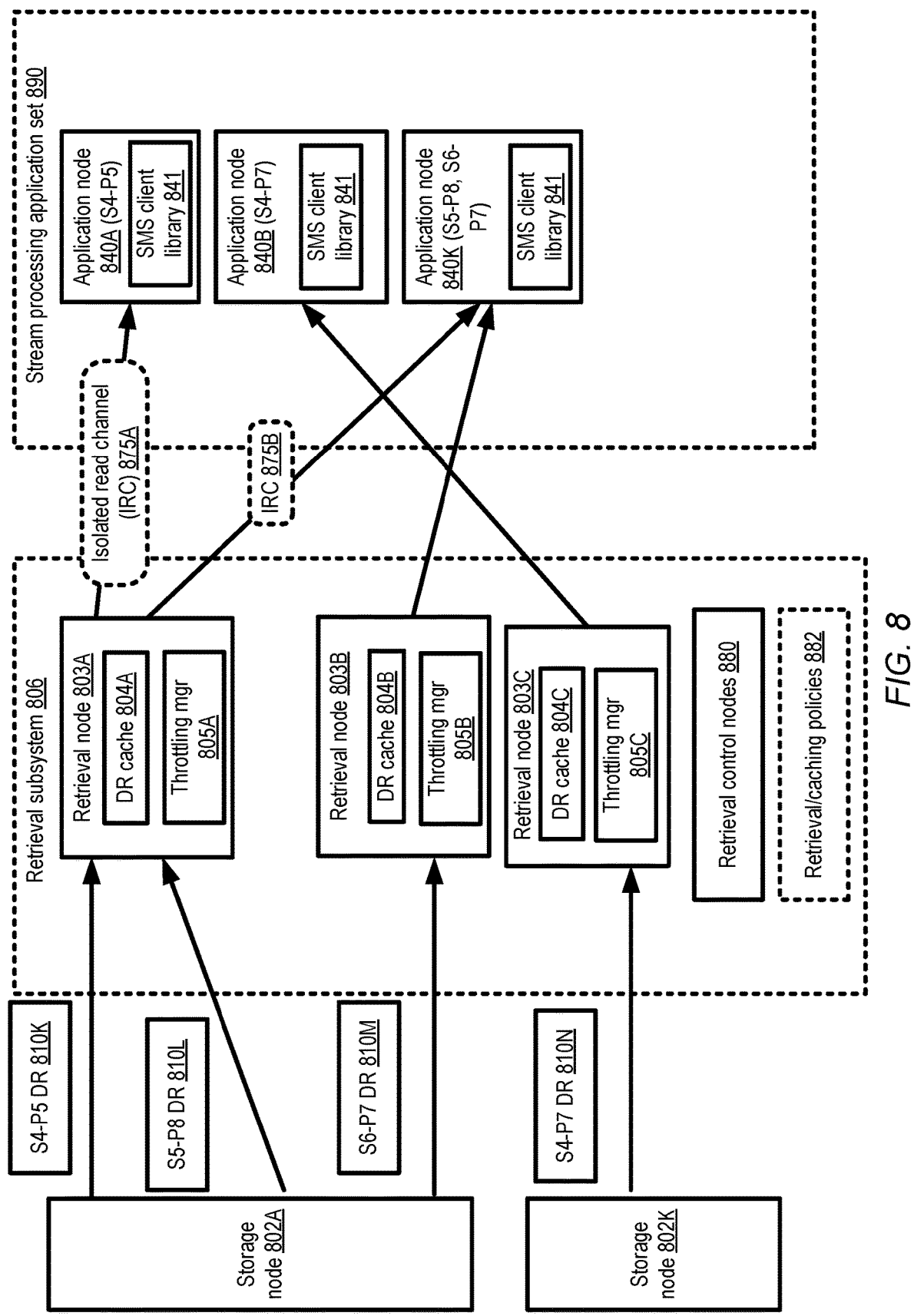
FIG. 8 illustrates example elements of a retrieval subsystem of a stream management service, according to at least some embodiments.

FIG. 8 illustrates example elements of a retrieval subsystem of a stream management service, according to at least some embodiments. As shown, retrieval subsystem 806 of an SMS similar to that introduced in FIG. 2 may comprise a plurality of retrieval nodes 803, such as retrieval node 803A, 803B and 803C, as well as a collection of retrieval control nodes 880 in the depicted embodiment. A distributed stream processing application set 890 may comprise a number of application nodes in the depicted embodiment, with different application nodes 840 (e.g., 840A, 840B and 840K) reading and processing data from respective partitions, e.g., using an SMS client library 841 to make the appropriate API calls. Individual ones of the retrieval nodes 803 may be configured to respond to stream data retrieval requests from one or more clients or application nodes of the stream processing application set 890, such as application nodes 840 in some embodiments. A variety of programmatic retrieval interfaces may be implemented by the retrieval nodes in different embodiments, such as the pull-mode and push-mode retrieval interfaces described earlier. In some embodiments, web services APIs such as HTTP GET requests may be used for data record retrieval, and the retrieval nodes 803 may accordingly be referred to as GET servers. A given retrieval node 803 may be configured, e.g., by a retrieval control node 880, to obtain data records of one or more stream partitions in the depicted embodiment from the appropriate set of storage subsystem nodes 802, such as storage nodes 802A and 802B. In at least some embodiments, computing devices at which stream processing applications (or nodes 840 of such applications) are instantiated or run may comprise respective client-side components of the SMS that implement various SMS client tasks such as establishing persistent connections with retrieval nodes, mapping persistent connections to subscriptions and the like, as described below in further detail.

In the depicted embodiment, a retrieval node 803 may interact with one or more storage nodes 802, and also respond to retrieval requests received from one or more application nodes 840. For example, data records of partitions S4-P5 (e.g., data record 710K) and S5-P8 (e.g., data record 710L) may be read from storage node 802A by retrieval node 803A, and provided to application nodes 840A and 840K respectively via respective IRCs 875A and 875B. Data records of partition S6-P7, such as 810M, are read by retrieval node 803B from storage node 802A and provided to application node 840K, e.g., without using IRCs. Data records of partition S4-P7 may be read by retrieval node 803C from storage node 802B and provided to application node 840B.

In at least some embodiments, some or all of the retrieval nodes 803 may comprise respective caches 804 (such as cache 804A at retrieval node 803A, cache 804B at retrieval node 803B, and cache 804C at retrieval node 803C) in which data records of various partitions may be retained temporarily in anticipation of future retrieval requests and/or in order to fulfill subscription requests. Individual retrieval nodes 803 may include respective throttling managers 805, such as 805A, 805B or 805C, which may enforce for example the maximum read performance limits associated with different IRCs independently for each of the IRCs in some embodiments. Retrieval control nodes 880 may be responsible for implementing a number of retrieval policies 882, including for example caching policies (e.g., how large a cache should be configured for a given partition, how long data records should be cached), storage node selection policies (e.g., which particular storage node should be contacted first to obtain a given data record, in scenarios in which multiple replicas of data records are stored), and so on. In addition, retrieval control nodes may be responsible for instantiating and monitoring retrieval nodes 803, responding to queries regarding which retrieval nodes are responsible for which partitions, initiating or responding to re-partitioning operations, and so on. In some embodiments, as discussed below, intermediary load balancers may be deployed to help distribute the retrieval workload generated at various application nodes 840 among the fleet of retrieval nodes 803.

Dynamic Chain Replication for Storing Stream Records

Figure 9:
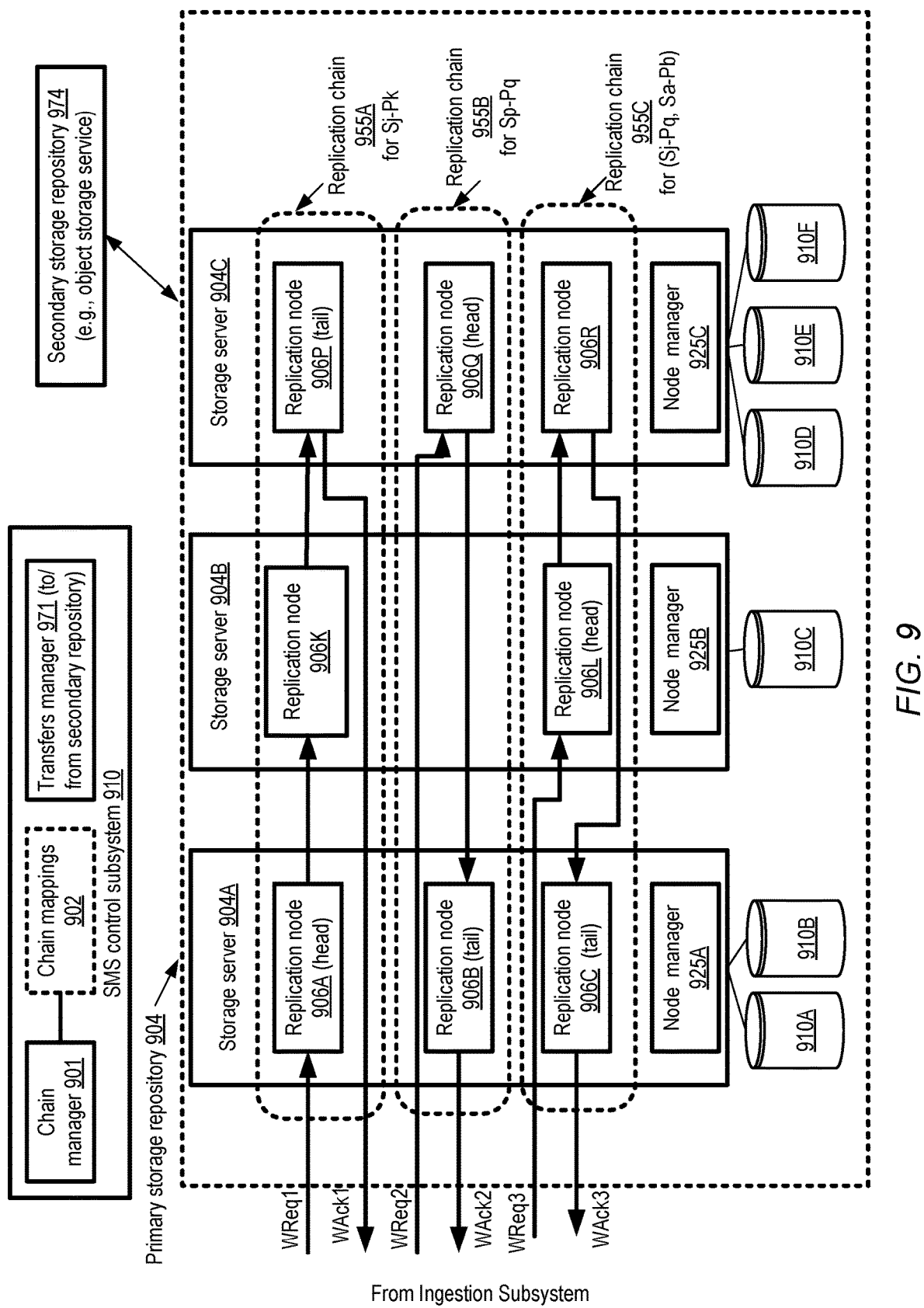
FIG. 9 illustrates an example use of a dynamic chain replication methodology at a primary storage repository of a stream management service, according to at least some embodiments.

In some embodiments, as mentioned earlier, a chain of storage nodes may be used to replicate the data records of a given stream or partition at the storage subsystem of an SMS. FIG. 9 illustrates an example use of a dynamic chain replication methodology at a primary storage repository of a stream management service, according to at least some embodiments. A chain manager 901 implemented at one or more computing devices may be configured in such embodiments to determine, for a given stream partition such as Sj-Pk, a mapping 902 of the stream's data to a selected set of storage destinations at which copies of the partition's data records are to be created, e.g., in sequential order. In at least some implementations the chain manager 901 may be implemented as a component of an SMS control subsystem 910, similar to the control subsystems described earlier, e.g., in the context of FIG. 2. Reflecting the sequential or chained nature of the replication, the mappings 902 may be referred to in some embodiments as "chain mappings".

Each partition may be assigned a replication chain 955 (e.g., 955A, 955B or 955C), comprising some number of replication nodes 906 that are responsible for generating the replicas in the depicted embodiment. A replication node 906 may, for example, comprise a process or thread of execution at a storage server 904 (e.g., 904A, 904B or 904C), and may be granted write permission to one or more storage devices 910 employing any of various types of non-volatile storage technologies and accessible from the storage server 904. Different replication chains may comprise different numbers of replication nodes in at least some embodiments, e.g., based on the data durability requirements of the corresponding partitions. In some embodiments, based on anticipated or current IRC configuration, the length of a replication chain may be increased to better accommodate IRC read performance requirements. A given replication chain may include respective replication nodes instantiated at a plurality of data centers in some embodiments. A replication chain may be assigned to more than one partition (potentially of more than one stream) in some implementations. The chain mappings 902 generated by chain manager 901 may comprise information on a number of different types of potentially dynamically modifiable relationships in some embodiments: the replication chain currently assigned to a given partition, the storage servers assigned to a given replication chain, the roles (e.g., head node, intermediate node, or tail node, described below in further detail) assigned to replication nodes of a given chain, and/or the storage device(s) at which a given replication node is to write data records.

As mentioned earlier, in some embodiments more than one repository may be used to store at least some data records of a stream. In some repositories, dynamic chain replication techniques may be used, while in others, such dynamic chaining may not necessarily be employed. In the example scenario depicted in FIG. 9, three replication chains—955A, 955B and 955C—are shown in a primary repository 903 of an SMS storage subsystem. The replication chains may be described as "dynamic" in the depicted embodiment because they may be reconfigured dynamically under certain conditions without causing disruptions to stream writers or readers. The SMS storage subsystem may also comprise an additional or secondary storage repository 974 in the depicted embodiment, which may for example be implemented using resources of object storage service. Data records that meet specified criteria (e.g., based on how long ago they were generated) may be transferred (e.g., after rearrangement into contiguous per-partition record groups) from the primary to the secondary repository in some embodiments, and the rearranged versions may be used for optimized catch-up operations in some cases as discussed below. In the depicted embodiment, a transfers manager 971 may be responsible for orchestrating the transfer of data records between the primary and the secondary repository. Note that the use of the term "secondary" for repository 974 does not necessarily imply that access to data is slower from repository 974 than from primary repository 903. In some embodiments, it may be the case that some types of reads (e.g., reads of the records of a single partition in sequence number order) may be fulfilled faster from the secondary repository than from the primary repository. In at least one embodiment, more than two repositories may be used for at least some streams of an SMS, with data being staged among them as needed.

Replication chain 955A at the primary repository 903, configured for partition Sj-Pk (the kth partition of stream Sj), comprises three replication nodes in the depicted example: replication node 906A on storage server 904A, replication node 906K on storage server 904B, and replication node 906P on storage server 904C. Node 906A is currently designated the "head" of the replication chain 955A, while node 906B is currently designated the "tail" of the replication chain 955A. The head of a given replication chain may be configured to receive write requests (as indicated by the arrow labeled WReq1 in the case of node 906A) for a given partition's data records from an SMS ingestion subsystem node. For example, in one embodiment an ingestion subsystem node may receive a data submission request of partition Sj-Pk from a data source, optionally perform de-duplication checking, determine (if it is not known already) the identity or address of a head node 906A or replication chain 955A from chain manager 901, and then submit a corresponding write request WReq1 to the head node 906A. After receiving the write request, the head node may store a local copy of the data to a storage device accessible from the head node's storage server, e.g., to one or more of local storage devices 910A or 910B in the case of head node 906A at storage server 904A. After storing the local replica, the head node 906A may transmit or forward a write request for the data record to the next replication node in the replication chain, such as replication node 906K. The sequential order in which the data records of the partition are to be replicated, starting from a head node, passing through zero or more intermediate nodes, and ending at a tail node, may be defined by the chain manager 901 as part of the chain mapping 902 in at least some embodiments. For some partitions that may not require very high data durability (or very high read performance), a single-node replication chain may be defined in some implementations, in which separate head and tail nodes are not defined.

Each node in a chain 955 may receive a write request, and store a local replica of the corresponding data records in the depicted embodiment. All the nodes except for the tail node may transmit or forward a write request to the next node in the chain in some embodiments; in at least some implementations, such write requests may serve as acknowledgements that the nodes have completed their local writes successfully. The tail node, after storing its replica, may transmit a write acknowledgement (e.g., WAck1 from tail node 906P of replication chain 955A) to the SMS ingestion subsystem, indicating that the data record has been successfully stored in accordance with the applicable policies for the partition. As a result of replicating the data record in sequential order as described above, at least some level of workload balance may be achieved automatically among the different replication nodes of a chain in some embodiments—e.g., for a given data record submitted to the ingestion subsystem by a data source, each node in the chain may receive one incoming message, perform one storage operation, and transmit one outbound message (either a write request or, in the case of the tail node, a write acknowledgement). Upon receiving the write acknowledgement from the tail replication node, in some embodiments the ingestion subsystem may provide a response to the data source that submitted the data record, indicating that the data has been added or ingested to the stream.

Replication chains 955A and 955C each comprise three replication nodes in the example scenario depicted in FIG. 9, while replication chain 955B comprises two replication nodes. In individual ones of the illustrated replicas chains, different nodes may be designated as head nodes and tail nodes. For replication chain 955B configured for partition Sp-Pq, node 906Q is designated as the head node configured to receive write requests WReq2 from the SMS ingestion subsystem, and node 906B is designated as the tail node configured to transmit write acknowledgements WAck2 to the ingestion subsystem. Replication chain 955C is configured to store data records for two partitions of different streams—partition Sj-Pq and Sa-Pb. As a result, it may be the case in some embodiments that records of Sj-Pq and Sa-Pb may be interleaved with one another on the storage devices 910 being used. For replication chain 955C, node 906L on storage server 904B is the head node, configured to receive write requests WReq3 of partitions Sj-Pq and Sa-Pb from the ingestion subsystem, while node 906C at storage server 904A is the tail node responsible for sending write acknowledgements WAck3 to the SMS ingestion subsystem. Replication nodes that are currently designated neither as head nodes nor as tail nodes, such as replication node 906K or 906R, may be referred to as intermediate nodes of their replication chains in various embodiments. In some embodiments, a given replication node may serve a plurality of roles—e.g., it may be a head node for one partition, a tail node for another partition, and/or an intermediate node for a different partition. As mentioned above, for some partitions a replication chain comprising only a single node may be configured, combining the head node functionality (receiving the initial write request for a data record from the SMS ingestion subsystem) and the tail node functionality (transmitting a write acknowledgment to the ingestion subsystem after the required number of replicas are generated).

In the embodiment depicted in FIG. 9, a number of multi-tenant resources may be used, e.g., resources may be shared by several partitions, either of the same stream or of different streams. For example, a given storage server 904 may comprise a host or other computing device whose processors, memory and/or storage devices may be shared by several replication nodes 906. Similarly, a given storage device 910, such as any of devices 910A-910F, may be used to store data records of more than one partition (which may result in interleaving records of different partitions). Furthermore, as indicated above, a given replication node (e.g., a process or thread) may be configured to store replicas of data records of more than one stream. In at least some embodiments, the chain manager 901 may be responsible for deciding, e.g., at stream initialization time, IRC registration time and/or in response to dynamic repartitioning decisions, how best to share a limited set of resources (storage server hosts, storage devices, and replacement nodes) among the various partitions of one or more data streams. In some environments, the resources available for the replication chains may vary in their capabilities, further increasing the complexity of the chain manager's mapping responsibilities—e.g., some storage servers (such as 904C) may have more local storage devices 910 than others (such as 904A and 904B). The available storage devices 910 may differ in performance, size, or even storage technology (e.g. SSDs may be available at some storage servers, while only rotating disk-based devices may be available at others). In at least one embodiment, some SMS clients may wish to utilize SMS storage resources in single tenant mode—e.g., some IRCs may be established with very high read performance requirements that may be best fulfilled using a single tenant mode for the corresponding partitions. In such an embodiment, a set of one or more storage nodes 906, storage devices 910 and/or storage servers 904 may be dedicated specifically to store data records of a single client. In at least one embodiment, when servicing a read request for a data record that is replicated at multiple storage servers, a load balancing algorithm may be employed at the storage subsystem. In one embodiment, for example, such a load balancer may keep track of the fraction of records that are resident in volatile memory (e.g., the main memory) at different storage servers, and attempt to direct read requests to a server where the requested data record is more likely to be in the memory rather than just in slower persistent storage. In some embodiments, persistent network connections may be established between storage servers and retrieval nodes, e.g., for push-mode or subscription based reads, and load balancing based on measurements of traffic on those persistent connections may be implemented.

In addition to generating the chain mappings 902, the chain manager 901 may also be responsible for monitoring the health status (e.g., responsiveness) of the various replication nodes 906 in at least some embodiments, and/or to configure replacement replication nodes when certain types of triggering conditions or failures are detected. In one embodiment, a respective node manager 925 may be instantiated at each storage server 904—e.g., node manager 925A at storage server 904A, node manager 925B at storage server 904B, and node manager 925C at storage server 904C. The node manager 925 may act as a local agent of the chain manager 901 in such embodiments, e.g., to monitor the health of replication nodes 906 using a heartbeat mechanism and notify the chain manager regarding health status changes, to start/stop/replace replication nodes as needed, and so on. The use of node managers 925 may help to reduce the workload that has to be handled by the chain manager 901 in such embodiments. In other embodiments, node managers 925 may not be implemented, and the chain manager 901 may perform the necessary configuration and health monitoring functions without the help of such intermediaries. The chain manager 901 itself may comprise a plurality of software and/or hardware components in some embodiments.

In at least some embodiments in which the storage devices 910 include rotating disks, the replication nodes 906 may attempt to optimize write performance using various techniques. For example, in one such embodiment, the number of disk seeks may be reduced by buffering data records (e.g., in volatile or main memory) and flushing the buffers to disk using large sequential write operations instead of smaller more random write operations. In other embodiments, non-volatile write caches may be used. In at least some embodiments, a given replication node 906 may be configured to ensure that the local replica has been saved to persistent storage before transmitting a write request to the next node in the replication chain (or in the case of the tail node, before transmitting the write acknowledgement to the ingestion subsystem).

As described earlier, retrieval subsystem nodes may receive read requests directed at a given partition from a number of stream processing applications or destinations. A retrieval subsystem node may in turn determine the replication chain configured for the requested records (e.g., by communicating with the chain manager 901 or some other SMS control subsystem component), and submit an internal read request to a selected replication node of the chain. The replication node may be selected based on any of various factors in different embodiments, e.g., based on a retrieval workload distribution policy, random selection, affinity (e.g., a retrieval subsystem node may continue to send read requests to a selected replication node as long as the node remains responsive), measured latencies (e.g., the retrieval node may record read latencies for various replication nodes of the chain and preferentially use the nodes that have the lowest read latencies), and so on. In one embodiment, retrieval nodes (e.g., processes or threads responsible for responding to retrieval requests from stream processing applications) may be implemented at the storage servers themselves—e.g., elements of the storage subsystem and the retrieval subsystem may be combined. In such an embodiment, a stream processing application may obtain network addresses of the combined retrieval/storage nodes, e.g., from the SMS control subsystem, and may submit read requests to the combination nodes.

Figure 10:
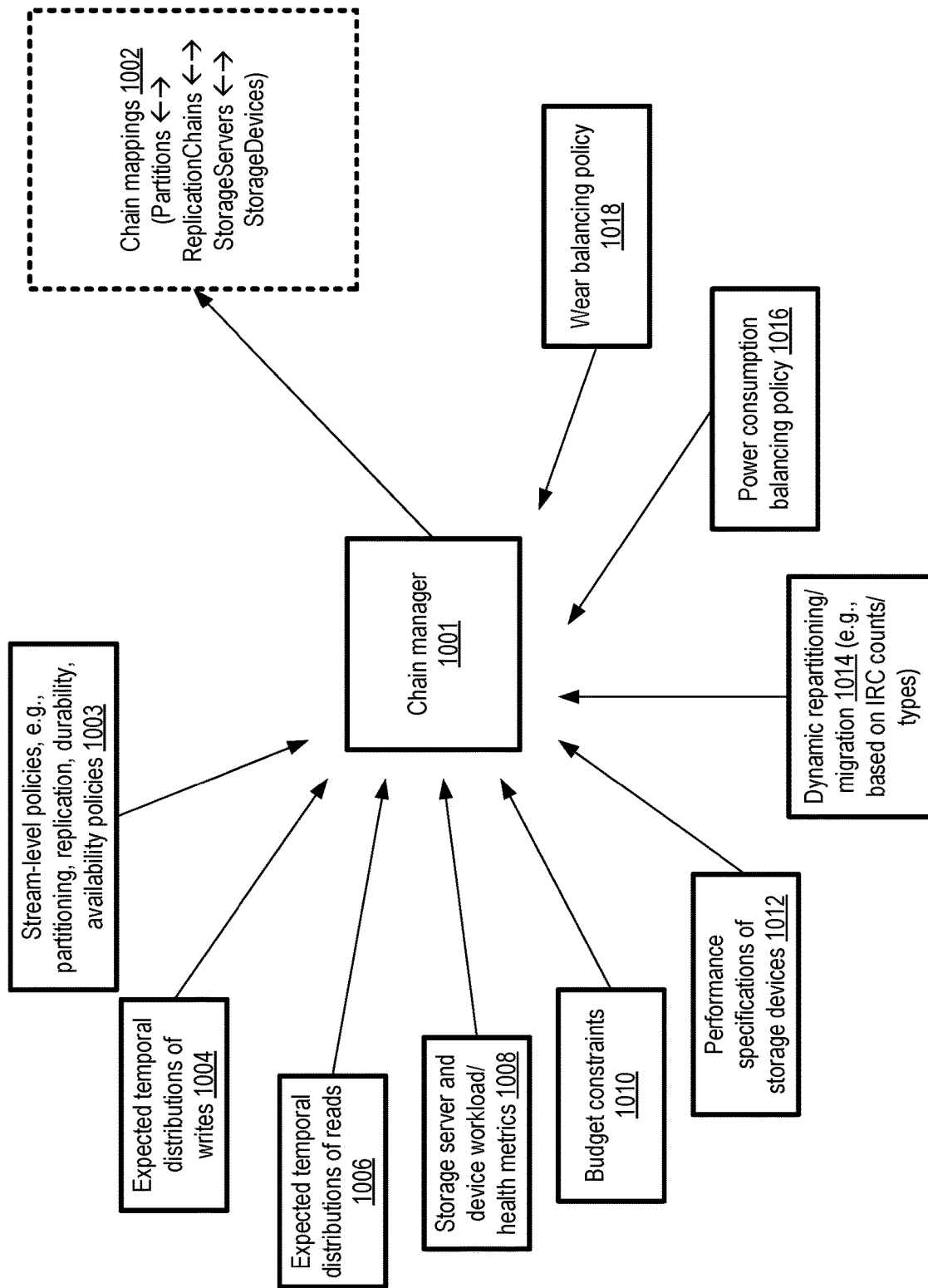
FIG. 10 illustrates example factors that may be taken into account when making chain configuration and reconfiguration decisions at a storage subsystem of a stream management service, according to at least some embodiments.

As indicated above, a number of policies, metrics and other factors may have to be taken into account by a chain manager to generate chain mappings. FIG. 10 illustrates example factors that may be taken into account when making chain configuration and reconfiguration decisions at a storage subsystem of a stream management service, according to at least some embodiments. The chain manager 1001 (which may be similar in functionality to chain manager 901 of FIG. 9) may determine an initial chain mapping in some embodiments at the time that a stream is created or initialized, and may modify the chain mapping as needed over time, e.g., in response to dynamic repartitioning or migration events 1014. To determine the initial chain mapping, in some embodiments, the chain manager 1001 may determine various applicable stream-level policies 1003, such as the overall partitioning policy, replication or durability policies, and availability policies. The stream level policies 1003 may determine, for example, the number of partitions into which the stream is to be divided, and the physical/geographical distribution of the stream's data, which in turn may lead to the configuration of a corresponding number of replication chains at selected data centers or availability containers. The expected temporal distribution of writes (record submissions) 1004, and/or the expected temporal distribution of reads (record retrievals) 1006 may also be considered when deciding various aspects of chain mappings 1002, such as the kinds of storage devices to be used for the replication chains. For example, in an embodiment in which both rotating disk-based storage and solid-state storage devices are available, the chain manager may assign different types of devices to partitions based on the anticipated write and retrieval rates. In at least one embodiment, clients may provide advance notifications regarding the types of IRCs (e.g., the performance needs of different IRCs) that are expected to be established for various partitions, which may help the chain manager to make storage selection decisions.

Metrics 1008 collected from the various storage servers and/or from the storage devices being used (including, for example, throughput, latency, error rates, health state metrics, and the like) may also play a role in determining exactly which storage servers and devices should be assigned to a replication chain in some embodiments. The chain manager 1001 may also consider the performance specifications 1012 of storage devices accessible from various storage servers when determining chain mappings 1002, e.g., when deciding how many replication nodes should be configured to store data records at the same shared storage device. In some embodiments, the chain manager 1001 may also have to consider client budget constraints 1010—e.g., it may be advisable to use cheaper commodity disks than more expensive SSDs for a given replication chain in accordance with a client's storage budget. The chain manager may have to weigh conflicting factors when making its mapping decisions—e.g., from the budget perspective, a disk-based replication chain may be preferred for a given partition, but from a write performance perspective, it may be preferable to use SSDs. In some embodiments, a number of resource usage balancing policies may be employed for storage devices or storage servers, and such policies may also influence the mappings 1002 generated by chain manager 1001. For example, power consumption balancing policy 1016 may be applied in some storage systems, in an attempt to ensure that the variation in the amount of power consumed by different storage servers or devices is kept reasonably small. Similarly, for certain types of storage device such as SSDs or other kinds of disks, a "wear-and-tear" balancing policy 1018 may be implemented in some embodiments to distribute workloads relatively uniformly among devices, with the goal of achieving similar time-to-failure or time-to-replacement metrics for the various storage devices. In addition to the factors mentioned earlier, such power usage balancing policies 1016 and/or wear balancing policies 1018 may also be taken into consideration by chain manager 1001 when selecting the specific resources to be used for various replication nodes.

In at least some embodiments, as discussed earlier, dynamic repartitioning and/or chain migration 1014 may be initiated in response to client requests (such as registration requests for IRCs, subscription requests, explicit repartitioning requests and the like) and/or in response to various automatically detected triggering conditions. The triggering conditions may for example include overload conditions detected at a replication chain or at one or more replication nodes in one embodiment. In some such scenarios, in which the chain manager 1001 monitors the health status of the various replication nodes, the chain manager itself may initiate a dynamic repartitioning that in turn leads to a change in the chain mapping. The count and/or categories of IRCs that are currently established/registered, or expected to be established/registered, with a given stream may influence the chain manager's decisions in at least some embodiments.

As described above, the chain mappings 1002 may include mappings between streams/partitions, replication chains, storage servers, and/or storage devices in various embodiments. In some embodiments, some of the mapping decisions may be made locally at the storage servers—e.g., node managers at the storage nodes may determine the specific storage devices, file systems etc. that are to be used by a given replication node, while the storage servers themselves may be selected by the chain manager 1001. In response to a repartitioning, changes may be made to any of the different mappings—e.g., a different (e.g., longer) replication chain may be assigned to a partition, a chain that was previously configured for one partition may be assigned a different set of one or more partitions, or the storage servers or devices being used for a given partition may be changed. As discussed earlier, in at least some embodiments the SMS may implement a policy in which proactive storage reconfiguration operations (e.g., migrations, increasing chain lengths, etc.) may be performed for various partitions in order to ensure that if and when additional IRCs are configured for the partition, the additional read workload can be handled without impacting the current set of stream reader applications.

Dynamic Storage Reconfiguration Examples

Figure 11:
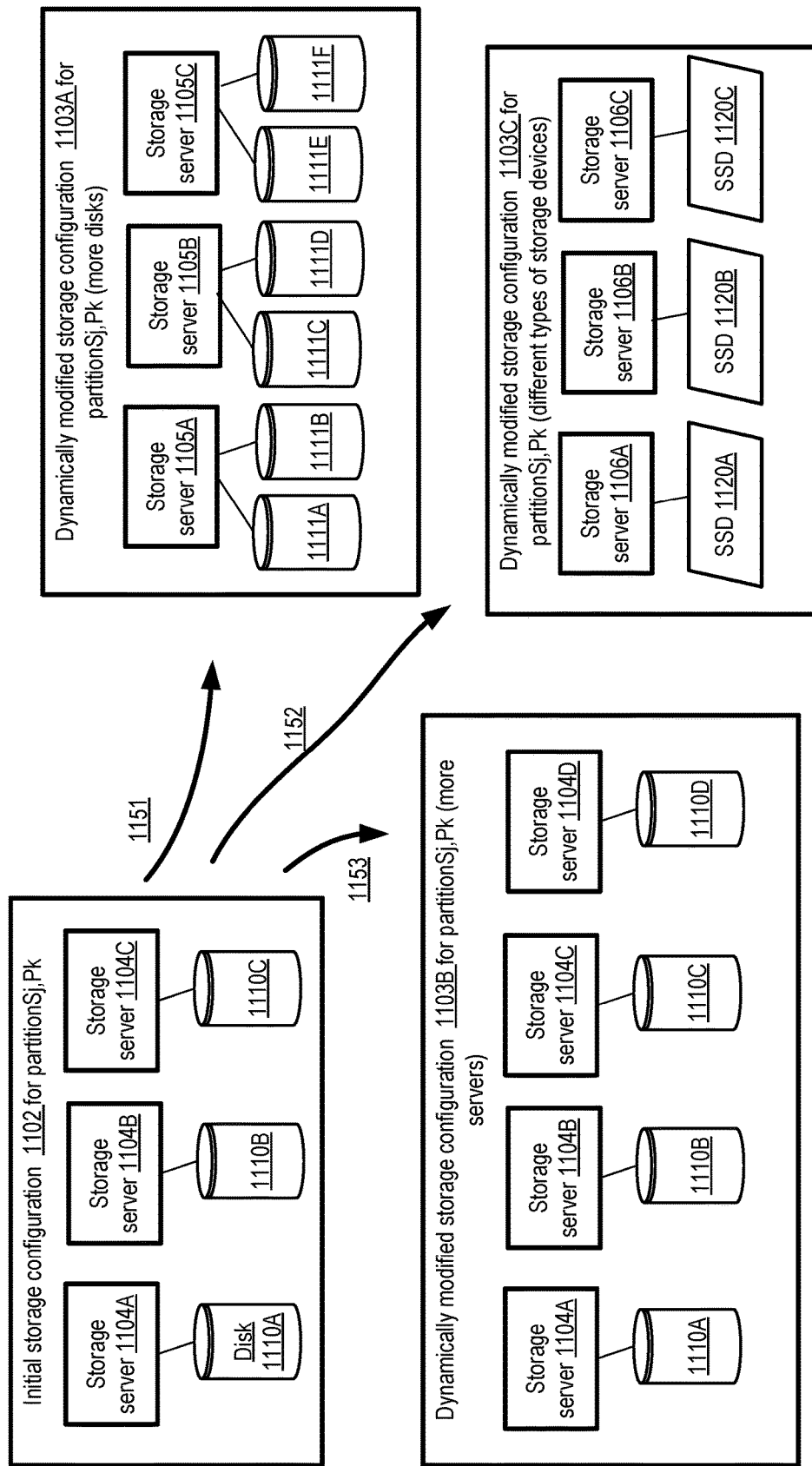
FIG. 11 illustrates examples of dynamic storage reconfiguration options of a partition at a stream management service, according to at least some embodiments.

FIG. 11 illustrates examples of dynamic storage reconfiguration options of a partition at a stream management service, according to at least some embodiments. The example reconfiguration operations shown may, for example, be triggered due to the registration/configuration of one or more IRCs in some embodiments. The configuration changes may be designated as being "dynamic" because applications that are already reading from or writing to the partition may continue to do so without noticing any impact (or at least without noticing any significant or sustained impact) to their operations in various embodiments. The impact on the current set of applications may be minimized, for example, by making the transition to the new configurations gradual in at least some embodiments—e.g., only newly written data records after some select transition point or sequence number may be written to the new configuration, while already-written records that were written prior to the transition may continue to be read from their original storage locations.

In the embodiment depicted in FIG. 11, data records of a stream partition Sj-Pk are initially stored using a configuration 1102 comprising three storage servers 1104A-1104C, each of which has a disk-based storage device 1110 (e.g., 1110A-1110C). Three alternative reconfiguration operations 1151, 1152 and 1153 are shown by way of example. As mentioned earlier, in some embodiments, a network-accessible storage service, such as a block storage service or an object storage service, may be used for storing some or all of the partitions of a given stream. In at least some embodiments, remote storage devices (such as disks 1110) may be accessed from the storage servers via a network. In reconfiguration operation 1153, dynamically modified storage configuration 1103B comprises an addition storage server 1104D, which also has the same type of storage device as servers 1104A-1104C. Thus, in this relatively straightforward type of configuration change, additional computing and storage resources of the same capabilities that were being used earlier may be deployed.

In a second alternative modification approach corresponding to operations 1151, the data records of the Sj-Pk partition may (gradually) be moved to a different collection of storage servers 1105A-1105C, each of which has more disks than in the initial configuration 1102. In the depicted example, each storage server 1105 of configuration 1103A may have double the number of disks than the original servers 1104 did—e.g., a total of six disks 1111A-1111F may now be available for the data records of the partition, thereby potentially supporting higher read rates and read throughputs.

In a third alternative modification approach corresponding to operations 1152, the data records of the Sj-Pk partition may (gradually) be moved to a collection of storage servers 1106A-1106C of configuration 1103C, each of which has solid state storage devices (SSDs) 1120 (e.g., SSDs 1120A-1120C) instead of or in addition to disk storage. The SSDs may for example support very different read and write rates than the disks 1110 or 1111 shown in FIG. 11. Note that the computing capabilities of the storage nodes 1105 and 1106 may also differ from the computing capabilities of the initial configuration's storage nodes 1104 in at least some embodiments. In at least some embodiments, combinations of the reconfiguration approaches 1151, 1152 and 1153 may be used—e.g., the number of storage nodes, the number of storage devices and the type of storage devices used to store the data records of a given partition may all be changed in a single reconfiguration operation if desired. A chain manager similar to that discussed above in the context of FIG. 9 and FIG. 10 may be responsible in various embodiments for making the decisions as to the specific type of reconfiguration operation to be performed, and for ensuring that existing readers/writers of the partition continue to be served at acceptable performance levels during and after the transition. In some embodiments and for some types of reconfigurations, when a storage reconfiguration decision is made, such as one which involves adding storage devices or storage servers, the partition/stream records that have already been stored may not necessarily be copied or moved; instead, the new configuration may be used going forward for newly-arriving records. In other embodiments, at least some existing records may also be moved and/or copied as part of a storage reconfiguration.

Figure 12:
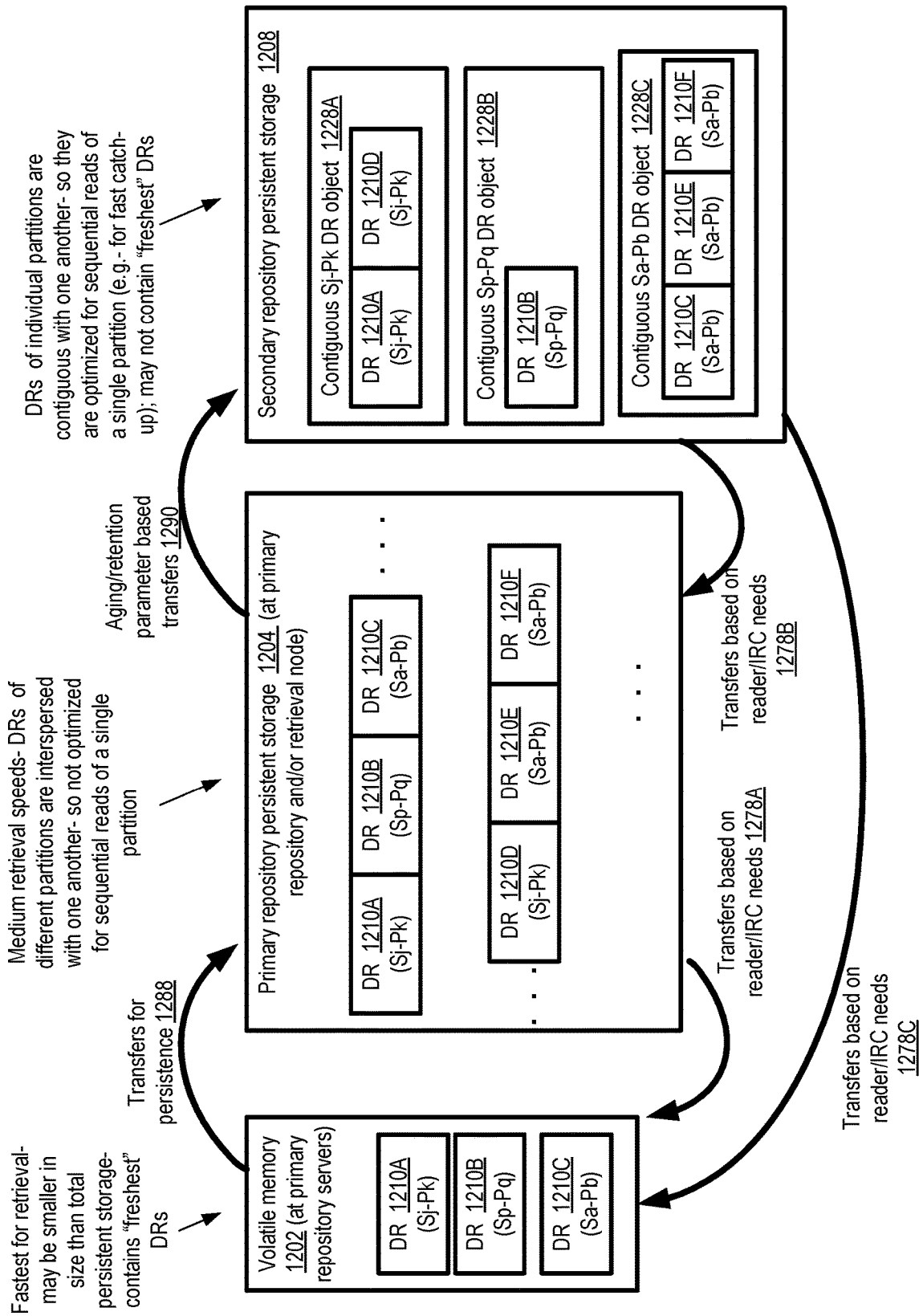
FIG. 12 illustrates example categories of storage from which the data may be retrieved on behalf of clients of a stream management service, according to at least some embodiments.

Example Categories of Storage Devices from which Stream Records May be Retrieved FIG. 12 illustrates example categories of storage from which the data may be retrieved on behalf of clients of a stream management service, according to at least some embodiments. In the depicted embodiment, stream data records that have been written to an SMS may potentially be retrieved from at least three types of sources: volatile memory 1202 (e.g., at storage servers or hosts being used for a primary repository of the SMS), persistent storage 1204 at a primary repository of the SMS, and persistent storage 1208 at a secondary repository of the SMS. The data records 1210 (e.g., DRs 1201A, 1210B and 1210C of partitions Sj-Pk, Sp-Pq, and Sa-Pb respectively) may be present in volatile memory at the storage servers of the primary repository of the SMS (where they may have been transferred from the ingestion subsystem), e.g., before they are made persistent at storage devices 1204 in the depicted embodiment via transfers 1288. The default path taken by the data records to the persistent storage 1204 may pass through the volatile memory of the storage servers in at least some embodiments, so the freshest or most recent writes to the stream may often be found in volatile memory. Of course, in at least some embodiments, the total amount of volatile memory available at the storage servers of the primary repository may be smaller than the total amount of persistent storage 1204, so only a subset of the data records that are present in the primary repository may be accessible from the volatile memory. The retrieval speed and bandwidth capacity of the volatile memory 1202 may be much greater than the retrieval speed and bandwidth capacity of the primary repository persistent storage 1204 in at least some embodiments.

In the depicted embodiment, data records of different partitions may be interleaved with one another at the primary persistent storage 1204, e.g., because records of the different partitions are written as soon as possible after they are received from the ingestion subsystem. Thus, for example, DR 1210A of partition Sj-Pk may be written next to DR 1210B of partition Sp-Pq, DR 1210B may be followed by DR 1210C of partition Sa-Pb, and so on in the primary repository. The interspersed/interleaved manner in which the DRs are written at the persistent storage 1204 of the primary repository may not be optimal for sequential access of all the records in a particular partition in various embodiments in which rotating disk-based devices are used, because the space occupied by records of other partitions may have to be traversed to read consecutive records of a given partition.

In the depicted embodiment, based on one or more criteria such as age (time elapsed since they were written, or number of new records that have been written to the partition since they were written), a retention period parameter which may be set by clients, and so on, data records may be copied or moved from the primary repository to persistent storage 1208 at a secondary repository. In one embodiment, the DRs may be rearranged in the transfers 1290 to the secondary repository, so that records of a given partition are stored contiguously in the secondary repository. Thus, for example, in one embodiment a number of data records of partition Sj-Pk that are present in the transferred portion may be combined into object 1228A, arranged in sequence number order within the object in the depicted embodiment. Similar per-partition sequentially ordered objects 1228B and 1228C may be stored for various other partitions such as Sq-Pq and Sa-Pb, each such object comprising some number of DRs of a single partition that may have accumulated at the primary persistent storage 1204 since the last transfer to the secondary repository in various embodiments. Because of the rearrangement of the DRs on a per-partition and sequence-number-order basis, it may at least in some cases (depending for example on factors such as the specific types of storage devices used at the two repositories, the extent of interleaving at the primary repository etc.) be possible to read a set of records of a given partition faster from the secondary repository than to read the same records from the primary repository. Accordingly, in some embodiments, the secondary repository may be used for some fast catch-up operations of stream processing applications that have started lagging behind the writes to the partitions whose records are to be processed. In some embodiments, different data models may be used for storing the stream data at the different repositories—e.g., binary objects using a particular encoding algorithm may be stored at the secondary repository, while a different encoding algorithm (or no encoding) may be used at the primary repository.

Note that because there may be respective delays between the time that a given DR 1210 is written to volatile memory 1202, the time that the same DR is written to primary persistent storage 1204, and the time that the same DR is transferred to the secondary repository, the most recent set of DRs among the three types of storage shown in FIG. 12 may typically be found in volatile memory, while the oldest DRs may typically be found in the secondary repository. In at least one embodiment, DRs may be transferred in the reverse direction—e.g., from secondary repository persistent storage 1208 to primary repository persistent storage (transfers 1278B), from secondary repository persistent storage 1208 to volatile memory 1202 (transfers 1278C) and/or from primary repository persistent storage 1204 to volatile memory 1202. Such reverse transfers may be performed, for example, based on the needs of stream processing applications that are unable to keep up with the writes to the partitions they are accessing, and/or for special purpose IRCs as discussed below. In one embodiment, clients of the SMS may submit requests to transfer data records of one or more partitions among the different storage device options available (e.g., in either direction), or may provide indications of threshold conditions that should be used to schedule such transfers. For example, a client may submit a programmatic request in some embodiments indicating that by default, every T1 seconds, records that have been present in the primary repository and have not yet been propagated to the secondary repository should be transferred to the secondary repository, and that after every T2 seconds, records that have been present in the primary repository for more than T3 seconds should be deleted or trimmed. The client may later modify the T1, T2 or T3 parameters programmatically in some such embodiments, and/or issue requests to transfer records meeting various criteria from the secondary back to the primary or to some other destination. In some embodiments, other categories of storage may be used for reading stream records than those shown in FIG. 12.

In at least one embodiment, the general principle of utilizing multiple repositories to handle readers that are unable to keep up with other readers (and/or with writers) may be extended to cover multiple repositories. For example, records of a given partition may be transferred/copied from a primary repository (where they are stored non-contiguously) to a second repository (where they are stored contiguously) based on a first criterion, then later transferred/copied from the second repository to a third repository (where they may also be stored contiguously, perhaps on different types of storage devices than the second repository) based on a second criterion, and so on. Lagging readers may be supplied data from any appropriate combination of one or more repositories to help them catch up in such embodiments. For example, two lagging readers R1 and R2 may first both be provided records from the second repository, and then if R2 starts lagging sufficiently behind R1, at some point R2 may be supplied with records from the third repository. Later in this scenario, if R2 catches up with R1, R2 may once again be able to read from the second repository, and so on. Note that in addition to helping lagging readers, additional repositories may of course also increase the overall bandwidth capacity of the SMS to support reads—e.g., if the primary repository by itself is capable of supporting N concurrent readers/subscribers in one embodiment, the total number of supportable readers may go up to (say) 1.5N with a second repository. As indicated elsewhere, some readers may not have as strict write-to-read propagation delay requirements as others, and so it may be possible to provide data records for such readers from non-primary repositories in at least some embodiments. In at least some embodiments, a configurable fan-out fleet (e.g., a tree or directed graph) of repositories may be set up. Clients may be able to programmatically indicate the topology of repositories they wish to employ for their streams, the criteria to be used to move data records from one repository to another, the criteria to be used to select which repository should be used for a given lagging reader, and so on in various embodiments.

Proactive Reconfigurations Triggered by IRC Registration

Figure 13:
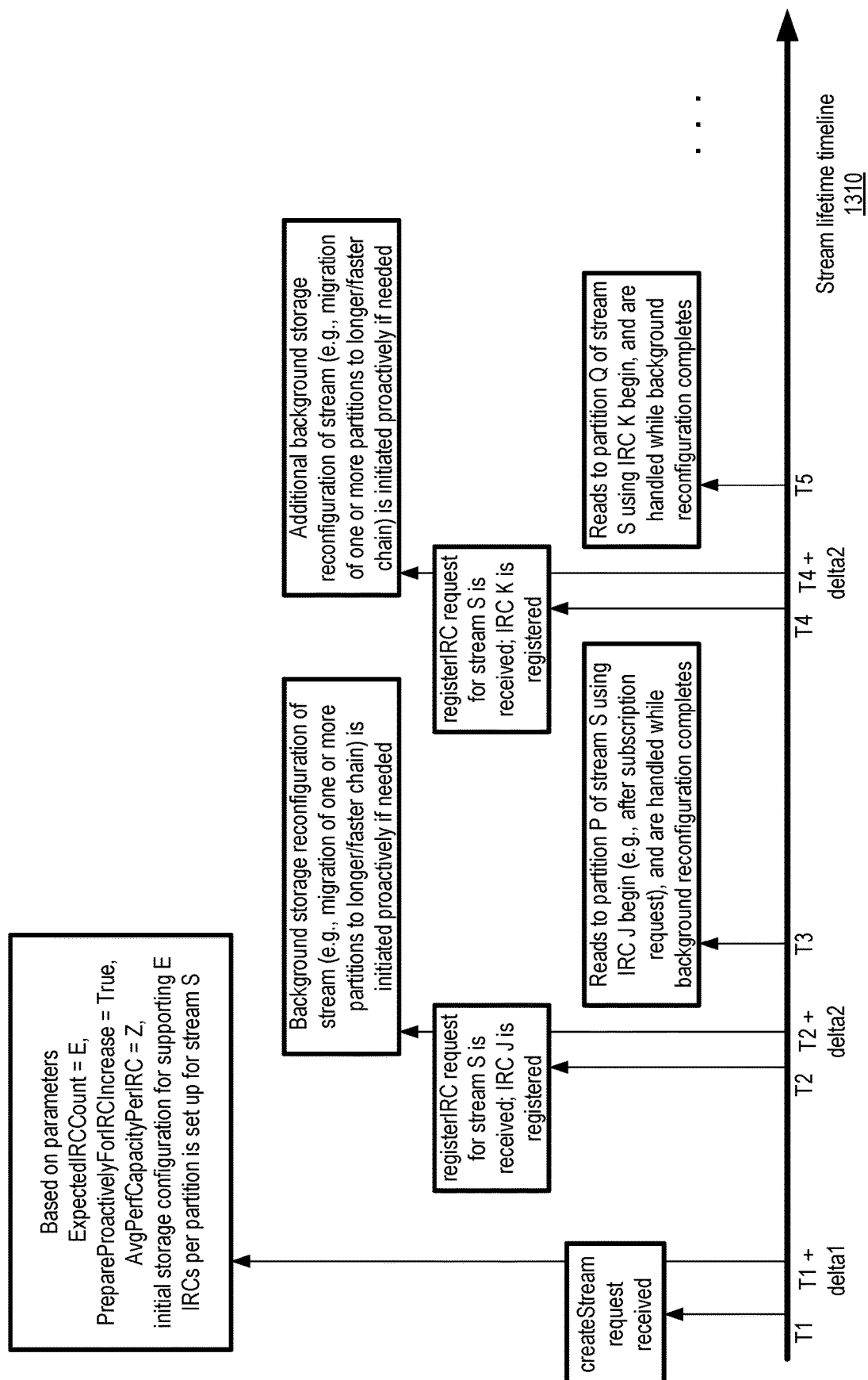
FIG. 13 illustrates example events along a timeline representing a lifetime of a stream with which isolated read channels may be associated, according to at least some embodiments.

In some embodiments, storage reconfiguration operations may be initiated when additional IRCs are configured or registered at the SMS, e.g., in an attempt to ensure that the performance capabilities of a given stream or partition can keep up with demands of potential future IRCs. FIG. 13 illustrates example events along a timeline representing a lifetime of a stream with which isolated read channels may be associated, according to at least some embodiments. At time T1 along stream lifetime timeline 1310, a request to create a stream may be received at the SMS control plane in the depicted embodiment. The request may, for example, include a number of parameters including an initial number of partitions to be established in at least some embodiments. Several parameters or settings (some of which may be provided by the SMS client submitting the createStream request) may be used to determine the initial storage configurations for the partitions of the new stream S in the depicted embodiment shortly after the createStream request is received, e.g., at time T1+delta1. For example, an ExpectedIRCCount parameter may indicate the average number of IRCs that are expected to be associated with S, an AvgPerfCapacityPerIRC parameter may indicate the average performance capacity or limit per IRC to be provisioned, and the PrepareProactivelyForIRCIncrease parameter may be set to "True" in the depicted embodiment, indicating that each time a new IRC is registered/associated with S, a proactive configuration change (which may be performed as a background or low priority operation so as not to impact current readers/writers) should be initiated.

At time T2, a RegisterIRC request may be received at the SMS control plane, indicating that a new IRC is to be associated with the stream S that was created in response to the createStream request. In response, metadata indicating association of a newly created IRC J with stream S may be stored at time T2+delta2. In addition, a background storage reconfiguration of S (e.g., a migration of one or more partitions to a longer chain or a faster set of storage devices, similar to some of the reconfigurations shown in FIG. 11) may be initiated, in effect preparing the stream for additional IRCs (beyond IRC J) that may be set up in the future. At time T3, reads to a partition P of stream S using IRC J may begin (e.g., after a subscribeToPartition request is received, indicating stream S and partition P as the target) in the depicted example scenario. Note that the resources already set aside for stream S prior to T2 may be sufficient for handling the workload expected from IRC J—the reconfiguration may be proactively scheduled to handle work associated with potential additional IRCs because of the PrepareProactivelyForIRCIncrease parameter setting in the depicted example.

A similar pattern may be repeated in some embodiments when additional IRCs are configured. E.g., at time T4, another RegisterIRC request targeted to stream S may be received at the SMS control plane. In response, metadata indicating association of a newly created IRC K with stream S may be stored at time T4+delta2. In addition, another background storage reconfiguration of S (e.g., a migration to a longer chain or a faster set of storage devices, similar to some of the reconfigurations shown in FIG. 11) may be initiated, in effect preparing the stream S for additional IRCs (beyond IRC K) that may be set up in the future. At time T5, reads to a different partition Q of S (or the same partition P) using IRC K may begin (e.g., after another subscribeToPartition request is received) in the depicted example scenario. In at least some embodiments, such proactive reconfigurations may not necessarily be performed every time a new IRC is registered; instead, for example, they may be performed whenever the total number of registered IRC increases by some number N since the last time such a reconfiguration was initiated. Other variants of the proactive reconfiguration scheme illustrated by way of example in FIG. 13 may be used in some embodiments. In some embodiments, an IRC registration request may indicate the specific partition with which the IRC is to be associated, and not just the stream. In at least one embodiment, an SMS client may indicate, via a programmatic interface, preferences indicating the kind of proactive reconfigurations (if any) to be performed for a given stream. In one embodiment, proactive reconfigurations of the kind shown in FIG. 13 may not be performed.

Independent Per-IRC Throttling Example

Figure 14:
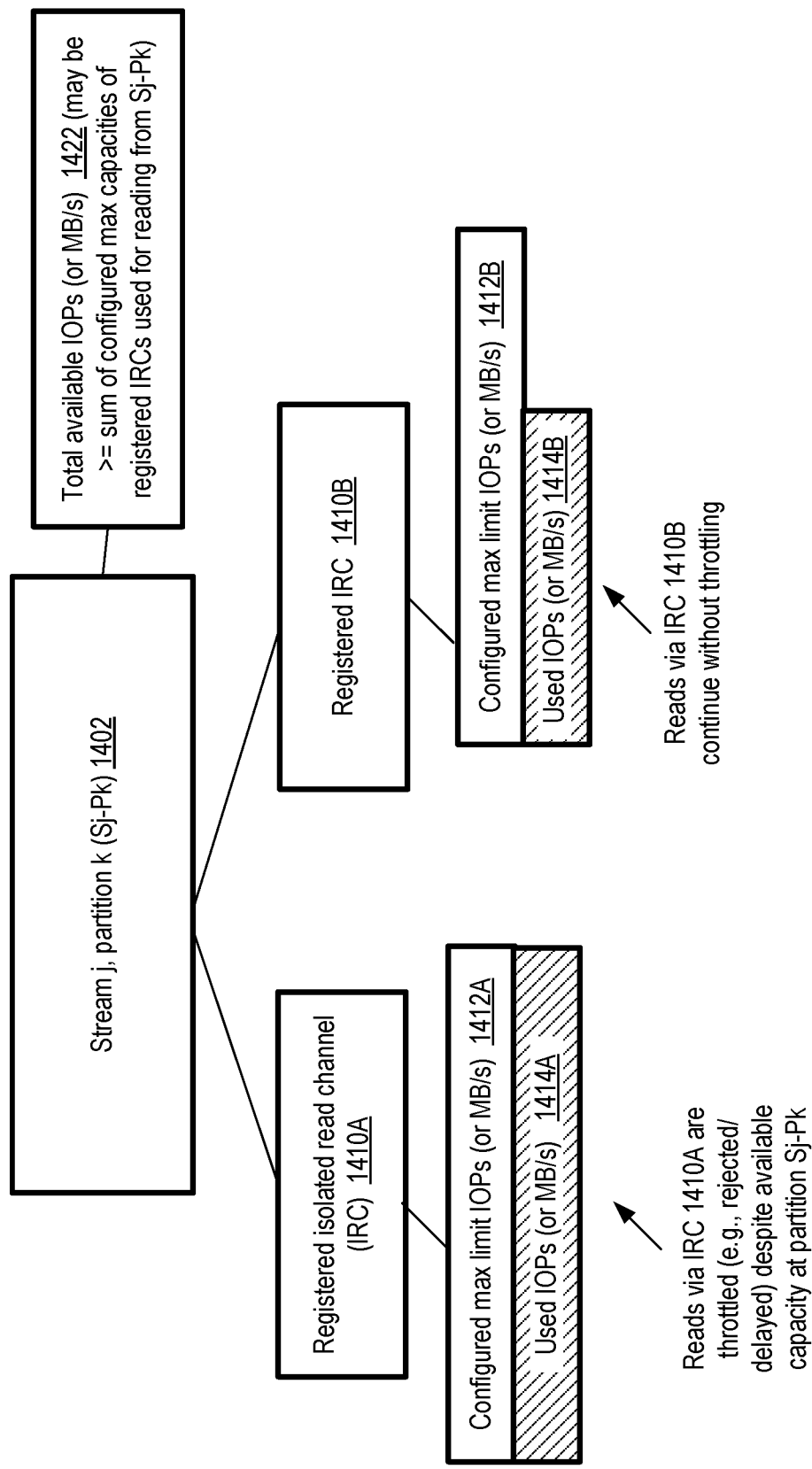
FIG. 14 illustrates an example of the use of channel-level throttling of read operations at a stream partition, according to at least some embodiments.

FIG. 14 illustrates an example of the use of channel-level throttling of read operations at a stream partition, according to at least some embodiments. In the depicted embodiment, a particular stream partition Sj-Pk (partition K of stream J) being managed at an SMS may have a total performance capacity 1422. The performance capacity may be expressed in any of various units, such as read I/O operations per second (IOPS), megabytes per second, or some combination of such units in different embodiments.

As shown, two isolated read channels (IRCs) 1410A and 1410B may be registered or associated with Sj and used to obtain data records of partition Pk (e.g., via subscription APIs) in the depicted embodiment. The configured maximum read performance capacity or limit of IRC 1410A may be 1412A, expressed in the same units as the performance capacity of Sj-Pk 1422. The currently used capacity of IRC 1410A may be 1414A, e.g., as measured over a short recent time interval, which may be very close to the maximum limit 1412A in the depicted example scenario. The configured maximum read performance capacity or limit of IRC 1410B may be 1412B (which may be different from 1412A), also expressed in the same units as the performance capacity of Sj-Pk 1422. The currently used capacity of IRC 1410B may be 1414B, e.g., as also measured over a short recent time interval, which may not be very close to the maximum limit 1412B. Note that the sum of the limits 1412A and 1412B may be less than the capacity 1422 of partition Sj-Pk in the depicted example.

Throttling decisions, e.g., decisions to delay or defer additional reads, or to reject read requests temporarily, may be made independently for the two IRCs in the depicted embodiment, and at least in some cases may be made regardless of the extent to which the partition as a whole has unused read bandwidth available. Thus, for example, because of how close IRC 1410A's current usage is to the limit set for IRC 1410A, reads directed to Sj-Pk via IRC 1410A may be throttled, despite the possibility that Sj-Pk may be capable of handling more reads. The decision to throttle reads via IRC 1410A may be made independently of any other IRC's status, or the status of the targeted partition as a whole in the depicted embodiment. In contrast, reads via IRC 1410B may not be throttled, and the decision to do so may also not take any other IRC's throttling status or current usage levels into account. Note that at least in some embodiments, the granularity at which decisions to throttle reads are made may be such that over short time intervals, the rate at which data is transferred may sometimes (temporarily) exceed the maximum limit. For example, consider a scenario in which throttling decisions for an IRC being used to access Sj-Pk are made every 100 milliseconds, and the maximum permitted rate is 2 MB/sec. In one given 100 millisecond period, if enough data records are available to transfer at 1 megabyte (which corresponds to 10 MB/sec), the SMS may in some embodiments transfer that 1 megabyte, and then zero megabytes of data may be transferred over the next 400 milliseconds to bring back the average transfer rate over the 500 milliseconds to the designated limit of 2 MB/sec.

Isolated Read Channel Categories

As mentioned earlier, in at least some embodiments an SMS may support several different categories of isolated read channels, with the categories differing from one another along any of several dimensions such as performance limits, details of the back-end configurations to be used for the data, special types of functionality, cost to the SMS customers on whose behalf the IRCs are set up, and so on. A client of the SMS may indicate, when requesting establishment or registration of an IRC, the particular category of IRC desired in such embodiments. FIG. 15 illustrates example factors that may be used to define categories of isolated read channels that may be configured at a stream management service, according to at least some embodiments.

In some embodiments, respective IRC categories called real-time IRCs and non-real-time IRCs may be distinguished based on propagation delay requirements 1511. Real-time IRCs may be used for applications which are intended to process stream data records within a very short time after the records are written to the stream in the depicted embodiment, e.g., ideally, a given data record may be provided to an application within some small number of milliseconds of the time it is written. The time interval between the write of a data record and the corresponding read may be referred to as a propagation delay in some embodiments, and real-time IRCs may be referred to as short-propagation-delay IRCs in such embodiments. Non-real-time IRCs, which may be referred to as medium-propagation-delays-acceptable IRCs in some embodiments, may be intended to read and process stream data records with less stringent propagation delay requirements than real-time IRCs in the depicted embodiment. The acceptable propagation delay thresholds that distinguish real-time IRCs from non-real-time IRCs may differ in different embodiments. In at least some embodiments, the SMS may determine target specific storage configurations for partitions in order to be able to meet the requirements of real-time IRCs—e.g., a configuration whose average read response time is less than X milliseconds, and maximum response time is less than Y milliseconds, may be used for a real-time IRC. In at least some embodiments, reads for a real-time IRC may be fulfilled primarily from volatile memory, so a configuration that is able to retain a sufficient number of data records in volatile memory may be set up for a real-time IRC. Non-real-time IRCs may also have associated target storage configurations in some embodiments.

In some embodiments, one or more IRC categories may be defined based on the storage device type 1515 (e.g., rotating disk versus solid state disk vs. volatile memory) and/or the repository type that may be used (or has to be used, as per client-specified preferences) for reads performed via the IRC. For example, some SMS customers may only be interested in analyzing stream data records that have been written within the immediately previous T seconds at any given time, and may rely on such records being present in volatile memory, so they may opt to utilize memory-only IRCs for their applications. Other applications may not need to access data for several minutes or even hours after it is written to a stream, and so may utilize IRCs that only access secondary repositories of the kind described earlier.

In one embodiment, some IRC categories may be defined based on the level or type of virtualization 1517 being used for the computing devices that store stream data and/or the devices at which retrieval nodes are implemented. Some IRC categories may utilize SMS nodes running as processes within operating systems instantiated on physical hardware (without using virtual machines), others may use special purpose high performance "bare metal instances", others may utilize specific sizes of virtual machines defines at a virtualized computing service (e.g., "large", "medium" or "small" virtual machines), and so on.

In some embodiments, tenancy type 1519 may be used to define IRC types, e.g., based on whether the front-end or back-end resources to be used for satisfying read requests are to be configured in single-tenant or multi-tenant mode. If it is acceptable that read workloads of several different clients/customers are processed using a given front-end or back-end node, a multi-tenancy IRC may be used in some embodiments; in contrast, if only workloads of a single client or customer are to be processed at a given node, a single-tenancy IRC may be employed. One or more special-purpose IRCs 1521 may be defined for specific use cases in the depicted embodiment, such as IRCs intended to be used specifically for fast catch-up with the help of sequential reads from secondary repositories. In one embodiment, an SMS client may request that a client-customized IRC category 1523 be created and supported, e.g., at least for use for multiple applications of that client. A template for such a custom IRC type may be created using programmatic interfaces supported by the SMS (or as a result of the client making modifications to an existing IRC until the IRC attains the desired set of properties) in some embodiments. After the template has been created, it may be registered at the SMS in some embodiments. The SMS customer on whose behalf such a custom IRC category was created may either make the IRC category visible to other customers in some embodiments, so that other customers may also register instances of the IRC if desired, or use the custom IRC for only the customer's own applications. In at least some embodiments, IRCs of several different categories may be established/registered for the same stream, and used by different applications to read from one or more partitions of the stream. Thus, one application may be reading from one or more partitions of a given stream using a real-time IRC, while another application may be reading from one or more partitions (including, potentially, the same partitions which are being read using a real-time IRC) using a non-real-time IRC. In at least one embodiment, a category of IRC may be defined based at least in part on the use of filtering criteria or predicates—e.g., an IRC that is intended to only be used for reading data records that meet a particular timestamp range (relative to the current time when the data records are pushed) may be created and used in some embodiments. In some embodiments, multiple tiers of IRCs may be defined based on respective performance limits—e.g., based on maximum propagation delays of T1, T2 and T3 milliseconds, three categories of IRCs may be defined, or based on maximum supported read transfer rates of M1, M2 and M3 megabytes/second three categories of IRCs may also or instead be defined. In various embodiments, the costs or billing rates associated with using different types of IRCs (and/or for reading from different types of repositories used for stream data) may differ.

When a request to register a given category of IRC on behalf of a client is received at the SMS, in at least some embodiments SMS control plane components may look up a targeted acceptable storage configuration for that IRC category, and verify that the stream partitions whose records are expected to be read using the IRC has the appropriate configuration before allowing the registration to succeed. Other factors than those shown in FIG. 15 may be used to define supported IRC types in some embodiments.

Figure 16:
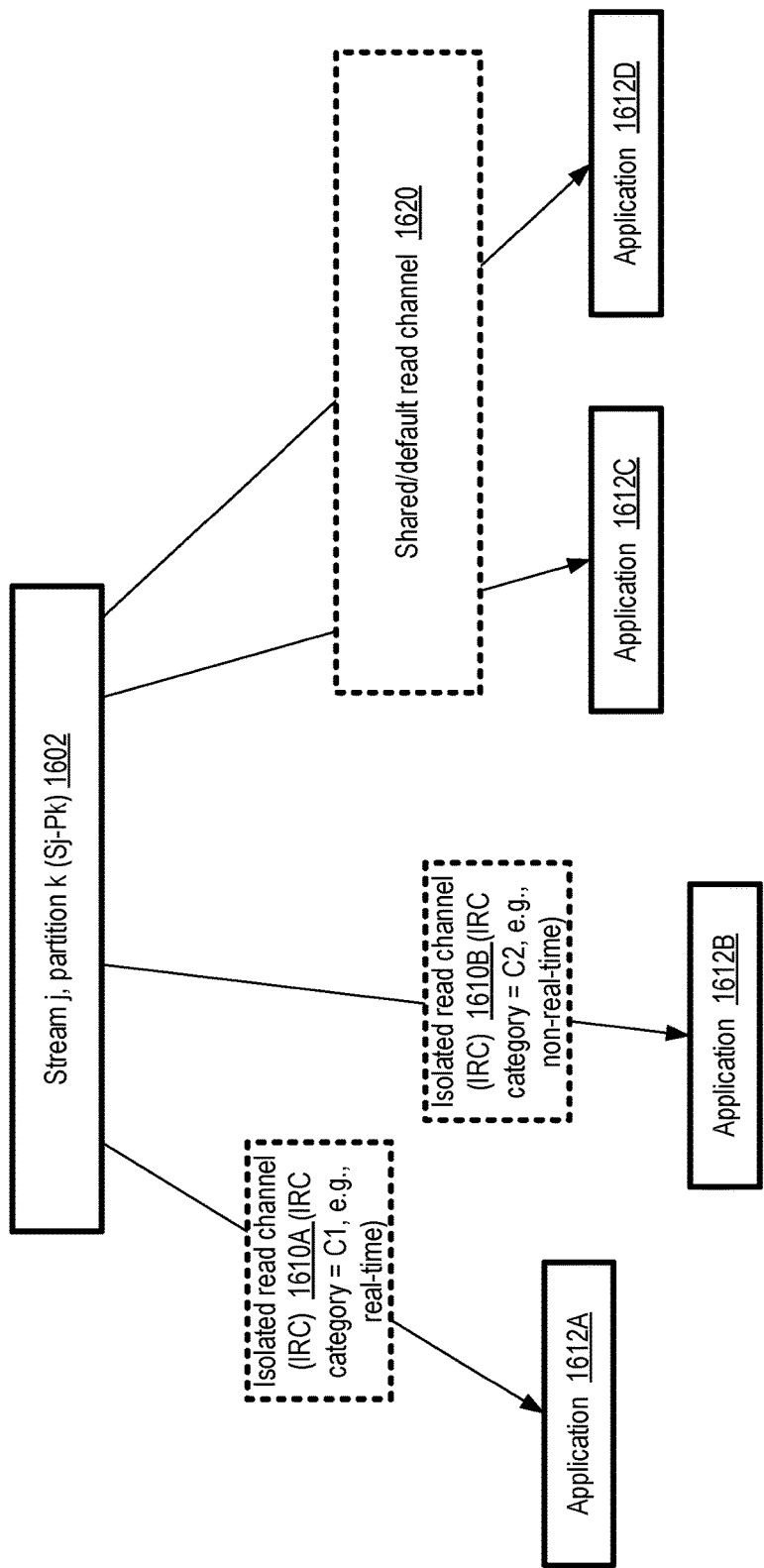
FIG. 16 illustrates an example scenario in which read channels of different categories may be configured for reading from a given partition of a stream, according to at least some embodiments.

In some embodiments in which multiple IRC categories may be supported, a number of different IRC categories may concurrently be used to access a given stream partition. FIG. 16 illustrates an example scenario in which read channels of different categories may be configured for reading from a given partition of a stream, according to at least some embodiments. In the depicted embodiment, four applications 1612A-1612D may read from the same stream partition Sj-Pk.

Application 1612A may read the data records of Sj-Pk via an isolated read channel (IRC) 1610A of a first supported category C1 (e.g., a real-time category). Application 1612B may use an IRC of a different category C2 (e.g., a non-real-time category) to read the data records of Sj-Pk. Individual ones of the IRCs 1610A and 1610B may have respective read performance limits in the depicted embodiment, which may be enforced independently of each other as discussed earlier. Applications 1612C and 1612D may not use IRCs in the depicted embodiment; instead, they may use a shared or default read channel of the kind discussed earlier. In order to be able to handle concurrent use of IRCs with potentially widely different performance needs, in some embodiments SMS components may verify that a storage configuration that is able to satisfy the read rates of the IRC with the most stringent performance requirements (among the collection of IRCs established) is set up. In one embodiment, the SMS may restrict the categories of IRCs that can be used to read (e.g., via a subscription request) with a given partition, so that for example the discrepancy between the read rates of different IRCs remains below a threshold. For example, only real-time IRCs may be permitted for reading from a given partition during a given time interval, or only non-real-time IRCs may be permitted.

Example Programmatic Interactions

Figure 17:
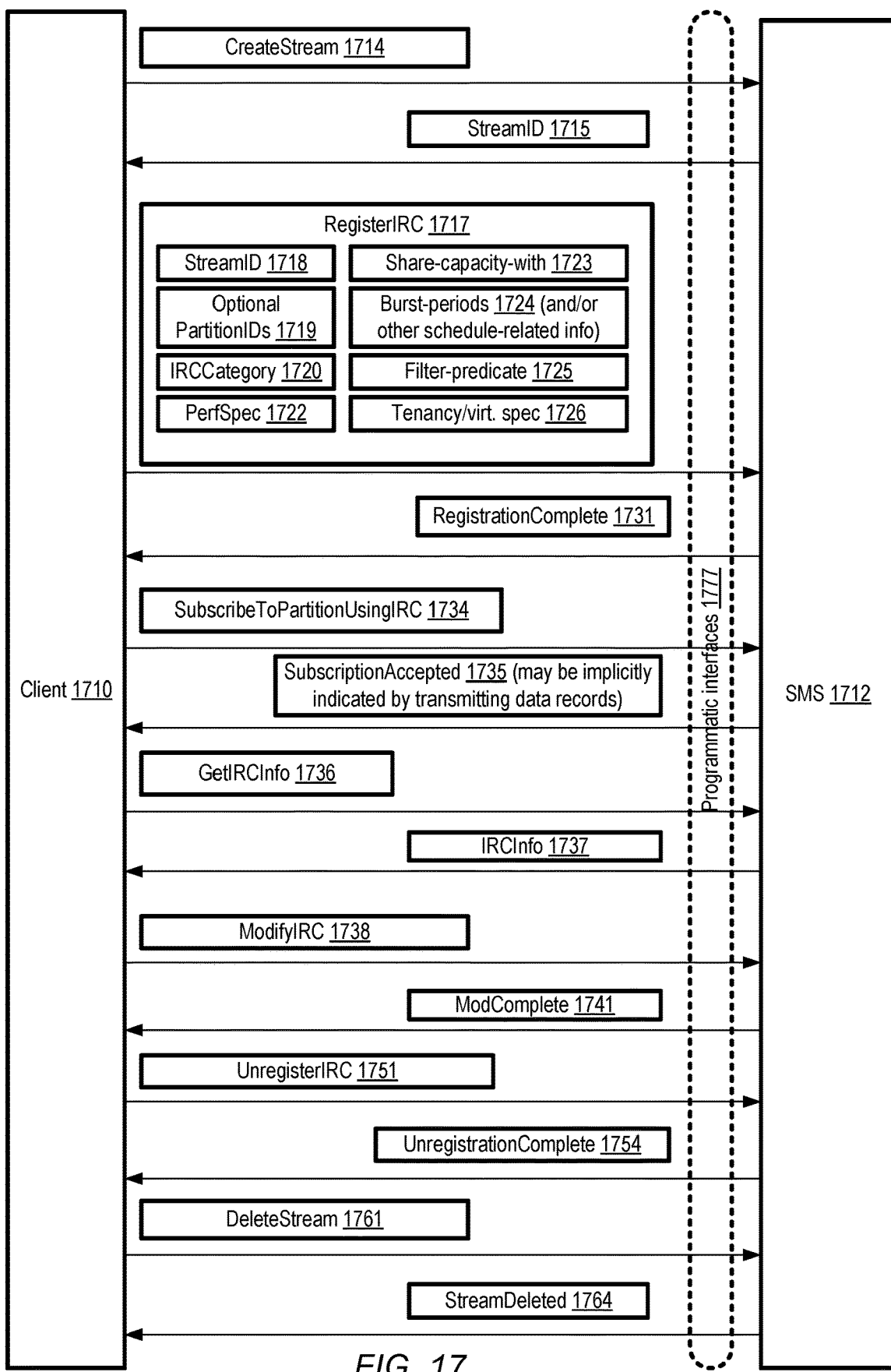
FIG. 17 illustrates example programmatic interactions associated with isolated read channels, according to at least some embodiments.

FIG. 17 illustrates example programmatic interactions associated with isolated read channels, according to at least some embodiments. An SMS 1712 (similar in capabilities and functionality to the SMS discussed in the context of FIG. 2 and other figures above) may implement one or more types of read-related programmatic interfaces 1777 in the depicted embodiment, including for example a set of APIs, a web-based console, command line tools, graphical user interfaces and the like. Using the interfaces 1777, a CreateStream request 1714 may be transmitted by a client 1710 in the depicted embodiment. A set of metadata associated with the requested stream, including for example an initial number of partitions (which may be indicated as a parameter of CreateStream), may be stored, and a message 1715 indicating an identifier (StreamID) of the stream may be provided to the client to indicate that the CreateStream, request has been processed successfully. In at least some embodiments, resources for an initial storage configuration (e.g., a configuration that can support up to M isolated read channels with an average expected read performance limit setting) may be selected/designated for the stream by the SMS at (or shortly after) the time that the stream is created.

The client 1710 may then submit a request 1717 (the RegisterIRC request) to establish and associate an isolated read channel (IRC) with the stream in the depicted embodiment. The RegisterIRC request may include a number of parameters in some embodiments, such as the identifier of the targeted stream (StreamID 1718), optional identifiers of the partition(s) (PartitionID 1719) which are intended to be accessed via the IRC, a read performance specification (PerfSpec 1722) of the IRC indicating the rates of reads (in units such as MB/sec or data records/sec) are to be supported, and so on. A category 1720 (selected from a set of supported categories such as "real-time" or "non-real-time") to which the requested IRC belongs may be indicated in one embodiment, e.g., instead of or in addition to a performance specification 1722. In one embodiment, IRC properties (which may be used to distinguish among IRC categories, as discussed above in the context of FIG. 15) may be specified explicitly, not necessarily by providing IRC category names—e.g., a parameter that indicates that a fast catch up operation is expected to be performed using the IRC may be included, even if the SMS does not define an IRC category for fast catch up operations. In at least some embodiments, the client 1710 may provide additional (e.g., optional) information about desired properties of the IRC being requested, such as an indication of a filter predicate 1725 to be used to select the data records (or portions of data records) that are to be provided via the IRC, a specification 1726 of a desired tenancy (e.g., single tenancy or multitenancy) or virtualization level of the resources to be used at the SMS to satisfy reads associated with the IRC, and so on. In some embodiments, an explicit performance specification may not be included in the RegisterIRC request; instead, for example, a default performance specification that applies to all IRCs may be used. In at least one embodiment. The read performance limits may be correlated with, or dependent upon, partition-level write rate limits enforced by the SMS. For example, in an embodiment in which an SMS imposes a maximum write rate (at the ingestion subsystem) of K megabytes/second/partition or K megabytes/second/stream, the default read performance limit per IRC may be set to K*p megabytes/second, where p is a ratio set by the SMS control plane, or p is a ratio selectable by an SMS client.

In one embodiment, a client may indicate, e.g., using a Share-capacity-with parameter 1723, one or more other clients, streams, IRCs and/or partitions whose read operations may be fulfilled using the resources that would otherwise have been used for satisfying the reads via the requested IRC, e.g., during time periods in which the data records are being read at less than the maximum permitted rate via the requested IRC. Thus, for example, if a client C1 indicates that a client C2 with an IRC IRC-k is share capacity with the requested IRC (IRC-j), and the IRC-j has a maximum read rate or read throttling initiation setting if 2 MB/sec, during a period of time in which only 1 MB/sec of data is being read via IRC-j, an additional 1 MB/sec of reads may be permitted using IRC-k for client C2, regardless of IRC-k's own current read rates during that period. In one embodiment, a client may inform the SMS, e.g., using a Burst-periods parameter 1724, that during specified time periods, the read rate via the requested IRC is expected to be higher than the average read rate (e.g., a highway traffic monitoring application may be expected to read more data during peak commute times than during late nights, so the SMS may be informed of such peak periods in advance using the Burst-periods parameter or the equivalent). In some embodiments, as mentioned earlier, more general schedule-dependent workload variation information may be provide programmatically by an SMS client, indicating for example periods when read workloads are expected to be lower than average, specifying expected maximum read workloads as a function of the time of the day or the day of the week, and so on, which may be used at the SMS in various ways. For example, the SMS may verify that the scheduled-dependent workload variation can be supported by the resources deployed, adjust resource allocations or initiate reconfigurations over time as needed, make throttling adjustment decisions, and so on. In at least some embodiments, the RegisterIRC request 1717 may be used simply to establish an association between an IRC and a stream, without including information or identifiers of the partitions whose data may be read later with the help of the IRC. Subscription requests of the kind discussed below may be used to indicate the particular partition whose records are to be read via the IRC in such embodiments.

In various embodiments, the SMS 1712 may verify that the storage configuration of the target stream (e.g., of various partitions of the stream) is capable of satisfying the performance requirements of the requested IRC (e.g., as expressed via PerfSpec 1722, or the default read capacity limits associated with IRCs) before accepting or completing the IRC registration. In at least some embodiments, the SMS may initiate one or more background or proactive reconfiguration operations at the time that the IRC registration request is received, e.g., to ensure that there is sufficient capacity not just for the currently-requested IRC, but also for some number of additional IRCs that may be established/registered in the future, as discussed in the context of FIG. 13. A registration complete message 1731 may be sent to the client in some embodiments if the IRC registration request is accepted, e.g., after any synchronous verification and/or configuration operations needed for the registration are completed, and/or after any asynchronous operations such as proactive reconfiguration operations have been initiated. Note that the asynchronous operations need not necessarily be completed before the registration completion message 1731 is sent in at least some embodiments. In some embodiments, a registration timestamp and an IRC identifier may be provided in the registration complete message.

The client 1710 may submit a subscription request 1734 in the depicted embodiment, indicating that push-mode reads of the data records of a specified partition via a specified IRC are to be initiated. The subscription request 1734 may include authorization credentials of the requesting client application in at least some embodiments (e.g., as well as identifiers of the IRC and the target partition), and the SMS may verify the validity of such credentials before accepting the subscription. In at least some embodiments, a client-side component of the SMS may select a pre-existing persistent network connection (PNC), or participate in the establishment of a new PNC, for the subscription request 1734. In response, in at least some embodiments, the SMS 1712 may provide a success indicator such as a SubscriptionAccepted message 1735 (e.g., via the same PNC that was used for the request), and/or start pushing data records of the targeted stream partition (e.g., also via the same PNC). In some embodiments, a separate SubscriptionAccepted message 1735 may not be transmitted; instead, the acceptance of the subscription request may be implicitly indicated by initiating the transmission of the data records of the targeted partition. An event-driven programming model may be employed for the subscription in some embodiments, e.g., in which respective events are detected at the client application in response to the transmission of respective data records by the SMS. In at least one embodiment, PNCs may not necessarily be employed for subscriptions. In at least some embodiments, subscription-based reads may be supported without implementing or using IRCs—e.g., subscription-based or push-model reads may be performed using shared/default read channels.

In at least some embodiments, clients may obtain status information, metrics etc. at the per-IRC level (e.g., using GetIRCInfo messages 1736, to which IRCInfo messages 1737 may be provided in response). The IRCInfo message 1737 may, for example indicate a current state of the IRC (e.g., whether it is active/in-use, idle, being created/deleted/etc.). An IRC may be deemed to be idle in some embodiments if less than a threshold number of data transfers have occurred using subscription requests (or other read interfaces) that indicated the IRC as a parameter. In one embodiment, SMS clients may be able to re-use existing IRCs that have been idle for some time period, or may not be billed for periods in which their IRCs were idle, so providing information indicating that a given IRC may be helpful to the clients. In at least one embodiment, a ModifyIRC request 1738 may be submitted to change one or more properties of an existing IRC, e.g., the IRC category or performance specification, which may in turn result in additional synchronous or asynchronous configuration/reconfiguration operations being initiated at the SMS. In response to a ModifyIRC request 1738, after the appropriate configuration operations have been completed or initiated, the SMS may transmit a modification completion message (ModComplete 1741) to the client. Clients may unregister specified IRCs using requests 1751 and/or delete streams using requests 1761 in the depicted embodiment. After the requested IRC un-registration is completed (e.g., after at least a subset of the metadata associated with an IRC is deleted), an unregistration complete message 1754 may be sent to the client in some embodiments. Similarly, after metadata associated with a stream has been deleted in response to a DeleteStream request, a StreamDeleted message 1764 may be provided in at least some embodiments. If one or more IRCs remain registered with a stream when the stream is deleted, the IRCs may automatically be deleted in some embodiments.

In some embodiments, the contents of several of the kinds of example programmatic requests shown in FIG. 17 may be combined or piggybacked in a single message. For example, a client 1710 may optionally provide information about requested IRCs, similar to the kinds of information shown in RegisterIRC request 1717 as part of a request 1714 to create a stream in one embodiment. Similarly, in at least one embodiment, a client 1710 may include the equivalent of a subscription request 1734 in a request to register an IRC, or in a request to create a stream. In various embodiments, IRC-related programmatic interactions other than those shown in FIG. 17 may be supported, and/or one or more of the types of interactions shown in FIG. 17 may not necessarily be supported.

Lagging Applications and Catch-Up Operations

As discussed above, in some embodiments, the SMS may provide data records of one or more partitions to one or more stream processing applications in a "push" mode, in which the applications do not have to poll the SMS for additional data records. As more of the data records of a given partition are read by the processing applications the SMS may be able to trim the records from at least some of the storage configurations (e.g., a primary repository) being used for the partition in various embodiments as mentioned earlier, thereby potentially freeing up resources that can be used for newer data records and/or other partitions. It may however sometimes be the case that one or more of the applications that are reading a partition via a respective subscription are unable to keep processing the records at a rate at which the SMS is able to push the data records. A number of techniques may be used in response to the detection of such slow or "lagging" applications in different embodiments; in general, from an SMS resource usage perspective it may be preferable if applications reading from a given partition do not lag too far behind the writes to the partition, or too far behind other applications in at least some embodiments.

Figure 18:
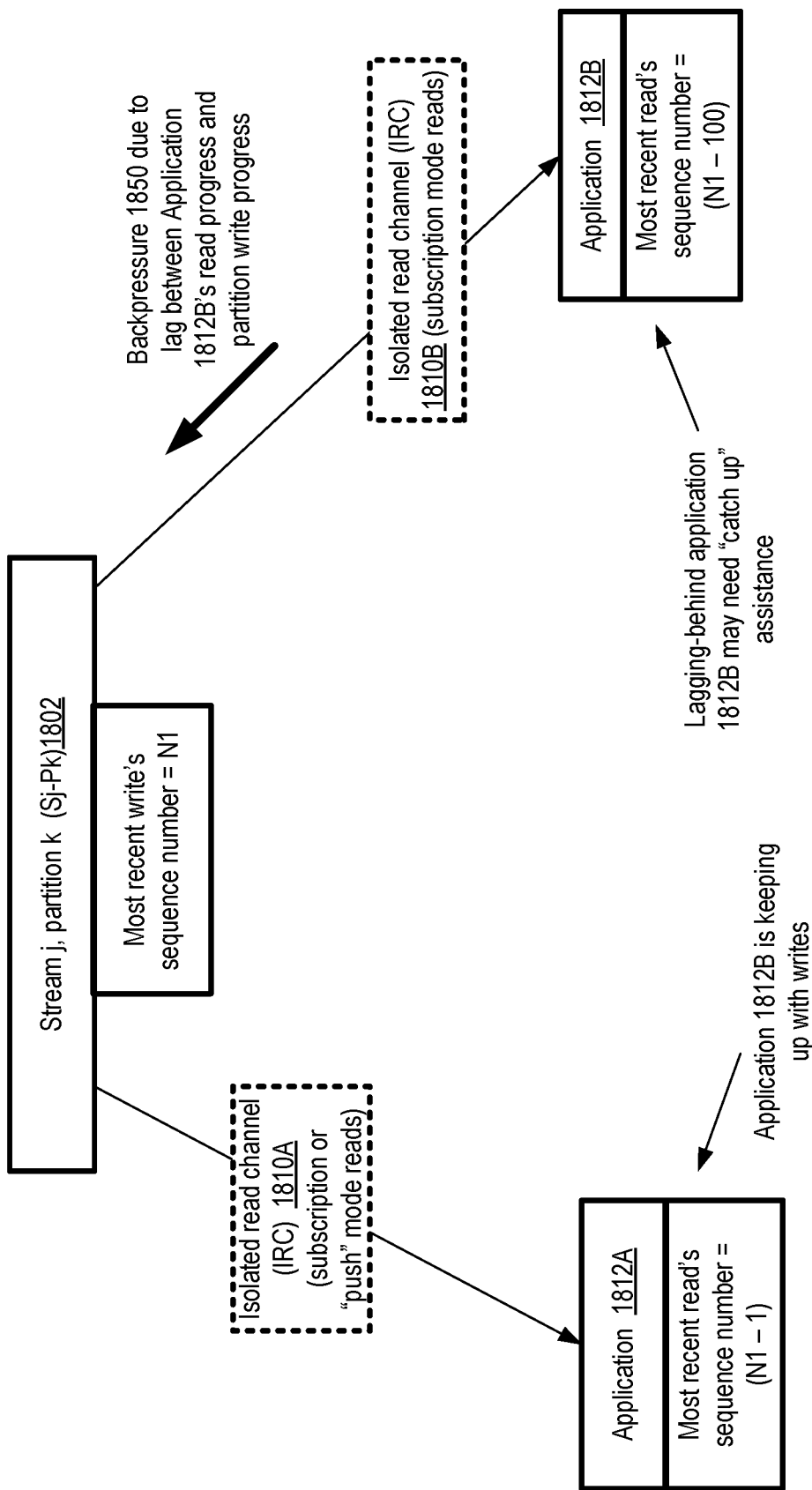
FIG. 18 illustrates an example scenario in which an application using an isolated read channel to access a stream partition may lag behind the writes to the partition, according to at least some embodiments.

FIG. 18 illustrates an example scenario in which an application using an isolated read channel to access a stream partition may lag behind the writes to the partition, according to at least some embodiments. As shown, the sequence number of the most recently-written data record at a particular partition Sj-Pk (the kth partition of stream Sj) at a point of time at which the state of the partition and its IRCs is captured in FIG. 18 may be N1. Application 1812A may be receiving data records via a first isolated read channel (IRC) 1810A, e.g., via a subscription mechanism in which the SMS transmits the records as they become available, without having to be prompted or polled by the application 1812A. Similarly, application 1812B may be receiving Sj-Pk data records via another subscription to a second IRC 1810B in the depicted embodiment.

The applications 1812A and 1812B may be performing different types of analysis or processing tasks on the data records read in, and/or they may be implemented using computing devices that differ in their computing power, memory size, etc. in the depicted embodiment. For these or other reasons, at application 1812A, the most recently read Sj-Pk data record's sequence number may be as high as (N1-1), meaning that application 1812A is keeping up reasonably closely with the rate at which data records are written to Sj-Pk. In contrast, the most recently read data record in the case of application 1812B may have the sequence number (N1-100) at the point of time depicted in FIG. 18, so application 1812B may be said to lag behind the writes to Sj-Pk (and also lag behind application 1812A). In at least one embodiment, the SMS may detect the extent to which different applications are lagging behind the writes to their targeted partitions, and provide assistance to enable the lagging applications to catch up (i.e., to reduce or eliminate the reads-to-writes lag and/or the lag relative to other applications). In some embodiments, one or more devices of the SMS (e.g., nodes of the retrieval subsystem) may be able to detect backpressure signals 1850 indicating the extent of the lag, e.g., based on the specific communication protocols being used. In at least some embodiments, an indication of how much of the transmitted data (or data that is available for transmission) remains unread by a subscribing application 1812 with respect to individual ones of the subscriptions may be obtained or determined by the SMS, which may be used to compute lags of the kind shown by application 1812B. In some embodiments, application layer networking protocols (such as HTTP/2) which support push traffic of the kind discussed above, and may provide signals of backpressure, may be employed. Note that in some embodiments, the application layer protocol that is used may be designed in such a way that backpressure (or slow readers in general) are handled at the application protocol, and do not cause underlying lower-layer connections to be disrupted/dropped when some stream processing application is unable to keep up with the writes to the stream partition being read.

Figure 19:
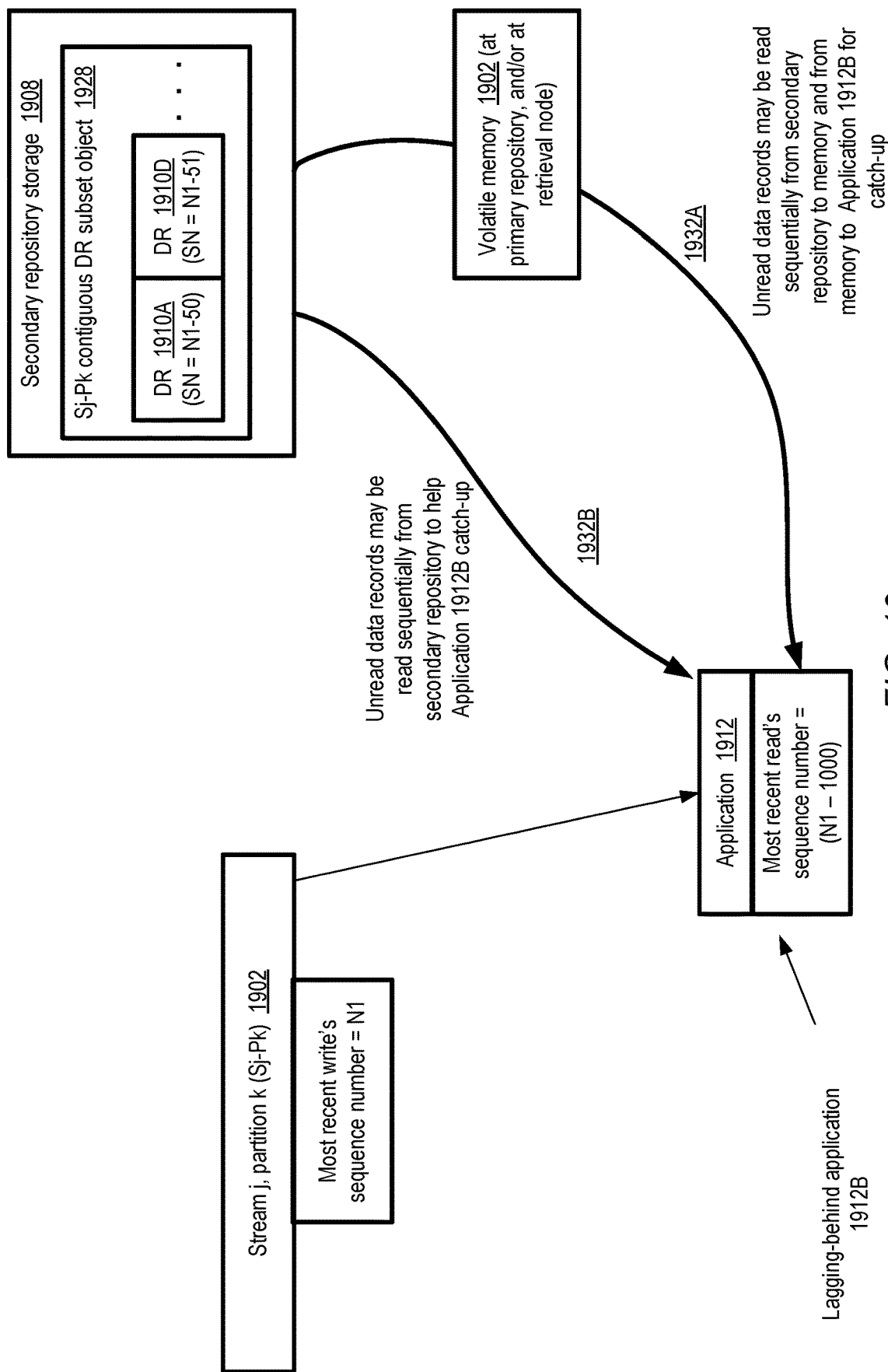
FIG. 19 illustrates an example scenario in which an optimization technique to enable lagging applications to catch up with writes to a data stream partition may be implemented, according to at least some embodiments.

FIG. 19 illustrates an example scenario in which an optimization technique to enable lagging applications to catch up with writes to a data stream partition may be implemented, according to at least some embodiments. In the depicted embodiment, application 1912 may utilize a subscription associated with an IRC to receive data records of partition Sj-Pk 1902. At a particular point in time when the most recently written data record of Sj-Pk has a sequence number N1, the most recently read data record of application 1912 may have the sequence number (N1-1000), indicating that the application is lagging behind, e.g., due to the rate at which data records are being pushed by the SMS, and/or due to the inability of the application to process data records sufficiently quickly. The SMS may in some embodiments detect backpressure due to the lag between application 1912's read progress and the write progress of the target partition Sj-Pk as discussed earlier.

As mentioned earlier, in at least some embodiments data records that are written to the primary persistent storage repository of an SMS, e.g., interspersed with data records of other partitions, may be rearranged and written contiguously to a secondary repository 1908 (e.g., based on one or more criteria such as aging). Depending on how frequently such writes to the secondary repository are performed, and how far behind the application 1912 is lagging, it may be the case in the depicted embodiment that at least some of the data records corresponding to the lag of application 1912 may have already been stored at the secondary repository storage 1908. For example, in one embodiment in which an object storage service of a provider network is used as the secondary repository, an Sj-Pk data records subset object 1928 may have been stored at the repository 1908, in which records such as DR 1910A and 1910D of Sj-Pk (with sequence numbers N1-50 and N1-51 respectively) are stored contiguously (e.g., such that the data records stored in the object 1928 belong to a single partition Sj-Pk and are not interspersed with data records of other partitions). Especially in embodiments in which the secondary repository comprises disk-based storage, sequential reads to obtain data records of any given object 1928 may be very fast, e.g., relative to the rate at which they may be retrievable from the primary storage repository. Accordingly, if a determination is made at the SMS that at least a subset of the data records that have not yet been read by a lagging application 1912 can be read efficiently (e.g., using sequential reads that may not require very many disk seeks between the accesses to data records) from the secondary repository, in some embodiments the secondary repository may be used to provide those records to the application 1912. In one embodiment, a pathway similar to 1932B may be used to provide the data directly to the application 1912 from the persistent repository storage. In other embodiments, an object 1928 may first be read into volatile memory 1902 (e.g., at one of the computing devices being used for the primary repository, or at the retrieval node from which data records of Sj-Pk are being pushed to the application 1912) along a pathway similar to 1932A and then transmitted to the lagging application. In at least some embodiments, a different network connection may be used to supply the records along pathway 1932B or 1932A than is used for the subscription to Sj-Pk from application 1912. In other embodiments, the same network connection that is used for the subscription may be employed.

Relaxing IRC Throttling Parameters

Figure 20:
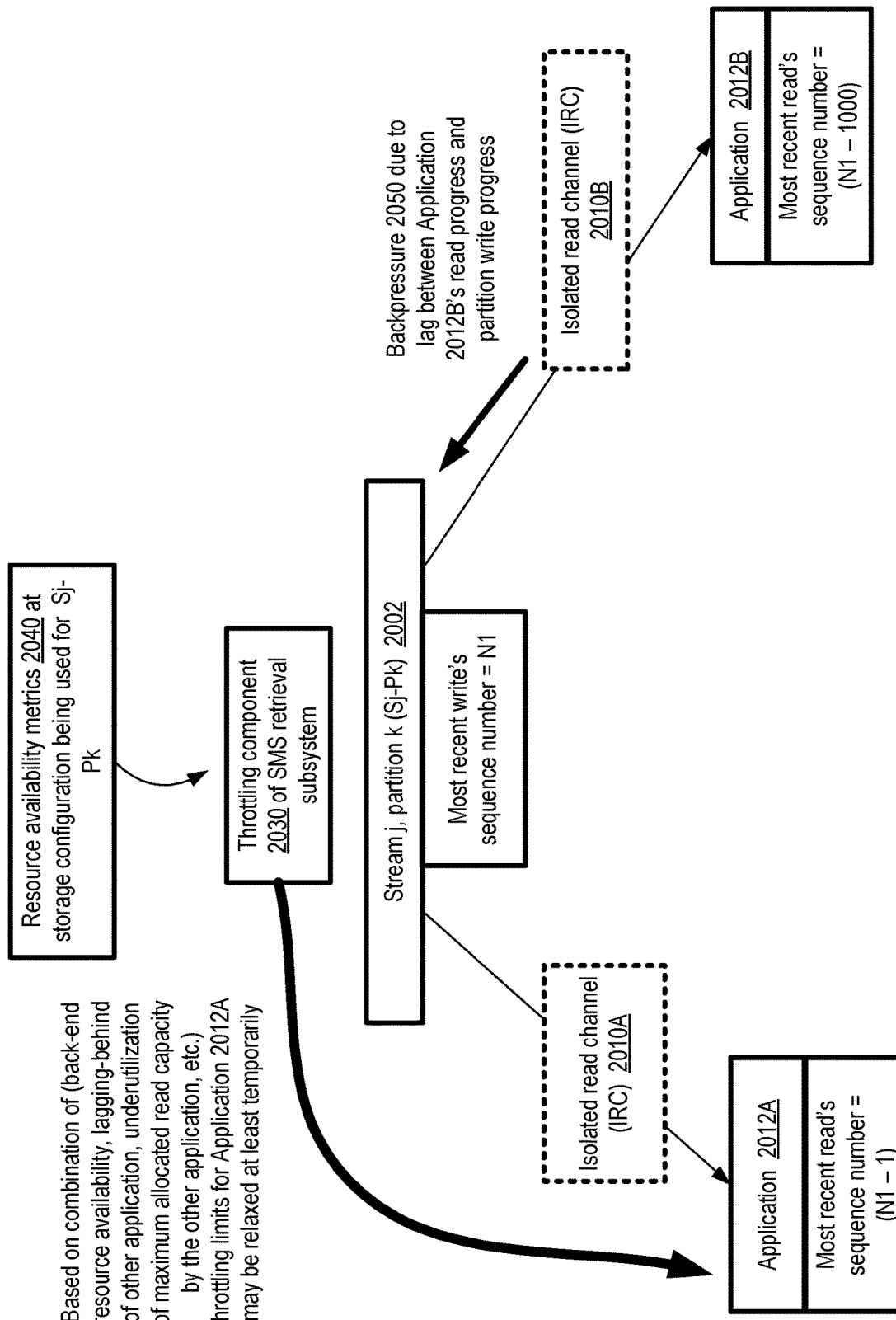
FIG. 20 illustrates an example scenario in which a combination of factors may be used to relax throttling parameters for an isolated read channel, according to at least some embodiments.

The detection by an SMS that a stream processing application is lagging behind the writes directed to its target partition (and/or relative to other applications that are reading from the same partition) may in some cases be used as one of the factors contributing to changes in throttling decisions made for other partitions. FIG. 20 illustrates an example scenario in which a combination of factors may be used to relax throttling parameters for an isolated read channel, according to at least some embodiments. In the depicted embodiment, a stream partition Sj-Pk 2002 has two isolated read channels (IRC) configured, including IRC 2010A being used by application 2012A and IRC 2010B being used by application 2012B. The sequence number of the most recently-written data record at Sj-Pk is N1, the sequence number of the most recently read sequence number at application 2012A via IRC 2010A is (N1-1), and the sequence number of the most recently read data record at application 2012B via IRC 2011B is (N1-1000). As such, application 2012B is lagging behind the writes to Sj-Pk (and is also behind with respect to the reads by application 2012A).

A throttling component 2030 of the SMS (such as a throttling manager at the SMS retrieval subsystem, similar to the throttling managers shown in FIG. 8) may be able to detect, e.g., based on backpressure signals 2050 and/or other sources, that application 2012B is unable to process data records at the rate at which they could potentially be provided in the depicted embodiment. In at least some cases, a lagging application such as 2012B may not be making use of the maximum read capacity designated for its IRC 2010B (e.g., instead of using its full designated read limit of 2 MB/sec, it may be reading at only 1.5 MB/sec). In such a scenario, the throttling component 2030 may be able to infer that some of the resources usable to provide data records to application 2012B may be deployable to provide additional read capacity to other applications such as 2012A, which may potentially be able to process data records faster than they are being provided in the depicted embodiment. In addition to detecting the lagging status of application 2012B, and the fact that application 2012B is unable to use up its full quota of reads, the throttling component 2030 may also obtain signals or metrics 2040 of available (unused) resources and performance capacity at the back end storage configuration(s) being used for Sj-Pk. Taking these and/or other factors into account, the throttling component 2030 may at least temporarily relax the throttling limits set for application 2012A. Thus, for example, if the maximum rate at which application 2012A was initially permitted to read data is 2 MB/sec, and application 2012A is able to read at higher rates, a rate of 2.5 MB/sec may be permitted for at least some time in the depicted embodiment. In some embodiments, such relaxation of throttling limits may also be used to help lagging-behind applications to catch up with the writes to the partitions from which they are reading.

Multiplexed Persistent Network Connection for Stream Subscriptions

Figure 21:
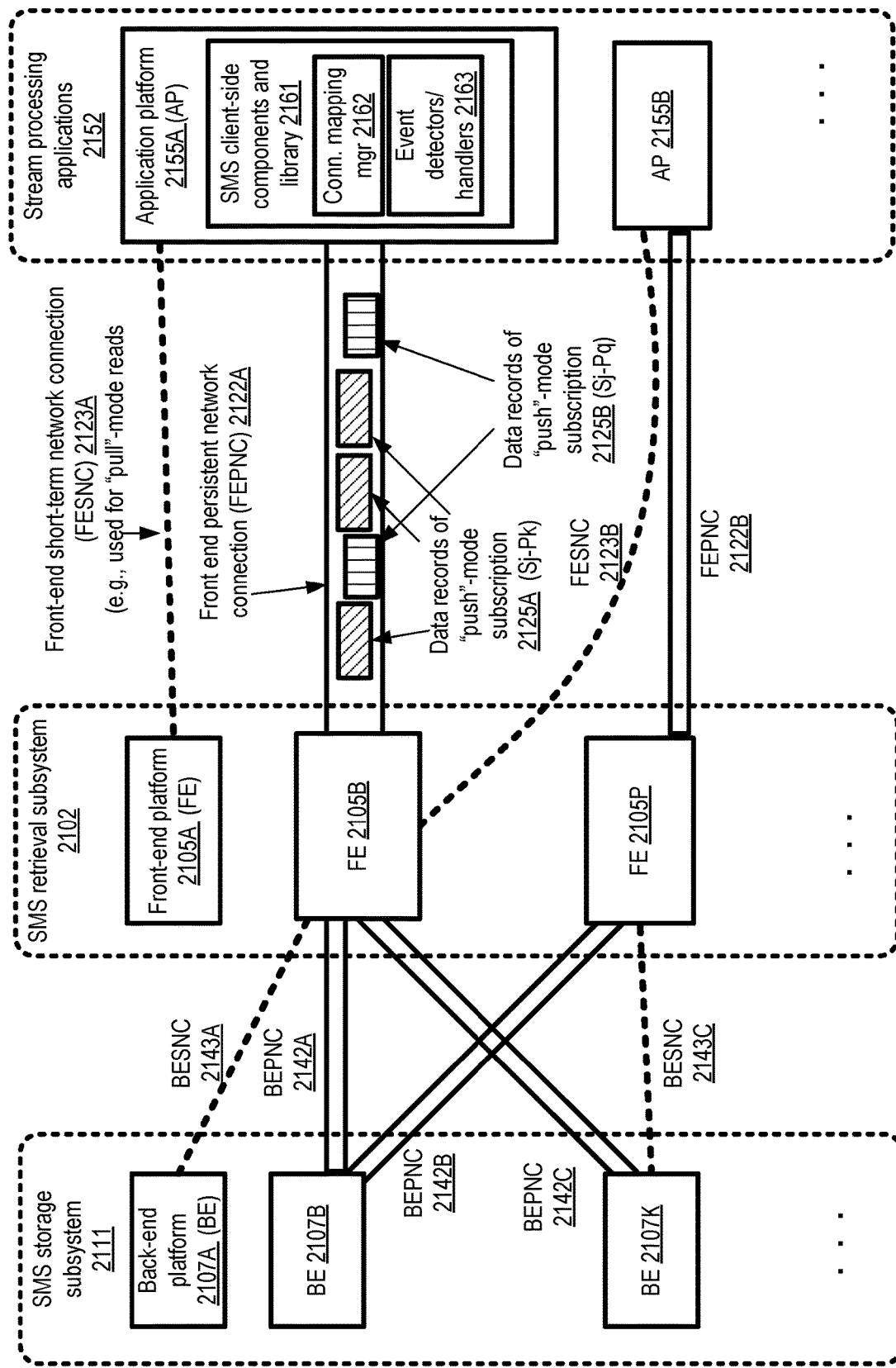
FIG. 21 illustrates an example scenario in which multiplexed persistent network connections may be used for transmitting data records of a stream from a stream management service, according to at least some embodiments.

As mentioned earlier, in some embodiments stream data records may be provided to stream processing applications using persistent network connections (PNCs), with a single PNC potentially being shared for transmitting numerous data records to multiple applications or subscriptions. Such shared PNCs may be referred to as multiplexed PNCs in various embodiments. FIG. 21 illustrates an example scenario in which multiplexed persistent network connections may be used for transmitting data records of a stream from a stream management service, according to at least some embodiments. As shown, at least two types of computing devices or execution platforms at an SMS may be involved in providing data stream records to a set of stream processing applications 2152 in the depicted embodiment: front-end platforms of the SMS retrieval subsystem 2102, and back-end platforms of the SMS storage subsystem 2111. For example, one or more of the retrieval subsystem nodes (e.g., processes) discussed earlier may be instantiated at the front-end platforms in one embodiment, while one or more of the storage subsystem nodes (e.g., processes) may be instantiated at the back-end platforms.

One or more stream processing applications 2152 (or nodes of such applications) may run on respective application platforms (APs) 2152 in the depicted embodiment, such as servers or hosts at a client network or within a different network-accessible service than the SMS itself. A given application platform 2155 (e.g., 2155A, 2155B), front-end platform (FE) 2105 of the SMS (e.g., 2105A, 2015B or 2105P), or back-end platform (BE) 2107 (e.g., 2107A, 2107B or 2107K) of the SMS may each be implemented using some combination of hardware and/or software one or more computing devices in the depicted embodiment. For example, in some embodiments, FEs 2105 and/or BEs 2107 may be implemented using virtual machines running on virtualization hosts of a computing service of a provider network.

A given application platform 2155 may include SMS client-side components 2161 (e.g., including an SMS library) that are usable by the applications to communicate with the SMS front-ends in the depicted embodiment. In at least some embodiments, an event-driven programming methodology may be used to obtain stream data records from the SMS. For example, an application running at AP 2155A may invoke a subscription request (similar to the subscribeToPartition API mentioned earlier) indicating a target partition from which data records are to be obtained. The SMS client side components 2161 at the AP 2155A may comprise a connection mapping manager 2162 in the depicted embodiment. The connection mapping manager 2162 may be responsible for establishing (or at least participating in the establishment of) a set of front-end persistent network connections (FEPNCs) 2122, such as FEPNC 2122A, with one or more FEs 2105 in some embodiments in the depicted embodiment. For example, in some cases, a new FEPNC 2122 may be established when a subscription request is submitted by an application. In other cases, in at least some embodiments, the connection mapping manager 2162 may decide to use an existing FEPNC (which may currently be in use for some existing subscription, or may have been used in the past for some subscription) for the new subscription request and the corresponding data record traffic.

In some embodiments, as discussed in further detail below, a load balancer may act as an intermediary between the stream processing applications and the SMS retrieval subsystem 2102, and decisions made at such an intermediary load balancer may be used to select which particular FE should be used for a particular subscription request and the subscription's data records. In a scenario in which the load balancer indicates that a particular FE 2105 has been selected for a subscription request, in some embodiments the following high level logic may be used by the connection mapping manager 2162 of an application platform 2155: (a) if there is no FEPNC currently established between the selected FE 2105 and the application platform 2155, a new FEPNC may be established; (b) if there are one or more FEPNCs already established with the selected FE 2105, and if at least one of the established FEPNCs (say, FEPNC 2122A) meets a criterion for adding on another subscription, that FEPNC 2122A may be used for the subscription, otherwise a new FEPNC may be established. In at least some embodiments, if a given FEPNC 2122 was used for transmitting contents of a subscription request to an FE, that same FEPNC may be used by the FE for pushing data records of the subscription to the AP. In other embodiments, the subscription requests (and corresponding responses) may be transmitted using one FEPNC, and a different set of one or more FEPNCs may be used for transmitting the data records. As shown in FIG. 21, a given FEPNC such as 2122A may be used for transmitting data records of multiple push-model subscriptions in at least some embodiments—e.g., data records 2125A of a partition Sj-Pk may be interleaved with data records 2125B of a different subscription associated with partition Sj-Pq. In at least some embodiments, the FEPNC selection and/or multiplexing decisions made by a collection mapping manager 2162 may not necessarily be apparent at the stream processing application; instead, such decisions and actions such as establishing the FEPNCs, terminating FEPNCs when needed etc. may be performed by the client-side components without providing details to the applications. In addition to messages containing data records, the PNCs may also be used for control messages in at least some embodiments—e.g., to indicate that a subscription has expired, and so on.

In at least some embodiments, after a subscription request is received at an FE, the FE 2105 may perform various types of verification operations and/or workload management related operations (some of which are discussed below) before determining whether the subscription is to be accepted. If the subscription is accepted, the FE 2105B may start pushing data records to the application via an FEPNC (e.g., the same FEPNC over which the subscription request was received). The transmission of one or more data records of a given push-mode subscription may result in detection of corresponding events at an event detector/handler 2163 on the application platform 2155. For example, when an event indicating a new data record has been transmitted and is available for processing is detected, the event detector/handler 2163 may invoke one or more application-specific callback functions in the depicted embodiment. Depending on the specific type of processing that is to be performed, different types of callback functions may be programmatically linked or bound to event detectors/handlers 2163 in different embodiments, e.g., as part of the logic of the stream processing application. In some embodiments, the client-side components 2161 may comprise an event detector, which passes on the received data records to an event handler implemented as part of the processing application.

In addition to persistent network connections such as FEPNC 2122A and 2122B, short-term or transient network connections (FESNCs) may also be established between the application platforms 2155 and FEs 2105, such as FESNC 2123A between application platform 2155A and FE 2105A, and FESNC 2123B between AP 2155B and FE 2105B. Such short term network connections may, for example, be used for pull-mode record retrieval operations, such as getRecord and the like in some embodiments. In at least some embodiments, one or more persistent network connections between the front-end platforms and the back-end platforms, such as BEPNCs 2142A-2142D (some of which may also be multiplexed or shared for data records of more than one partition, in a manner similar to FEPNCs 2122), may be used to transfer data records from the storage subsystem for various processing applications. In some embodiments, one or more short term network connections such as BESNCs 2143A-2143C may also or instead be used for communications between the FEs and the BEs.

In at least some embodiments, individual subscriptions may have associated lifetime lengths, validity periods, or expiration periods. Such expiration periods may be selected at the SMS control plane in some embodiment, e.g., based on security and other considerations. In other embodiments, an SMS client may indicate a desired expiration period when requesting a subscription (e.g., in the subscribeToPartition request) or an IRC (e.g., in a registerIRC request), or may programmatically request that a subscription's expiration period be changed interval be changed, and the SMS control plane may accommodate the expiration preferences of the client if possible. In one embodiment, after a particular subscription has expired, a message (which leads to a detection of a corresponding event at the application platform) may be sent from the SMS indicating that the subscription has expired. If one or more data records of the subscribed-to partition (e.g., Sj-Pk) remain unread or undelivered, an indication of the position within the partition at which reading of the data records may be resumed if desired may be included in the expiration notification message. For example, a sequence number or timestamp of the next available data record may be provided. After an expiration of a subscription, the stream processing application may issue another subscription request and/or a subscription renewal request in at least some embodiments, which includes parameters such as authorization credentials, the starting position within the partition (e.g., a timestamp or sequence number) from which data records should be pushed, and so on. Expiring subscriptions periodically and rechecking the credentials of the stream processing application may help enhance the overall security of the SMS, especially in environments in which authorization credentials may sometimes only be granted for relatively short time intervals.

Figure 22:
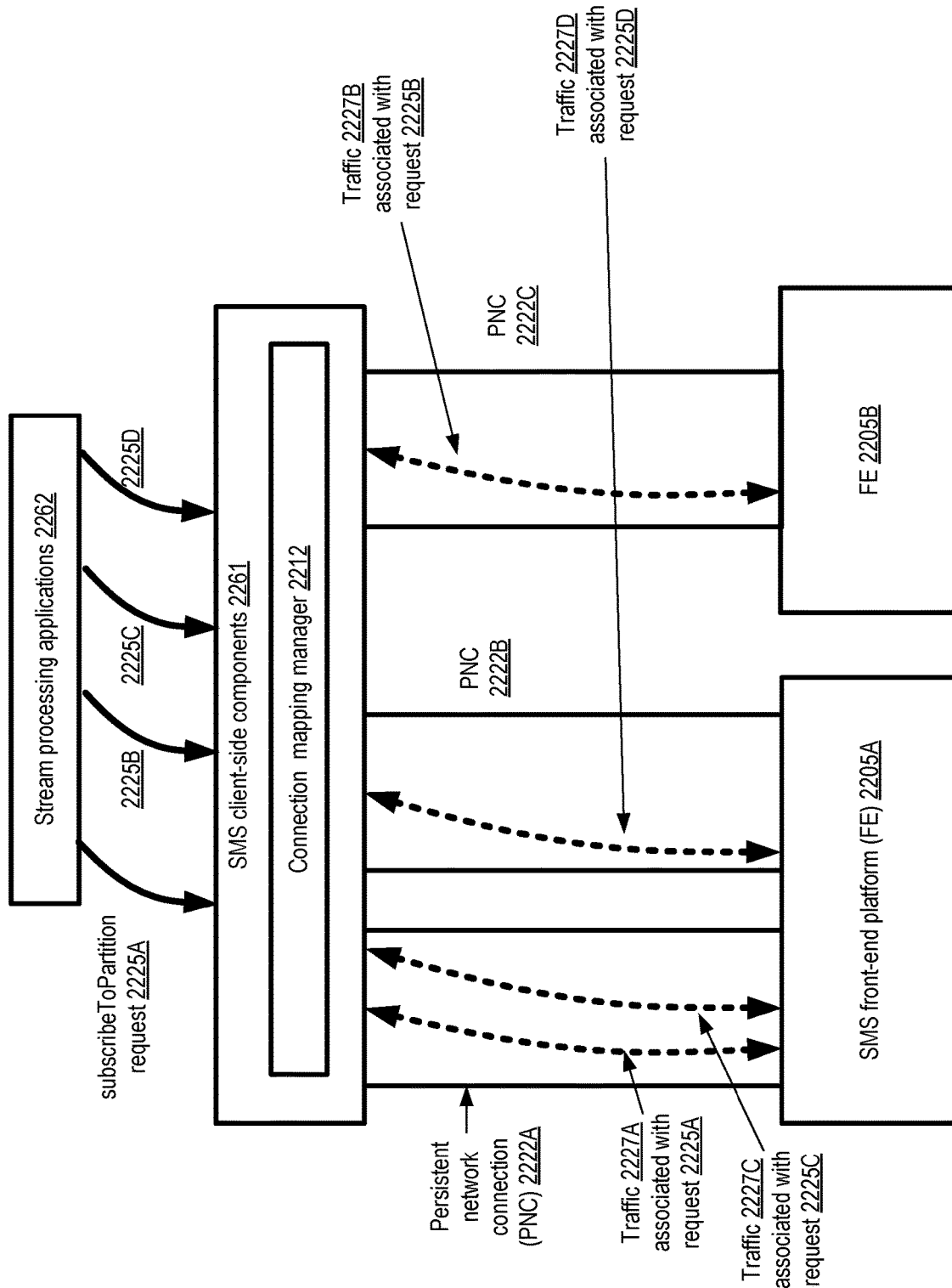
FIG. 22 illustrates example mappings of stream subscriptions to persistent network connections, according to at least some embodiments.

FIG. 22 illustrates example mappings of stream subscriptions to persistent network connections, according to at least some embodiments. As shown, one or more stream processing applications 262 may submit respective subscription requests, such as subscribeToPartition requests 2225A-2225D in the depicted embodiment. SMS client-side components 2261 including a connection mapping manager 2212 may process the subscription requests, and make decisions such as which particular persistent network connection or PNC of a set of available PNCs (if any such PNCs are already established) to a selected SMS front-end platform (FE) should be used for a given subscription request and/or its associated data records in the depicted embodiment. For example, in the scenario depicted in FIG. 22, two PNCs 2222A and 2222B may already have been established with FE 2205A (e.g., for subscription requests submitted earlier), while one PNC 2222C may be available for communication with FE 2205B. Note that at least in some embodiments, the decision as to which particular FE should be used for a given subscription request may be made by a load balancer, while the decision as to which PNC (established with that load-balancer selected FE) should be used for a given subscription request may be made by a connection mapping manager 2212. In other embodiments, SMS client-side components 2261 may also be responsible for at least some level of load balancing decisions including for example the selection of an FE for a subscription request and/or its traffic.

In at least some embodiments, the SMS client-side components may store metadata indicating for example how many (and which specific) subscriptions have been mapped to individual ones of the PNCs 2222, the rate of traffic over individual ones of the PNCs, and so on. In various embodiments, e.g., using such metadata, the connection mapping manager 2212 may allocate respective PNCs to handle the traffic associated with individual ones of the subscriptions (e.g., the subscription request itself, which may be transmitted to the SMS, and the data records pushed back to the application if the subscription request is accepted by the SMS). For example, as shown, traffic 2227A associated with subscription request 2225A and traffic 2227C may be handled using PNC 2222A established with FE 2205A, traffic 2227D associated with subscription request 2225D may be handles using PNC 2222B, while traffic 2227B associated with request 22225B may be handled using PNC 2222C established with FE 2205B in the depicted embodiment. In some embodiments, more than one PNC 2222 may be used for a given subscription or a given isolated read channel.

Figure 23:
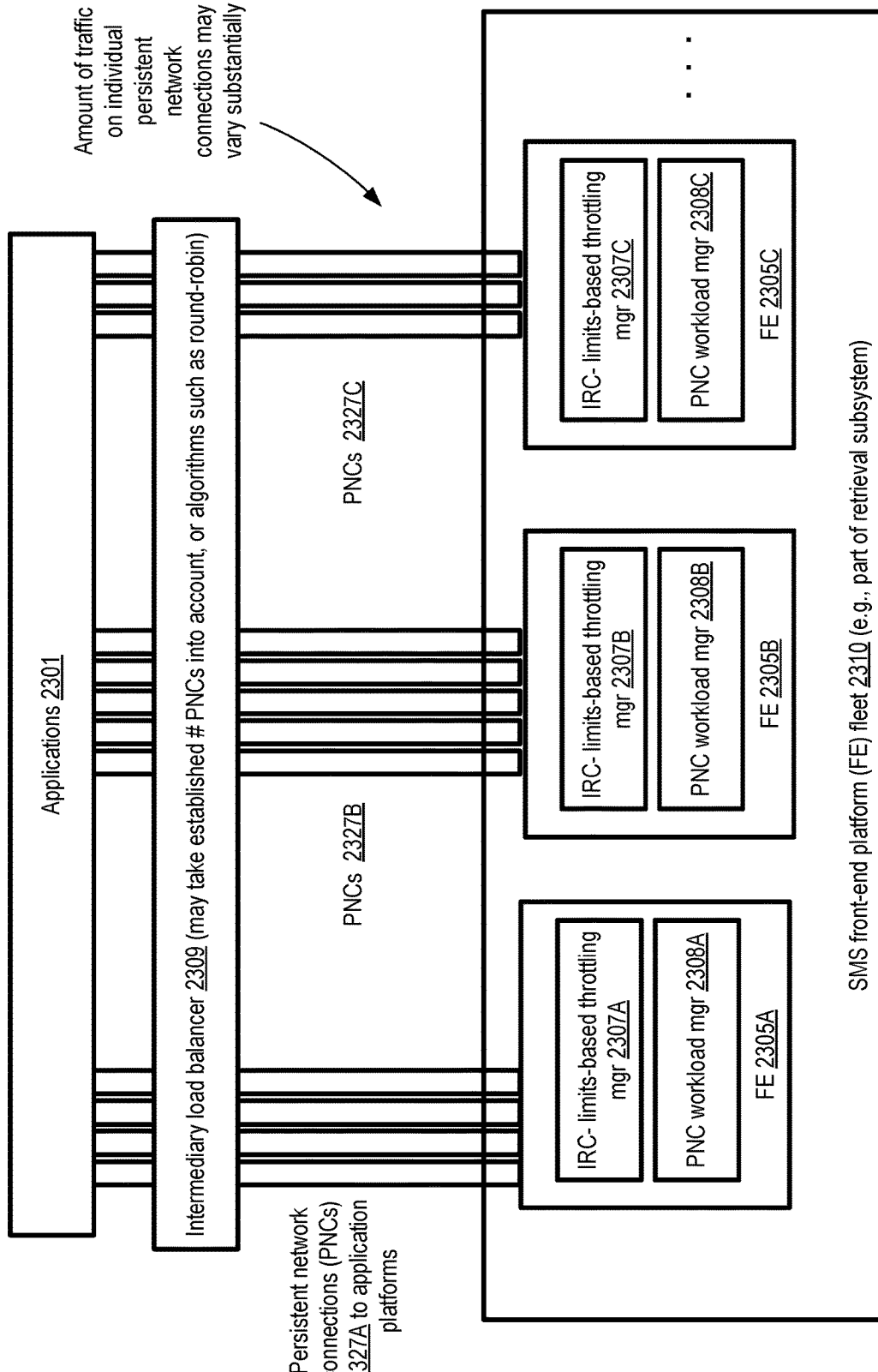
FIG. 23 illustrates example techniques that may be implemented to manage workload levels associated with the use of persistent network connections for stream data transfers, according to at least some embodiments.

FIG. 23 illustrates example techniques that may be implemented to manage workload levels associated with the use of persistent network connections for stream data transfers, according to at least some embodiments. In the depicted embodiment, an SMS may comprise a fleet 2310 of front-end platforms (FEs), such as FE 2305A, FE 2305B and FE 2305C. The FE fleet may comprise part of the retrieval subsystem of the SMS in some embodiments; e.g., individual ones of the FEs may comprise software and/or hardware implementing one or more retrieval nodes of the kind discussed in the context of FIG. 6.

Zero or more persistent network connections (PNCs) may have been established between a set of one or more stream processing applications 2301 and individual ones of the FEs 2305 in the depicted embodiment at a given point in time, such as PNCs 2327A between the application platforms and FE 2305A, PNCs 2327B between the application platforms and FE 2305B, and PNCs 2327C between the application platforms and FE 2305C. An intermediary load balancer 2309 may be used in some embodiments to decide which particular FE 2305 should be used for a given application's subscription. Such a load balancer may implement any of a number of load balancing algorithms in different embodiments, such as round-robin, random selection, and the like, some of which may take the number of currently-established PNCs of individual ones of the FEs into account. For example, in one embodiment, the load balancer 2309 may identify a particular FE 2305 that has the fewest PNCs established as the destination for a given new push-mode subscription request of the kind discussed earlier. While the load balancer 2309 may be able to keep track of the number of PNCs established with individual FEs 2305, at least in some embodiments it may not keep track of (or be informed regarding) the amount of traffic or the traffic rates of individual PNCs or subscriptions.

In some embodiments, individual ones of the FEs 2305 may comprise a respective IRC-limits-based throttling manager 2307 (e.g., 2307A, 2307B or 2307C) and/or a PNC workload manager 2308 (e.g., 2308A, 2308B or 2308C). As implied by their names, the IRC-limits based throttling managers 2307 may implement one or more types of throttling decisions based on a set of limits associated with individual isolated read channels (IRCs) that have been registered to access data records of stream partitions using subscriptions of the kind discussed above. Such IRC-based limits may include, for example, a maximum read rate limit (e.g., expressed in units such as MB/second or data records/second) and/or a maximum subscription request rate (e.g., expressed in subscription requests per second per IRC, subscription requests per second per stream partition, subscription requests per second per stream, etc.). The maximum read rate limit per IRC may be enforced by throttling managers 2307, for example, by introducing delays if necessary between transmissions of some data records to the applications in various embodiments as discussed earlier. When a new subscription request is received at an FE 2305, the IRC-limits-based throttling manager 2307 may examine records of the rate at which subscription requests have been submitted (e.g., for the same SMS client, IRC, partition or stream) in some recent time window or interval in the depicted embodiment, and in some cases reject the new request because the rate exceeds a threshold.

In addition to the per-IRC limits, workload at the FEs may also be controlled in the persistent network connection (PNC) context in the depicted embodiment. For example, even though an FE such as 2305C is selected as the recipient of a new subscription request based on decisions made at the intermediary load balancer 2307, the new subscription request may be rejected by the PNC workload manager 2308C of FE 2305C in some embodiments, based at least partly on an analysis of the amount of traffic over the set of PNCs that are established at that FE 2305C. The amount of traffic flowing over individual PNCs 2327C may vary substantially in at least some embodiments, e.g., based on the rate at which data records are written to the corresponding stream partitions, the rate at which applications 2301 are able to process the pushed data records, and so on. As a consequence, the workload experienced at two different FEs 2305 that have the same number of PNCs established may also vary substantially over a given time interval, so the load balancing decisions made by an external load balancer 2307 may not necessarily be able to distribute the FE workload as well as desired. Using the data available at the FEs regarding the actual amount of traffic flowing over individual PNCs before accepting/rejecting new subscriptions may therefore be helpful in enabling a better distribution of SMS workload in various embodiments.

If and when an FE makes a decision to reject a new subscription request, the actions taken with respect to the PNC over which the subscription request may vary in different embodiments. In one embodiment, for example, the FE 2305 or the FE's PNC workload manager 2308 may terminate the PNC 2327 over which the subscription request was sent. This may, in some cases, lead to closing or terminating other subscriptions that may have been using the same PNC. In other embodiments, the PNC over which the subscription request was sent may remain open, and may for example be used later for other subscription requests, or may continue to be used for other subscriptions whose traffic has already begun to flow. In one embodiment, the PNC workload manager 2308 may select a different PNC that should be closed (e.g., instead of or in addition to the PNC over which the rejected subscription request was submitted). In some embodiments, a decision as to whether to terminate a given in-use PNC may be made at least in part based on the number of subscriptions that are currently being handled by that PNC. In one embodiment, instead of rejecting a new subscription request when the workload at the FE is detected to be above a threshold, a decision may be made to terminate one or more existing subscriptions (e.g., a different subscription using the same PNC as the one on which the new subscription is requested, or a different subscription using a different PNC), and accept the new subscription request. In some embodiments, a PNC workload manager 2308 may monitor the overall traffic rates over the different PNCs established with the FE 2305 at which the PNC workload manager is instantiated, and terminate existing subscriptions and/or PNCs after determining that the workload at the FE exceeds some limit, e.g., without waiting for a new subscription request to make such decisions. Note that in at least some embodiments, respective messages may be pushed to the applications 2301 when a given subscription request is rejected, an existing subscription is terminated, and/or when a PNC is terminated; each such message may result in an event being detected at the application, enabling the application to take the appropriate responsive action.

Figure 24:
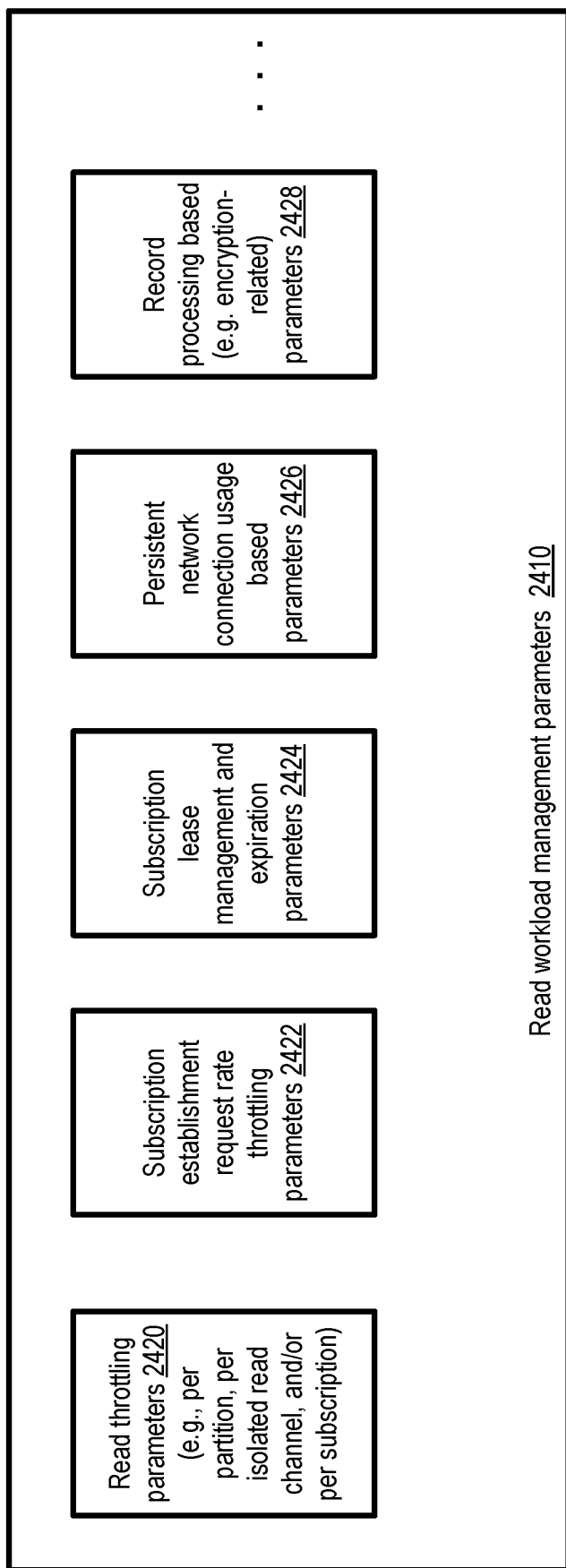
FIG. 24 illustrates example parameters used to manage workload levels associated with the use of persistent network connections for stream data transfers, according to at least some embodiments.

As suggested above, a number of different approaches may be employed, singly or in combination, at an SMS towards read-related workload management and balancing in different embodiments. FIG. 24 illustrates example parameters used to manage workload levels associated with the use of persistent network connections for stream data transfers, according to at least some embodiments. As shown, read workload management parameters 2410 may include read throttling parameters 2420, subscription establishment request rate throttling parameters 2422, subscription lease management and expiration parameters 2424, persistent network connection usage based parameters 2426 and/or record processing-based parameters 2428 in the depicted embodiment. The read throttling parameters 2420, which may be expressed in units such as MB/sec, data records/second and the like, may be specified per partition, per isolated read channel (IRC), per SMS client, and/or per subscription in different embodiments. These types of parameters may be enforced, for example, by introducing delays (e.g., at the SMS retrieval subsystem's front-end nodes) before transmitting additional data records to stream processing applications in various embodiments.

In at least some embodiments, the rate at which new subscription requests can be submitted, e.g., by a given client, or targeted towards a given partition or IRC, may also or instead be throttled using parameters 2422. For example, a maximum subscription request rate of K requests per second per partition or per IRC may be enforced in some embodiments at the SMS front-end nodes, and/or a minimum interval between successive subscription requests to the same partition/stream may be required. Enforcing these types of limits may, for example, help reduce the administrative overhead associated with setting up and tearing down subscriptions—for example, each new subscription establishment may result in a set of updates to one or more SMS metadata tables in some embodiments, and allowing very high rates of subscription establishment may potentially overwhelm the resources used for such metadata.

In at least some embodiments, individual subscriptions and/or IRCs may have associated expiration periods or maximum lifetimes, and such lifetime duration related limits may be managed with the help of subscription lease management and expiration parameters 2424. Such parameters may, for example, indicate how long a given subscription is allowed to remain in use before it is automatically expired and terminated, how long a subscription is permitted to remain idle (i.e., with data transfer traffic below a threshold) before it is terminated, whether a lease associated with a given subscription on behalf of a given application or thread can be transferred to another application or thread, and so on. In at least some embodiments, for security and/or other reasons, the SMS may grant permissions to an application to read a partition's data for a relatively short period of time, after which the application may have to acquire a new subscription by again providing its credentials, or request a renewal of the subscription's lease by re-providing credentials. In some embodiments, one or more parameters may be used to control the maximum number of active applications using a subscription via a given IRC concurrently, and leases may be used to store the identity of the application (e.g., a thread identifier) using the subscription.

As described above, in various embodiments in which persistent network connections (PNCs) may be used for transferring stream data records, workload management decisions such as whether to accept or reject a new subscription may be made based at least in part on per-PNC metrics collected at SMS components. Parameters 2426 used to make such decisions may, for example, include the maximum aggregated network transfer rate (e.g., in MB/sec) permitted for all PNCs set up at a given SMS front-end node before rejecting a new subscription request, the maximum transfer rate permitted per persistent connection before rejecting a new subscription for that connection, the threshold conditions to be used to determine when to close an existing subscription or when to terminate an in-use PNC, the maximum number of subscriptions which can concurrently use a given PNC, and so on in different embodiments. If, for example, the maximum permitted number of concurrent subscriptions are already assigned to and using each of the PNCs between a front-end platform and an application platform, the client side SMS components may establish a new PNC for the next subscription request that is to be directed to that same front-end platform. In one embodiment, stream data records may have to be processed at the front-end platforms in some way before being transmitted to subscribers or readers—e.g., records may have to be encrypted individually, or their format may have to be changed. In such an embodiment, it may sometimes be the case that the record processing being performed at a given front-end platform of the SMS becomes a bottleneck, preventing the front-end platform from being able to handle additional subscriptions or connections at desired performance levels. A set of one or more record processing based parameters 2428 (e.g., the maximum acceptable front-end CPU usage level, as measured over some recent interval) may accordingly also be used to manage read workload levels in some embodiments. Using the combination of parameters shown in FIG. 24, a wide range of workload management policies may be implemented in different embodiments. In some embodiments, parameters other than those shown in FIG. 24 may be used for read-related workload management at an SMS, and/or one or more of the types of parameters indicated in FIG. 24 may not be used.

In some embodiments, the SMS may store metadata in the form of lease objects for individual subscriptions to a partition. In the depicted embodiment, respective lease objects or leases may be stored to represent the ownership of a given subscription by a particular client application (or by a front-end node of the SMS acting as a proxy on behalf of the particular client application). At a high level, such leases may in some embodiments enable the front-end nodes to determine, when a request for a subscription arrives, whether another subscription is already active for the same (partition, IRC) combination, and if so, take one of several types of actions (e.g., transferring the lease, rejecting the new subscription, etc.) depending on workload management parameters of the subscription or partition. In at least one embodiment, a heartbeat mechanism may also be used, in which for example a counter of heartbeat messages associated with a lease is updated periodically by the front end node if subscription data continues to be read (e.g., if the application for which the subscription is set up does not stop responding to the pushed data records). Such heartbeat records may, for example, be used to maintain ownership of the subscription. If heartbeats are not received for some period of time, the lease and/or subscription may be released/terminated in some embodiments. In one implementation, the metadata associated with a given subscription or lease may comprise, for example, an identifier of an IRC with which the subscription is associated, a partition identifier of the targeted stream partition, a lease owner identifier, a lease heartbeat counter, an expiration timestamp, and/or a timestamp indicating the time of the most recent update of the lease.

Figure 25:
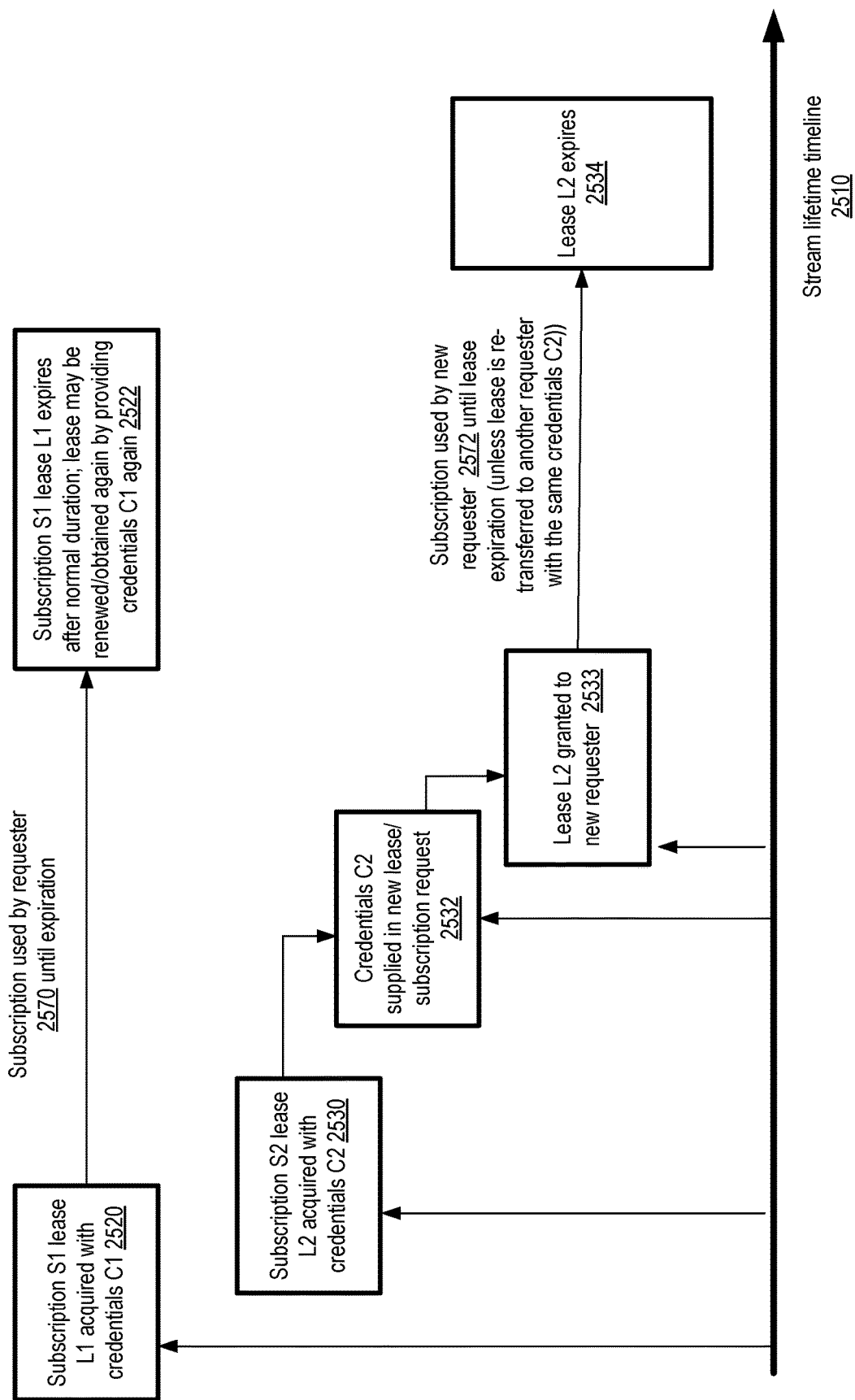
FIG. 25 illustrates an example of a transfer of a lease associated with a stream subscription, according to at least some embodiments.

FIG. 25 illustrates an example of a transfer of a lease associated with a stream subscription, according to at least some embodiments. Events associated with the use of a lease which does not have to be transferred are represented by elements 2520 and 2522 along a stream lifetime timeline 2510. In event 2520, a lease L1 associated with a subscription S1 is acquired for or on behalf of an application with credentials C1 in the depicted embodiment. The SMS starts pushing the data records of the targeted partition, updating heartbeat metadata as the application consumes the pushed data records. Subscription S1 may be used by the requesting application 2570 (the application on whose behalf the subscription was established) until the lease L1 expires. At that point, as indicated by element 2522, the application may, if desired, provide its authorization credentials C1 again to renew the lease or obtain a new lease associated with a new subscription in the depicted embodiment.

In at least some embodiments, the SMS may allow subscription leases to be transferred, e.g., to a different application thread or process than the one to which it was initially assigned. In event 2530 along timeline 2510, for example, a lease L2 associated with a subscription S2 may be acquired by an application with credentials C2 in the depicted embodiment. In event 2532, a new lease request or subscription request may be received with the same credentials C2. The existing lease L2 may be granted to the new requester in the depicted embodiment as indicated in event 2533. Such an operation may also be referred to as "stealing" a lease. In effect, the provided credentials C2 may enable a new requesting thread or application to start reading the data records of the target partition associated with the subscription in the depicted embodiment. Such an approach may be useful, especially in real-time stream processing environments, where instead of trying to debug an application thread or process that may have become "stuck" or is unable to make progress on its data records, a new thread (or process) may be quickly spun up and provided the appropriate credentials to start handling incoming stream data records that may be arriving at very high rates. The transferred lease L2 may be used by the new requester 2572 until it expires in event 2534 in the depicted embodiment, unless of course it is re-transferred to another requester that provides the appropriate credentials.

In at least one embodiment, the SMS may implement one or more programmatic interfaces such as APIs that can be used by clients to indicate preferences regarding the kinds of lease transfers illustrated in FIG. 25. For example, an API that indicates that a lease for a particular subscription should not be transferred, regardless of the ability of the application to process data records, may be supported. In some embodiments, transfers of subscriptions/leases of the kind illustrated in FIG. 25 may not be supported.

Provider Network Environment

As mentioned earlier, networks set up by an entity such as a company or a public sector organization to provide one or more network-accessible services (such as various types of cloud-based database, computing or storage services) accessible via the Internet and/or other networks to a distributed set of clients may be termed provider networks in various embodiments. In some embodiments a provider network may be organized into a plurality of geographical regions, and each region may include one or more availability containers, which may also be termed "availability zones" in one embodiment. An availability container in turn may comprise one or more distinct locations or data centers, engineered in such a way (e.g., with independent infrastructure components such as power-related equipment, cooling equipment, physical security components) that the resources in a given availability container are insulated from failures in other availability containers. A failure in one availability container may not be expected to result in a failure in any other availability container; thus, the availability profile of a resource is intended to be independent of the availability profile of resources in a different availability container.

In at least some embodiments, redundant groups of nodes may be configured for one or more subsystems of an SMS, and distributed across one or more availability containers. Such groups of nodes may be referred to in various embodiments as redundancy groups. Instead of, for example, configuring one retrieval node for retrieving data records for a stream partition Sj-Pk, two or more nodes may be established for such retrievals in one embodiment, with one node being granted a "primary" or active role at a given point in time, while the other node or nodes are designated as "non-primary" nodes. The current primary node may be responsible for responding to work requests, e.g., requests received either from clients or from nodes of other subsystems. The non-primary node or nodes may remain dormant until a failover is triggered in some embodiments, e.g., due to a failure, loss of connectivity to the primary, or other triggering conditions, at which point a selected non-primary may be notified by a control node to take over the responsibilities of the previous primary. The primary role may thus be revoked from the current incumbent primary node during failover, and granted to a current non-primary node. Various types of applications may be protected from failures at a single location in a provider network environment by launching multiple application instances in respective availability containers, or (in the case of an SMS) distributing the nodes of a given redundancy group of ingestion, storage, retrieval and/or control nodes across multiple availability containers.

Figure 26:
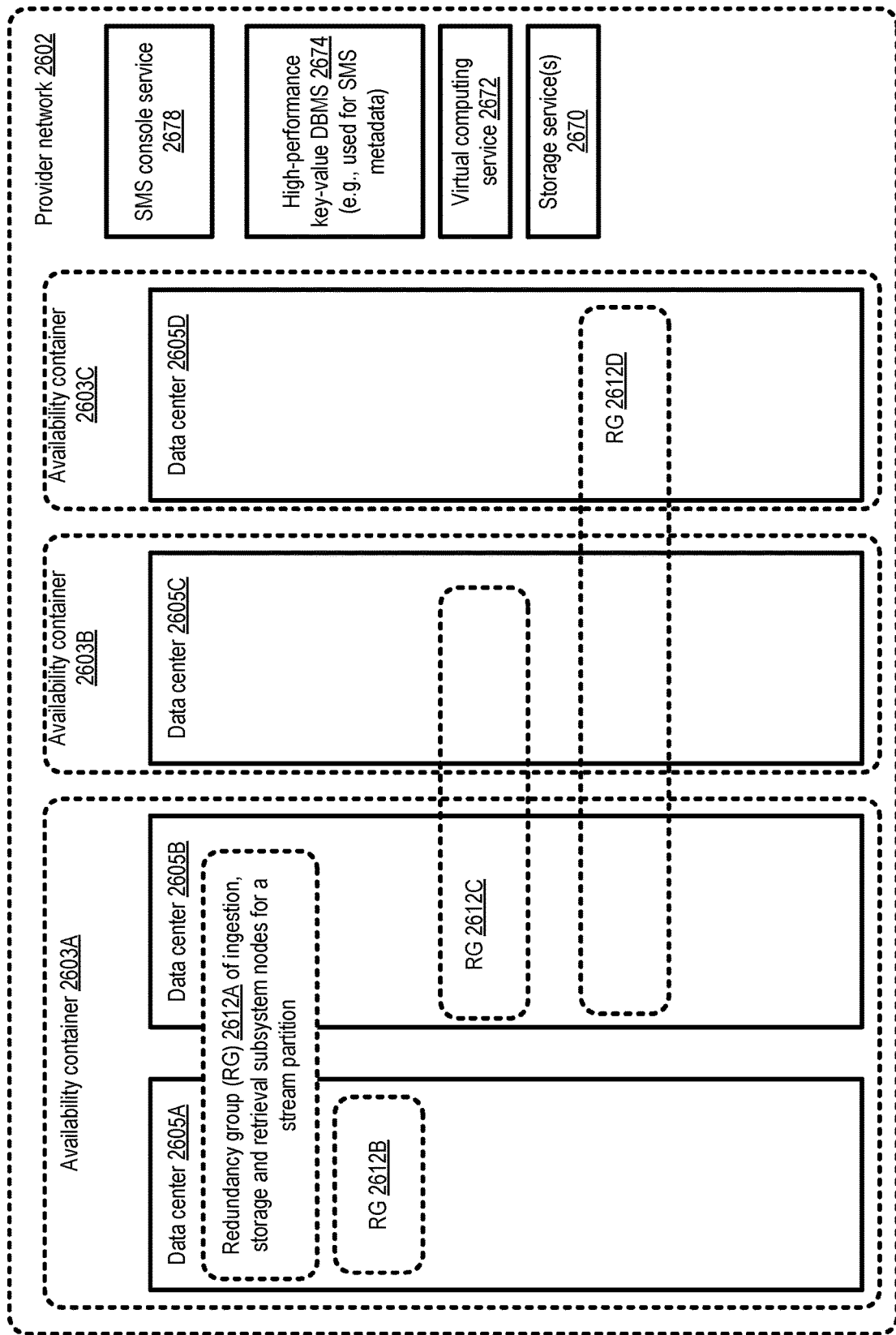
FIG. 26 illustrates an example of stream management service components implemented at a provider network, according to at least some embodiments.

FIG. 26 illustrates an example of stream management service components implemented at a provider network, according to at least some embodiments. As shown, provider network 2602 may comprise at least three availability containers 2603A, 2603B and 2603C in the depicted embodiment. Each availability container may include portions or all of one or more data centers—e.g., availability container 2603A comprises data centers 2605A and 2605B, availability container 2603B includes data center 2605C, and availability container 2603C includes data center 2605D. A number of different redundancy groups (RGs) 2612 of SMS ingestion, storage, retrieval and/or control subsystem nodes are shown by way of example on FIG. 26. Some RGs 2612 may be implemented entirely within a single data center, as in the case of RG 2612B located within data center 1005A. Other RGs may use resources of multiple data centers within a given availability container, such as RG 2612B, which spans data centers 2605A and 2605B of availability container 2603A. Yet other RGs may be implemented using resources spread across different availability containers. For example, RG 2612C uses resources located in data centers 2605B and 2605C of availability containers 2603A and 2603B respectively, and RG 2612D utilizes resources at data centers 2605B, 2605C and 2605D in availability containers 2603A, 2603B and 2603C respectively. In one example deployment, if an RG 2612 comprises one primary and two non-primary nodes, each of the three nodes may be located in a different availability container, thus ensuring that at least one node is highly likely to remain functional even if large-scale failure events occur at two different availability containers concurrently. In at least some embodiments, when requesting the creation of a data stream, an SMS client may indicate preferences regarding the manner in which redundancy groups should be configured and/or distributed across availability containers.

An SMS console service 2678 implemented at the provider network 2602 may provide easy-to-use web-based interfaces for issuing administrative or control plane requests related to stream-related settings in the depicted embodiment. A number of additional services, at least some of which may be used by the SMS, may be implemented in provider network 2602 using resources spread over one or more data centers or across one or more availability containers. For example, a virtual computing service 2672 may be implemented, enabling clients to utilize selected amounts of computing power packaged as compute instances of various different capability levels, and such compute instances may be used to implement SMS nodes in some embodiments. One or more storage services 2670 may be implemented, enabling clients to store and access data objects with desired data durability levels in the depicted embodiment, e.g., either via a block-device volume interface or via a web-services interface. The storage objects may be attachable to, or accessible from, the compute instances of service 2672, and may be used to implement various stream persistence policies at SMS storage subsystems in some embodiments. In at least one embodiment, an object storage service 2670 may, for example, be used for a secondary repository and/or a primary repository of an SMS. In one embodiment, one or more database services such as a high-performance key-value database management service 2674 or a relational database service may be implemented at the provider network 2602, and such a database service may be used for storing metadata (e.g., including isolated read channel or IRC metadata and subscription related metadata, partition mappings, etc.) of the various subcomponents of the SMS. It is noted that in one embodiments, an SMS may not necessarily utilize, or be implemented at, a provider network. Instead, for example, a collection of computing devices within a single organization's data center may be used.

Methods for Supporting Customizable Read Scaling and Isolation at an SMS

Figure 27:
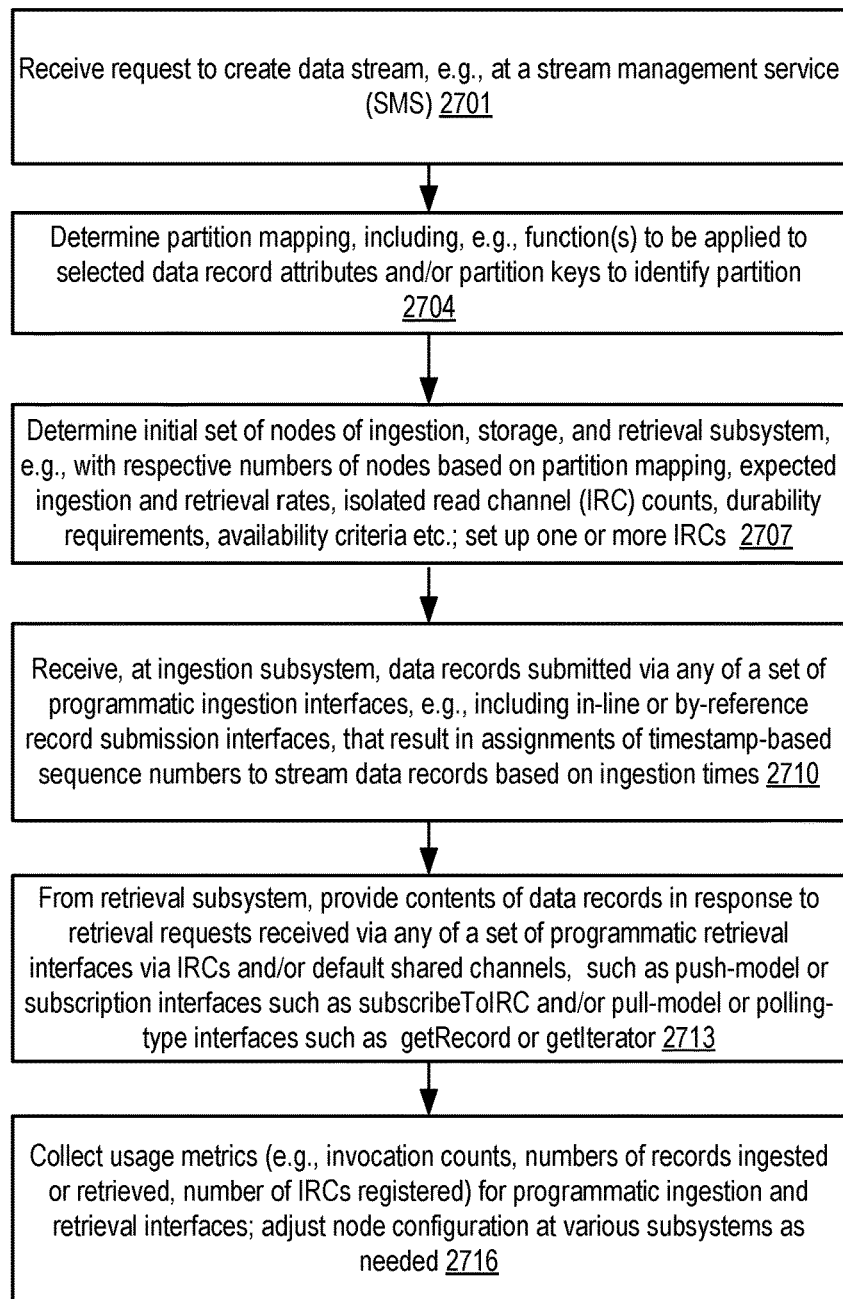
FIG. 27 is a flow diagram illustrating aspects of operations that may be performed to implement a stream management service, according to at least some embodiments.

FIG. 27 is a flow diagram illustrating aspects of operations that may be performed to implement a stream management service, according to at least some embodiments. As shown in element 2701, a request to create or initialize a data stream may be received, e.g., from a client of a stream management service (SMS) in the depicted embodiment. The initial partition mapping to be used for the stream may be determined (element 2704), e.g., the function(s) to be used to identify the partition to which a particular data record belongs, and the input parameters to be used for the function(s), may be identified based on a partitioning policy. As mentioned earlier, control components of the SMS may be responsible for receiving and responding to stream creation requests in various embodiments. The manner in which stream creation and initialization (as well as other control-plane operations) are implemented may differ from one embodiment to another. In one embodiment, for example, a redundancy group of control servers may be established, and the primary control server of that redundancy group may respond to a stream creation request by generating and storing the appropriate metadata for a new stream (e.g., the initial partition mapping, the initial sets of nodes of the ingestion, storage and retrieval, and so on) in a persistent storage location. Responses to subsequent queries regarding the stream (e.g., a request from a front-end ingestion node regarding the back-end node responsible for a given partition) may be generated by the primary control server using the stored metadata. In another implementation of the SMS control-plane functionality, stream configuration metadata may be stored in a database that is directly accessible by at least some nodes of the ingestion, storage, or retrieval subsystems. After a stream has been created and initialized, data-plane operations such as record submission, storage and retrieval may commence, and may be handled by respective components of the corresponding subsystems, typically without additional interactions with the control components in some embodiments.

In some embodiments, data sources may submit explicit partition keys with write requests, while in other embodiments, the inputs to be used for the partitioning functions may be determined based on metadata associated with the write requests, such as the identity of the data sources, the IP addresses from which the data records are received, or from the contents of the data records themselves. In at least one implementation, clients may optionally supply partition identifiers in the data record submissions, and additional partitioning functions may not be required in such an implementation.

A number of different factors may be taken into account when determining or configuring the initial set of nodes for ingestion, storage and retrieval functions for the stream (element 2707) in various embodiments. For example, the partition mapping itself (which may determine how many partitions the stream is divided into, and the relative expected sizes of the partitions), information about the expected ingestion rates and/or retrieval rates if such information is available, durability/persistence requirements for the stream data records, and/or high availability requirements for the various subsystems (which may result in the setting up of redundancy groups similar to those discussed above) may influence the number and placement of the nodes of the different subsystems. In some embodiments, a request to create a stream may include information about the number and/or categories of isolated read channels (IRCs) that are to be established initially, or are expected to be established during the lifetime of the stream, and such information may be used to configure the storage and/or retrieval components to be used for the stream's partitions. In some embodiments, one or more IRCs may be established or registered as part of the operations associated with creating the stream. In at least some embodiments, respective pools of nodes capable of performing ingestion, storage and/or retrieval functions may be set up in advance, and control components may assign selected members of such pools to each new stream (or to individual partitions of the new stream) that is created. In other embodiments, at least in some cases new ingestion, storage or retrieval nodes may have to be instantiated when a stream is created or initialized.

At the ingestion nodes in the depicted embodiment, records may be received via any of a set of programmatic interfaces implemented for data record submission (element 2710) in the depicted embodiment, including for example in-line submission interfaces (in which the data is included in the submission requests) and by-reference submission interfaces (in which an address is provided in the submission requests, from which the data can be retrieved by the SMS ingestion nodes or the SMS storage nodes, e.g., using web service requests or other interfaces). Any of a number of different types of programmatic interfaces may be provided in different embodiments for each of the ways of submitting records, e.g., respective application programming interfaces (APIs) may be supported for in-line versus by-reference submission, web pages or web sites may be established, graphical user interfaces may be implemented, or command-line tools may be used. In at least some embodiments, the SMS may assign a sequence number to each ingested record, e.g., indicative of the order in which the records are ingested or stored, and the sequence numbers may be usable for retrieval requests by stream processing applications. The received data records may be written to the storage subsystem in accordance with the persistence policies or preferences associated with the stream in the depicted embodiment.

At the retrieval subsystem nodes, record retrieval requests may be received via any of a set of implemented programmatic retrieval interfaces, including for example the push-mode subscription interfaces discussed earlier, and contents of the requested data records may be provided via the interfaces (element 2713). Some read requests may be satisfied via specified IRCs (e.g., a subscription request such as subscribeToPartition may indicate an IRC with which the subscription is associated, as well as a starting data record position within the partition), with the appropriate per-IRC throttling parameters being enforced by the SMS. Other reads may be satisfied using the default or shared read channel in some embodiments. For non-sequential pull-mode access, the interfaces may include, for example, getIterator (requesting an iterator to be instantiated at a position selected within a partition based on a sequence number indicated in the getIterator invocation) or getRecordWithSequenceNumber (to obtain a data record with a specified sequence number). For sequential pull-mode access, interfaces such as getNextRecords (requesting a number of records in order, starting from a current position of an iterator or from a specified sequence number) may be implemented.

Over time, control nodes may collect usage metrics for the different programmatic interfaces implemented at the various subsystems of the stream management service (element 2716). The metrics may include, for example, invocation counts of the different programmatic interfaces, the total number of records ingested or retrieved, the total amount of data ingested or retrieved, and so on. Based at least in part on such metrics, the configurations of resources at various subsystems may be modified in some embodiments.

Figure 28:
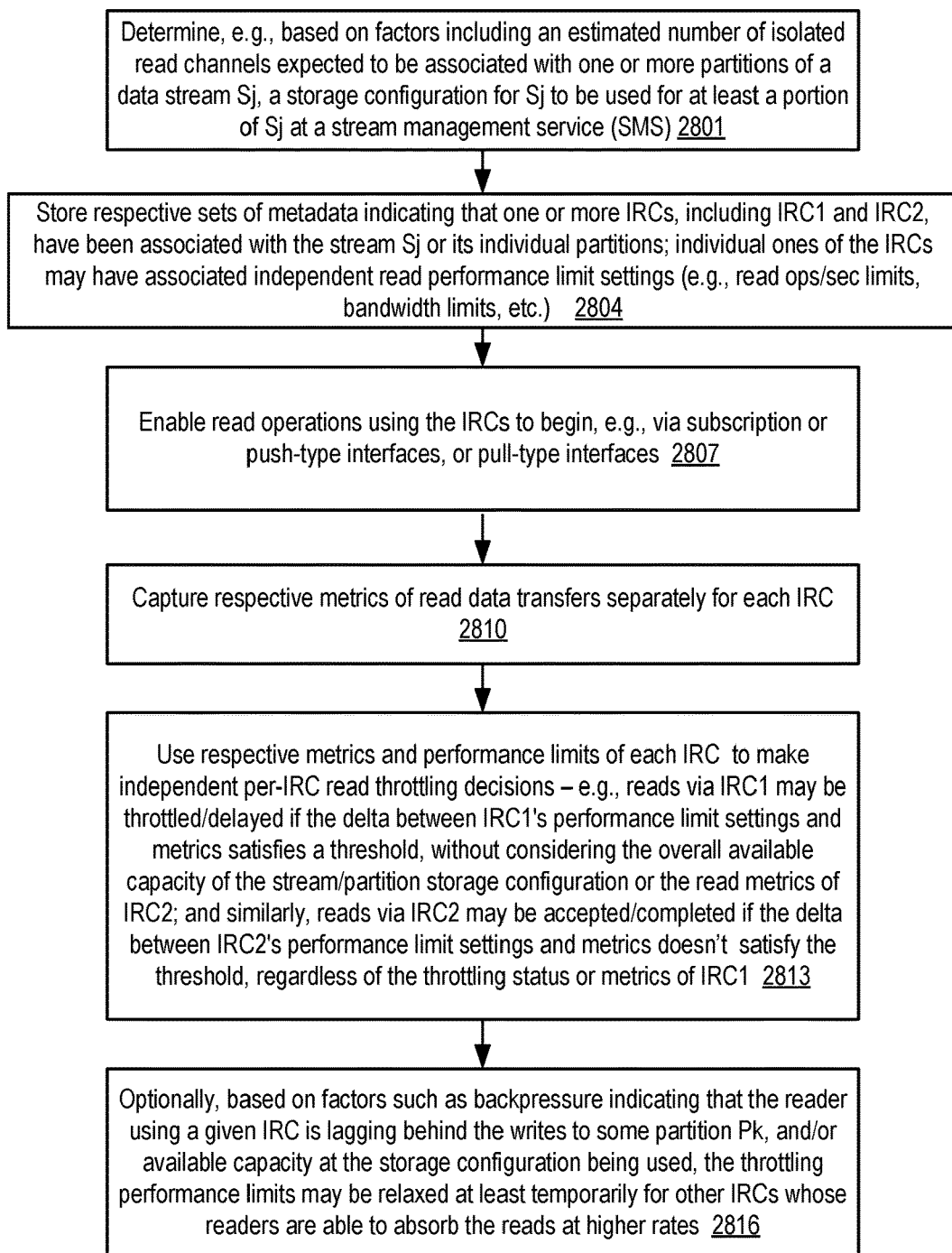
FIG. 28 is a flow diagram illustrating aspects of operations that may be performed to support isolated read channels at a stream management service, according to at least some embodiments.

FIG. 28 is a flow diagram illustrating aspects of operations that may be performed to support isolated read channels at a stream management service, according to at least some embodiments. As shown in element 2801, a determination may be made, e.g., based on factors including an estimated number of isolated read channels (IRCs) expected to be associated with one or more partitions of a data stream Sj, a storage configuration to be used for the stream Sj or its individual partitions at a stream management service (SMS) in the depicted embodiment. In at least some embodiments, in addition to initially provisioning enough resources at the storage and/or retrieval subsystems to be able to handle the read workload associated with a selected number of IRCs, a proactive approach towards potential future configuration of additional IRCs may be taken. In one such approach, after some number of IRCs have been set up (e.g., after each new IRC is registered, or after every K new IRCs are registered), background or asynchronous re-configuration operations that would enable the workload of at least J additional IRCs to be handled at desired performance levels may be initiated.

Respective sets of metadata indicating that one or more IRCs, including for example IRC1 and IRC2, have been associated with one or more partitions Pk of Sj, or with the stream Sj as a whole may be stored at the SMS in various embodiments, e.g., in response to respective IRC registration requests (element 2804). Individual ones of the IRCs may have associated independent read performance limit settings (e.g., read ops/sec limits, bandwidth limits, etc.) which may be stored as part of the metadata in at least some embodiments. After the metadata has been stored, read operations using the IRCs (e.g., in response to programmatic requests that indicate the specific IRC with which one or more data record read operations are associated) may be begun (element 2807) in various embodiments. In some embodiments, push-mode subscription interfaces may be used to transfer the data, in which the SMS provides data records as they become available (modulo the read performance limits being enforced), without having to be polled by the stream processing applications. In other embodiments, pull-mode interfaces may be employed, in which the stream processing applications repeatedly poll the SMS (i.e., submit additional requests similar to HTTP "Get" requests) to read additional data records. In some embodiments, both types of requests may be supported, and different applications may use pull mode or push mode as desired.

Respective metrics of the read data transfers may be captured, e.g., in an iterative manner, for each registered IRC in at least some embodiments at the SMS (element 2810). The metrics may, for example, indicate the number or rate of megabytes or kilobytes of data that has been provided with respect to a given IRC over some recent time interval, the total number of records that have been transmitted in the recent interval, and so on.

Using respective metrics and performance limit settings of each IRC, read throttling decisions (if throttling is needed) may be made independently for each of the IRCs in the depicted embodiment (element 2813). For example, e.g., reads via IRC1 may be throttled/delayed if the delta between IRC1's performance limit settings and metrics satisfies a threshold, without considering the overall available capacity of the storage configuration of the stream or partition being read, or the read metrics of IRC2. Similarly, reads via IRC2 may be accepted/completed if the delta between IRC2's performance limit settings and metrics doesn't satisfy the threshold, regardless of the throttling status or metrics of IRC1. As a result, the performance requirements and limits of each application that has an IRC configured may be managed separately. Such separation of reads at the per-IRC level may be extended to operations such as logging—as a result, SMS log records for a given application or IRC may be examined separately from those of other applications or IRCs, and metrics may be presented on a per-IRC level to SMS customers if desired.

Although, by default, the SMS may treat the performance limit settings as separate and independent "buckets" for different IRCs and applications, in some embodiments the enforcement of the performance limits may be relaxed under some conditions. For example, based on factors such as (a) backpressure from slow applications that cannot keep up with the rate of writes to their target partitions or streams, suggesting that the read throttling thresholds of one or more IRC read limits are not being reached and/or are unlikely to be reached soon and or (b) the availability of additional read capacity from the back-end storage configurations being used for a particular partition or stream, the throttling criteria for some applications that are able to absorb reads at higher rates may be relaxed at least temporarily in such embodiments (element 2816). In effect, in such a scenario, the unused capacity of one IRC's bucket may be redistributed among one or more other IRCs in some embodiments. In other embodiments, such relaxation of throttling thresholds may not be performed. Note that the granularity (stream level vs, partition level) at which IRCs may be configured and managed may differ in different embodiments—e.g., in some embodiments, IRCs may be registered with a specified stream initially, and later associated with a given partition of the stream. In other embodiments, IRC operations may all be performed at the partition level or at the stream level.

Figure 29:
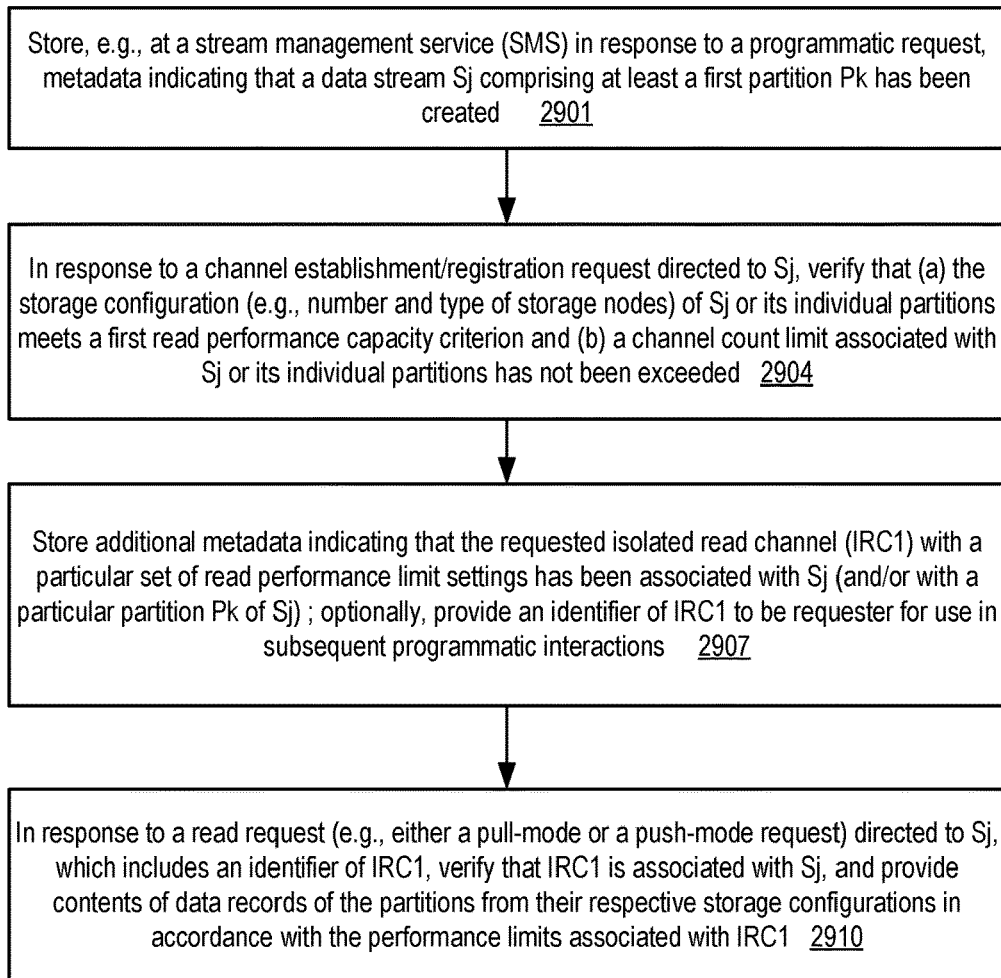
FIG. 29 is a flow diagram illustrating aspects of operations that may be performed to support programmatic registration of partition-level isolated read channels at a stream management service, according to at least some embodiments.

FIG. 29 is a flow diagram illustrating aspects of operations that may be performed to support programmatic registration of partition-level isolated read channels at a stream management service, according to at least some embodiments. As shown in element 2901, metadata indicating that a data stream Sj comprising at least a first partition Pk has been created may be stored, e.g., at a stream management service (SMS) in response to a programmatic request.

In response to a channel establishment request (e.g., similar to a registerIRC request of the kind discussed earlier), one or more types of verification operations may be performed in some embodiments (element 2904). For example, in the depicted embodiment, (a) the storage configuration (e.g., number and type of storage nodes) of at least a portion (e.g., one or more partitions) of the stream may be verified to ensure that it meets a first read performance capacity criterion and (b) an operation to verify that an IRC count limit associated with the stream (or with individual partitions of the stream) would not be exceeded by the establishment of another channel may be performed. Other checks, such as verifying authorization credentials of the requester, may also or instead be performed in at least some embodiments. In some embodiments, instead of specifying the target partition Pk at the time that the channel is registered, a client may simply indicate the identifier of a stream comprising Pk and/or other partitions at the time of registration, and associate the created channel with a particular partition later (e.g., using another programmatic request).

As shown in element 2907, additional metadata may be stored indicating that the requested IRC (IRC1) has been associated with Sj (and/or with a specific partition Pk of Sj) in the depicted embodiment, e.g., if the registration request is accepted. In at least some embodiments, the metadata may include an indication of read performance limits to be enforced for IRC1. In various embodiments, an identifier of the newly-registered IRC may be provided to the registration requester, which may be used in subsequent programmatic interactions or requests.

In response to a read request (e.g., either a pull-mode or a push-mode request) directed to Sj (e.g., to partition Pk), which includes an identifier of IRC1, the SMS may verify that IRC1 is associated with Sj, and provide contents of data records of the targeted partition(s) from their respective storage configurations (element 2910) in accordance with the performance limits associated with IRC1 in the depicted embodiment.

Figure 30:
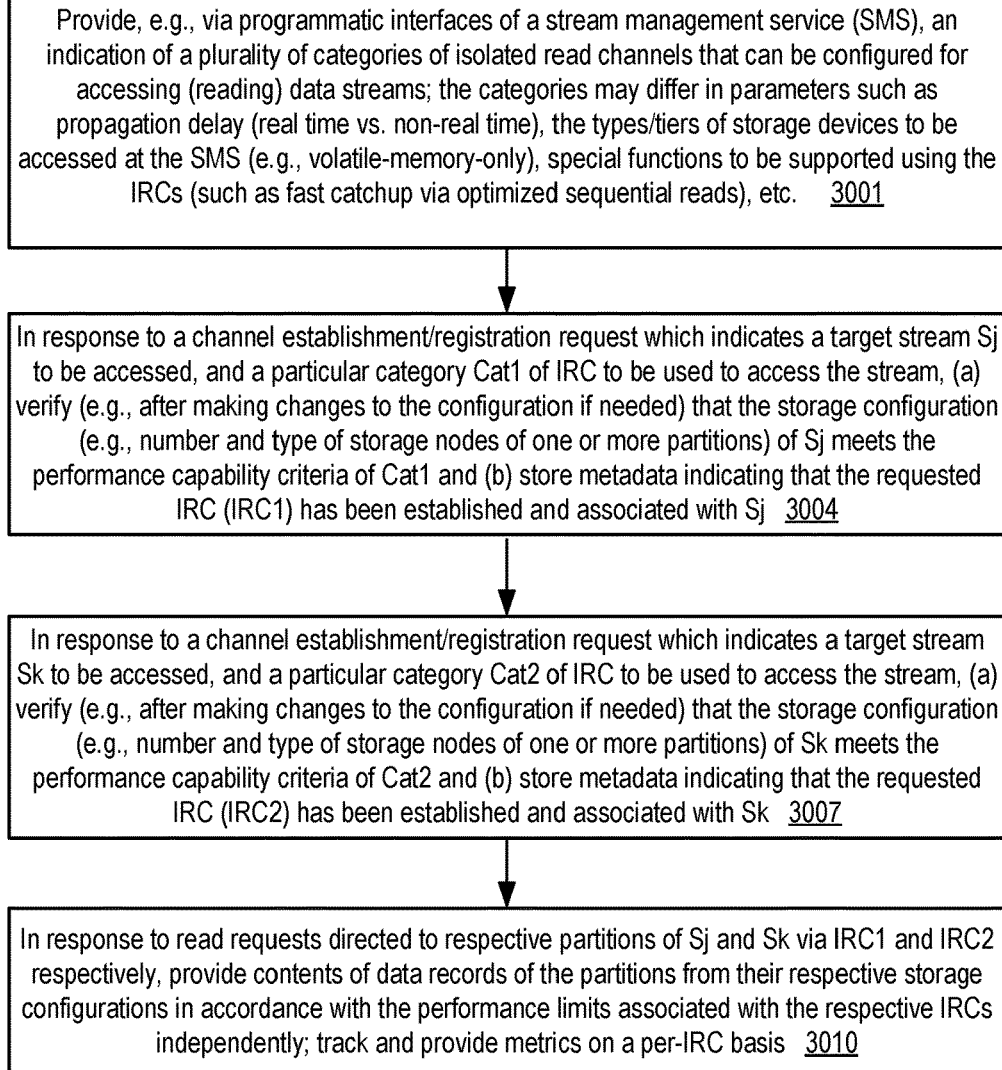
FIG. 30 is a flow diagram illustrating aspects of operations that may be performed to support multiple categories of isolated read channels at a stream management service, according to at least some embodiments.

FIG. 30 is a flow diagram illustrating aspects of operations that may be performed to support multiple categories of isolated read channels at a stream management service, according to at least some embodiments. As shown in element 3001, an indication of a plurality of categories of isolated read channels (IRCs) that can be configured for accessing (reading) data streams may be provided, e.g., via programmatic interfaces of a stream management service (SMS) in some embodiments. The categories may differ in parameters/properties such as propagation delay (real time vs. non-real time), the types/tiers of storage devices to be used at the SMS to read the data stream records (e.g., volatile-memory-only), special functions to be supported using the IRCs (such as fast catchup via optimized sequential reads), etc. in different embodiments. In some embodiments, as mentioned earlier, the categories may differ from one another in the type of tenancy mode (e.g., multi-tenant mode vs. single-tenant mode) or the level of virtualization (e.g., virtual machines of a particular type from a family of supported types of virtual machines supported at a virtualized computing service, versus physical machines). In one embodiment, a client of the SMS may request the creation of a customized IRC category with a client's specified combination of desired properties.

In response to a channel establishment/registration request which indicates a target stream Sj to be accessed, and a particular category Cat1 of IRCs to be used to access the stream, the SMS may (a) verify (e.g., after making/initiating changes to the configuration if needed) that the storage configuration (e.g., number and type of storage nodes of one or more partitions) of Sj meets the performance capability criteria of Cat1 and (b) store metadata indicating that the requested IRC (IRC1) has been established and associated with Sj (element 3004). In at least one embodiment, an indication of the category (or categories) of IRC a client wishes to use may be provided to the SMS in advance of registering/establishing specific IRCs, e.g., at the time the stream is created, so that the SMS has more time to set up a storage configuration that can satisfy the IRC requirements. In some embodiments, it may take some time for the SMS to set up the appropriate configuration, so the response to a registration request may be asynchronous or delayed respective to the registration request.

In response to another channel establishment/registration request which indicates a target stream Sk to be accessed, and a particular category Cat2 of IRC to be used to access the stream, the SMS may similarly (a) verify (e.g., after making/initiating changes to the configuration if needed) that the storage configuration (e.g., number and type of storage nodes of one or more partitions) of Sk meets the performance capability criteria of Cat2 and (b) store metadata indicating that the requested IRC (IRC2) has been established and associated with Sk (element 3007). In some embodiments, Sk and Sj may be the same stream—that is, IRCs of two different categories may be created and associated with a given stream.

After the IRCs IRC1 and IRC2 have been established and associated with their targeted streams, the SMS clients on whose behalf the IRCs have been set up may begin reading data records from partitions of the targeted streams via the IRCs (e.g., by including an identifier of the IRC in a read request or API call). Push-mode reads (e.g., in response to subscription requests) and/or pull-mode or polling reads may be used in various embodiment. In response to read requests directed to respective partitions of Sj and Sk via IRC1 and IRC2 respectively, the SMS may provide contents of data records of the partitions from their respective storage configurations (element 3010) in accordance with the performance limits associated with the respective IRCs independently—for example, read throttling decisions, if throttling is needed, may be for IRC1 and IRC2 without taking other IRCs into account. The SMS may track and provide metrics on a per-IRC basis in various embodiments.

Figure 31:
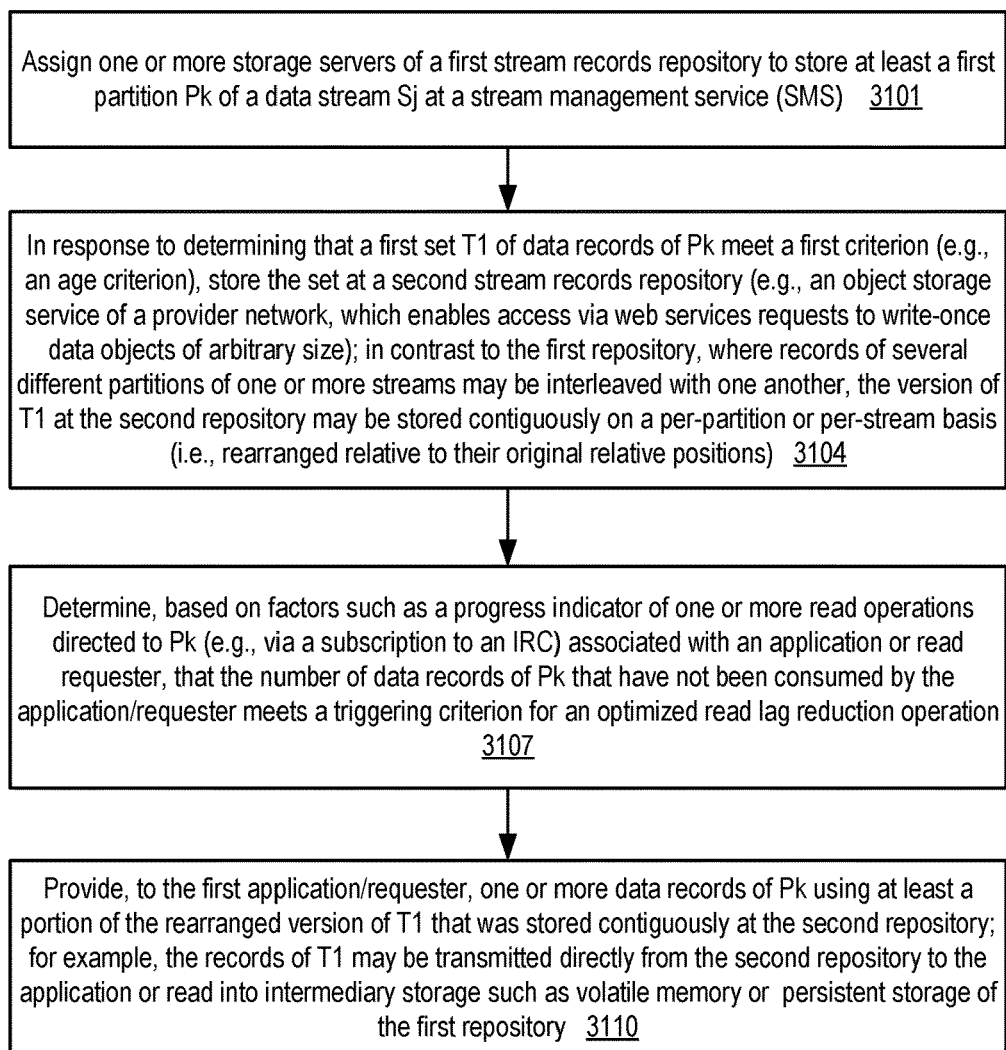
FIG. 31 is a flow diagram illustrating aspects of operations that may be performed to enable lagging readers to catch up with incoming stream data at a stream management service, according to at least some embodiments.

FIG. 31 is a flow diagram illustrating aspects of operations that may be performed to enable lagging readers to catch up with incoming stream data at a stream management service, according to at least some embodiments. As shown in element 3101, a storage configuration comprising one or more storage servers of a first stream records repository may be identified or assigned to store at least a first partition Pk of a data stream Sj at a stream management service (SMS) in the depicted embodiment.

In response to determining that a first set T1 of data records of Pk meet a first criterion (e.g., an age criterion), as indicated in element 3104, the SMS may store at least some data records of the set T1 at a second stream records repository (e.g., an object storage service of a provider network, which enables access via web services requests to write-once data objects of arbitrary size). In some embodiments, the data records of T1 may be copied from the first repository to the second repository, leaving the original records in the first repository at least temporarily; in other embodiments, the T1 data records may be removed from the first repository after they have been stored in the second repository. In contrast to the first repository, where records of several different partitions of one or more streams may be interleaved with one another, in at least some embodiments the version of T1 at the second repository may be stored contiguously on a per-partition or per-stream basis (i.e., rearranged relative to their original relative positions in the first repository).

In some embodiments, a component of the SMS (e.g., at a retrieval subsystem node) may determine that the number of data records of Pk that have not yet been consumed by an application or read requester meets a triggering criterion for an optimized read lag reduction operation (element 3107). A number of approaches may be used to determine whether such a lag exists and whether such an optimization is to be initiated in different embodiments. For example, in one embodiment, the determination that the application is lagging behind may be based at least in part on examining properties such as a progress indicator of one or more read operations or subscriptions directed to Pk from the first application or read requester, and the optimization may be initiated automatically if the application is lagging behind. In other embodiments, the application may transmit a signal that it is lagging behind (e.g., based on an examination of the timestamps of data records that have been read, relative to the current time), and/or request such an optimization via a programmatic request. In one embodiment, the SMS may transmit a message to the application indicating that the application is lagging behind, and recommend that an optimization operation be initiated. In response to such a recommendation, a request or approval for the optimization may be provided by the application in such an embodiment. The application that is lagging behind may be using subscription or push-mode reads in some embodiments, and polling or pull-mode reads in other embodiments; the decision to initiate the optimization may be made independently of the type/mode of read operations being performed in various embodiments.

As part of the optimization, the SMS may provide or transmit one or more data records of Pk to the application using at least a portion of the rearranged version of T1 that was stored contiguously at the second repository (element 3110). Any of a number of different mechanisms may be used to provide the data records using the rearranged version in different embodiments—for example, the records of T1 may be transmitted directly from the secondary repository to the application, or read into intermediary storage such as volatile memory or the first repository's persistent storage. In some embodiments in which a persistent network connection was being used by the first application to read the records of the partition, that same connection may be used for the rearranged data records; in other embodiments, a different connection may be used. In at least some embodiments, an isolated read channel (IRC) that is intended to be used for fast catch-up operations may be configured and used for the optimization operation.

Figure 32:
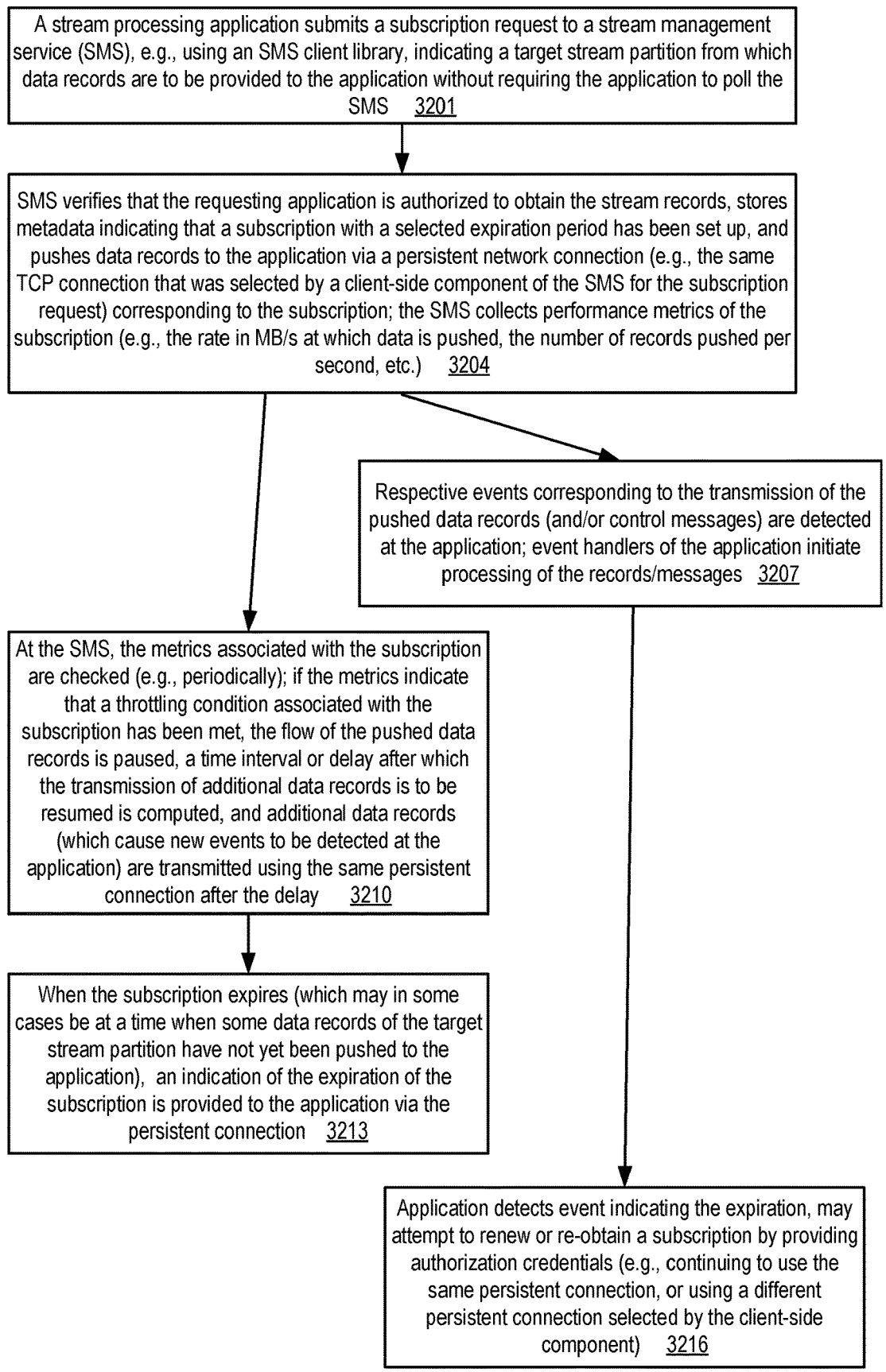
FIG. 32 is a flow diagram illustrating aspects of operations that may be performed to implement push mode subscriptions to data stream partitions using persistent network connections, according to at least some embodiments.

FIG. 32 is a flow diagram illustrating aspects of operations that may be performed to implement push mode subscriptions to data stream partitions using persistent network connections, according to at least some embodiments. As shown in element 3201, a stream processing application may submit a subscription request to a stream management service (SMS), e.g., using an SMS client library, indicating a target stream partition from which data records are to be provided to the application without requiring the application to poll the SMS in the depicted embodiment.

The SMS may perform one or more verification operations before accepting the subscription request in various embodiments. For example, as shown in element 3204, the SMS in some embodiments the SMS may verify that the requesting application is authorized to obtain the stream record before storing metadata indicating that a subscription with a selected expiration period has been set up. In other embodiments, a number of other workload management-related criteria may be checked before accepting the subscription request, such as checking that the rate at which subscription requests have been submitted over some recent time interval does not exceed a threshold, that the total number of subscriptions directed to the target partition or stream does not exceed a threshold, that at least a minimum time interval has elapsed since a previous subscription request (directed to the same partition/stream, the same IRC, or from the same client) was received, and so on. If the subscription request is accepted, the SMS may push data records to the application via a persistent network connection (e.g., the same TCP connection that was selected/established by a client-side component of the SMS for sending the subscription request) corresponding to the subscription in various embodiments. The SMS may collect performance metrics of the subscription (e.g., the rate in MB/s at which data is pushed, the number of records pushed per second, etc.) in at least some embodiments.

Respective events corresponding to the transmission of the pushed data records via the persistent network connection (and/or control messages that may be sent by the SMS via the connection) may be detected at the application (element 3207) in the depicted embodiment. Event handlers associated with the application may initiate processing of the records/messages indicated by the events in various embodiments. In some embodiments, events may be triggered by individual records, while in other embodiments a given event may correspond to the transmission of multiple records. In various embodiments, one or more callback functions of the application may be invoked in response to the receipt of an event or message.

At the SMS, as indicated in element 3210, the metrics associated with the subscription may be checked (e.g., periodically). If the metrics indicate that a throttling condition associated with the subscription has been met, in at least some embodiments the flow of the pushed data records may be paused. A time interval or delay after which the transmission of additional data records is to be resumed may be computed, and additional data records (which cause corresponding new events to be detected at the application) may be transmitted using the same persistent connection after the delay in some embodiments. In other embodiments, a different persistent network connection may be used after the delay. In some cases, throttling conditions may not be met, so delays may not need to be introduced between the transmissions.

When the subscription expires (which may in some cases be at a time when some data records of the target stream partition have not yet been pushed to the application), an indication of the expiration of the subscription may be provided to the application via the persistent connection in various embodiments (element 3213). The expiration message may include an indication of one or more available data records that have not yet been transmitted or read in some embodiments (e.g., a timestamp or a sequence number of such a record may be included in the message, or an indication of how far the application is lagging behind writes to the target partition may be provided).

The application may detect the event corresponding to the expiration (element 3217). If there are unread data records that the application is expected to process, the application may attempt to renew the subscription (or obtain a new subscription), e.g., by providing the appropriate authorization credentials to the SMS in some embodiments. The same persistent connection may be used for the renewal or new subscription request in some embodiments as was used for the previous subscription. In other embodiments, a different connection, which may be selected by the client-side SMS component, may be used. In some embodiments, the application rather than the SMS client-side component may decide which connections are to be used for subscription messages and/or the associated read data transfers.

Figure 33:
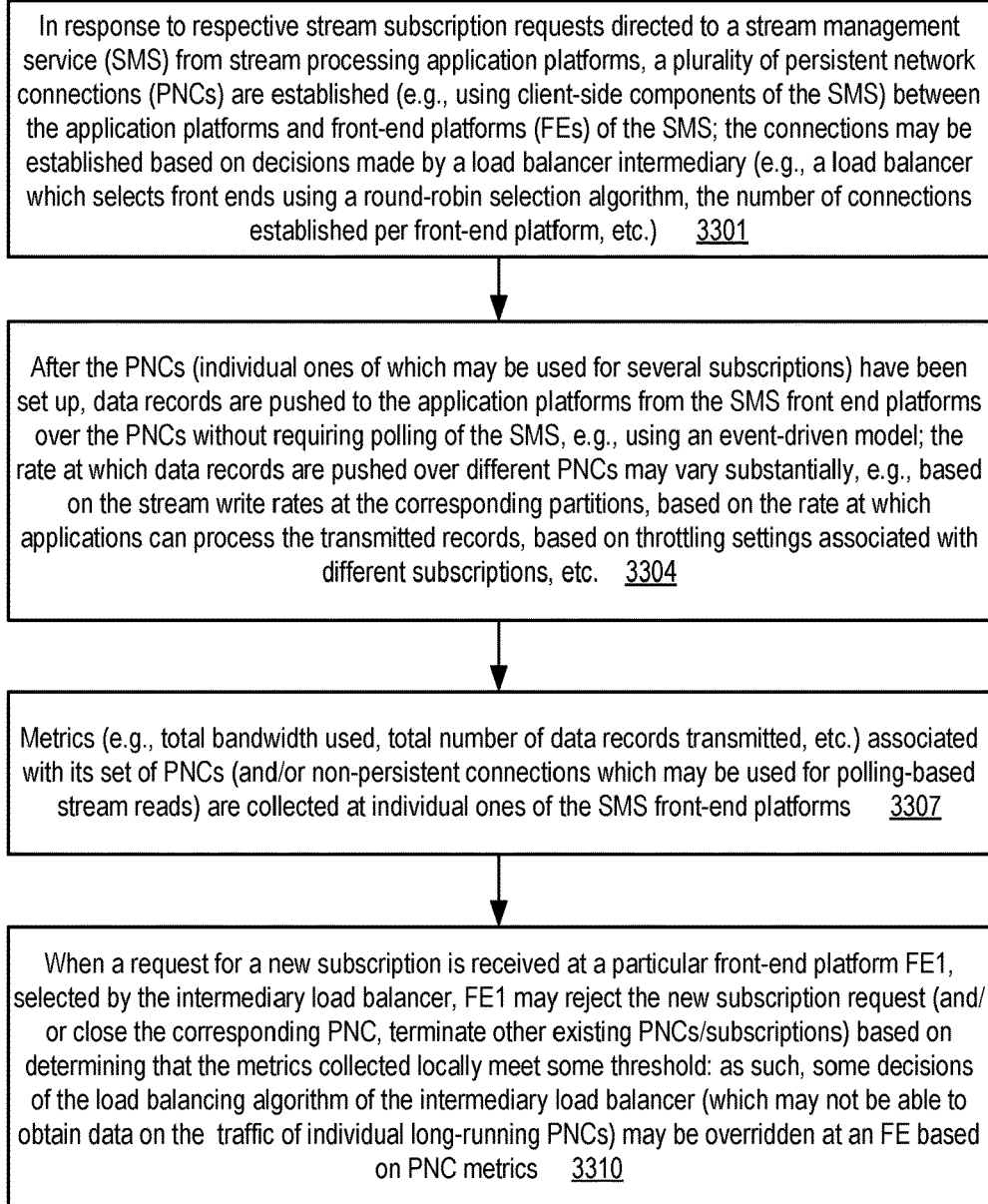
FIG. 33 is a flow diagram illustrating aspects of operations that may be performed to implement workload management at a streams management service which uses persistent network connections to transfer data records to stream processing applications, according to at least some embodiments.

FIG. 33 is a flow diagram illustrating aspects of operations that may be performed to implement workload management at a streams management service which uses persistent network connections to transfer data records to stream processing applications, according to at least some embodiments. As shown in element 3301, in response to respective stream subscription requests directed to a stream management service (SMS) from stream processing application platforms, a plurality of persistent network connections (PNCs) may be established (e.g., using client-side components of the SMS) between the application platforms and front-end platforms (FEs) of the SMS. In at least some embodiments, the connections may be established based at least in part on decisions made by a load balancer intermediary (e.g., a load balancer which selects front end platforms using a round-robin selection algorithm, the number of connections established per front-end platform, etc.).

After the PNCs (individual ones of which may be used in a multiplexed mode for several subscriptions in some cases) have been set up, as indicated in element 3304, data records may be pushed to the application platforms from the SMS front end platforms over the PNCs without requiring polling of the SMS in various embodiments, e.g., using an event-driven model. In such a model, instead of requiring an application running on the application platform to repeatedly poll the SMS for additional data records, the application may detect (e.g., with the help of the SMS client library) respective events indicating the transmission or receipt of one or more data records in some embodiments. The rate at which data records are pushed over different PNCs may vary substantially in at least some embodiments, e.g., based on the stream write rates at the corresponding partitions, based on the rate at which applications can process the transmitted records, based on respective read throttling settings associated with different subscriptions, etc.

A number of metrics, (e.g., total bandwidth used, total number of data records transmitted, etc.) associated with its set of PNCs (and/or non-persistent connections which may be used for polling-based stream reads) may be collected at individual ones of the SMS front-end platforms in various embodiments (element 3307). When a request for a new subscription is received at a particular front-end platform FE1, (where FE1 may have been selected by the intermediary load balancer using its load balancing algorithm), FE1 may reject the new subscription request (and/or close the corresponding PNC, close one or more other PNCs, close one or more existing subscriptions, etc.) based on determining that the metrics collected locally meet some threshold (element 3310). As such, some decisions of the load balancing algorithm of the intermediary load balancer (which may not be able to obtain data on the traffic of individual long-running PNCs) may in effect be overridden at an FE based on PNC metrics collected at or on behalf of the FE.

It is noted that in some embodiments, some of the operations shown in FIG. 27-FIG. 33 may be implemented in a different order than that shown in the corresponding figure, or may be performed in parallel rather than sequentially. Additionally, some of the operations shown in FIG. 27-FIG. 33 may not be required in one or more implementations.

Use Cases

The techniques described above, of establishing scalable partitioning-based, dynamically configurable managed multi-tenant services for collection, storage, and retrieval of stream data records, e.g., using isolated read channels for respective applications, persistent network connections and a subscription-based data transfer methodology, may be useful in a number of scenarios. For example, large provider networks may comprise thousands of virtualization hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate bills, to determine effective provisioning plans for the data centers of the provider network, to detect network attacks, and the like. The monitoring records may form an input stream to an SMS for scalable ingestion and storage, and subscription-based reads via isolated read channels may be implemented for the applications performing analysis of the collected metrics. Similarly, applications to collect and analyze large numbers of log records from numerous log sources (e.g., application logs from the nodes of a distributed application, or system logs from the hosts or compute instances at a data center) may also be able to utilize SMS features of the kinds described.

In some environments, stream processing applications may implement a real-time ETL (Extract-Transform-Load) processing operation (i.e., an operation that transforms received data records in real time for loading into a destination, instead of doing the transformation offline), or a transformation of data records for insertion into a data warehouse. Using the SMS for loading data into a data warehouse in real time (e.g., with the help of real-time isolated read channels) may avoid the delays that are typically required to clean and curate data from one or more data sources. A number of different types of stream processing applications, with respective differing requirements regarding acceptable latencies between writes and reads, may read from different streams, and subscriptions via isolated read channels may enable the needs of such applications to be satisfied independently of one another. Monitoring and debugging of the stream processing applications, as well as the SMS itself, may be enhanced by using isolated read channels; identifiers of the channels may for example be included in log records and metrics samples, and channel-level application programming interfaces may be used if desired to query the records gathered for various streams. The optimization techniques described for assisting lagging stream applications catch up with stream writes may also help to reduce the resources consumed at the SMS (e.g., storage resources that may have been used to retain older records until the applications are able to catch up using un-optimized read techniques). The use of persistent connections for transferring data from the SMS to processing applications may also reduce resource consumption, e.g., at the computing platforms used for stream processing applications and at the SMS itself.

A number of different big data applications may be built using the SMS. For example, the analysis of trends in various forms of social media interactions may be performed efficiently using an SMS. Audio or video information, collected for example from a fleet of security cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein. Flexible configuration options (e.g., using various categories of isolated read channels) and may help different types of users customize the streaming functionality to suit their specific budgets and data durability/availability requirements.

Illustrative Computer System

Figure 34:
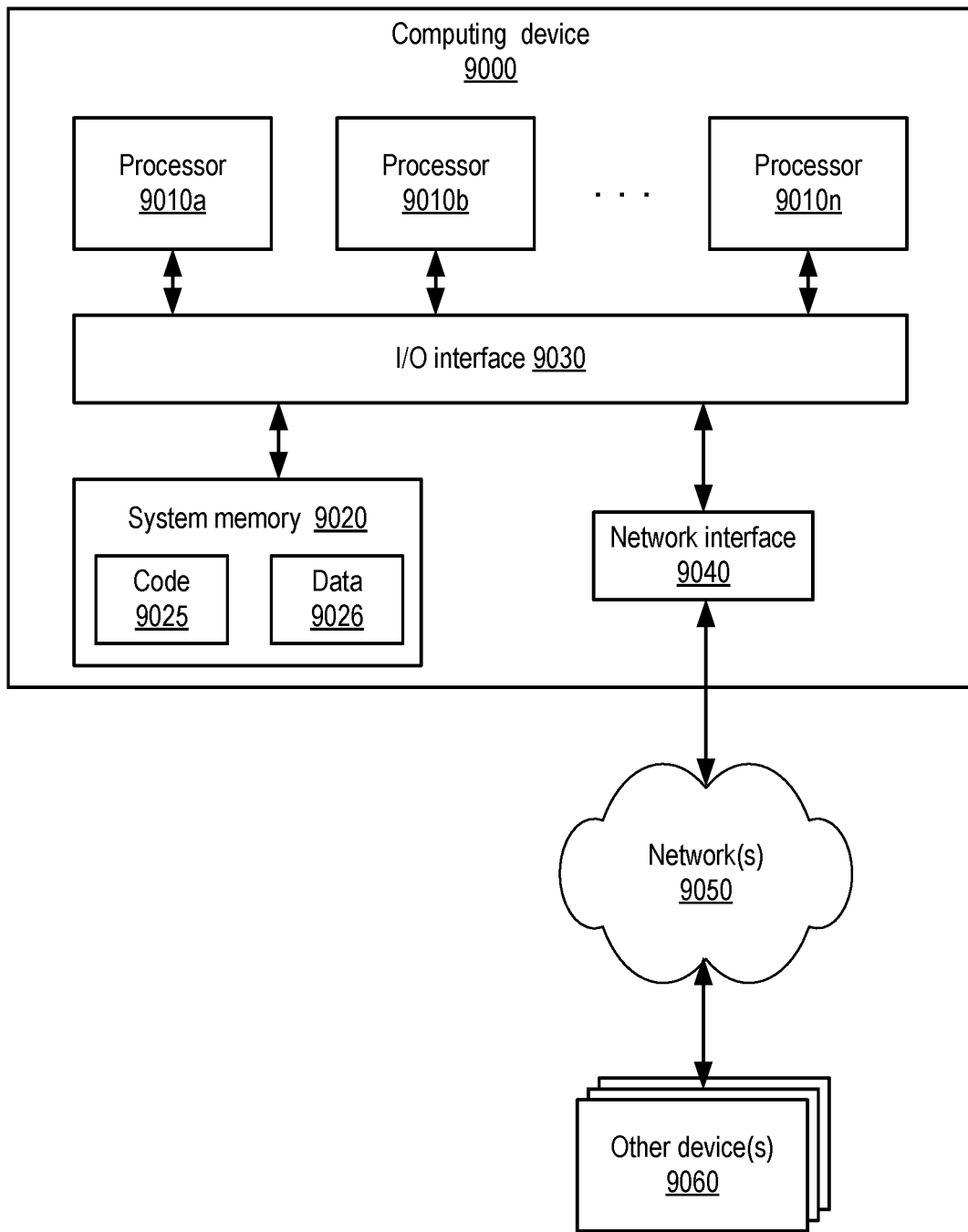
FIG. 34 is a block diagram illustrating an example computing device that may be used in at least some embodiments.

In at least some embodiments a server that implements a portion or all of one or more of the technologies described herein, including the techniques to implement the components of the SMS subsystems (e.g., the ingestion, storage, retrieval and control subsystems), as well as the client-side components of the SMS, may include a general-purpose computer system that includes or is configured to access one or more computer-accessible media. FIG. 34 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 33, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 33 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 34 may be used to implement the described functionality in various embodiments; for example, software components running on a variety of different devices and servers may collaborate to provide the functionality. In at least some embodiments, one or more storage media may be used to store program instructions that when executed on or across one or more processors cause the processors to implement the techniques described above in the context of FIG. 1 through FIG. 33. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices of a data streams management service;
    wherein the one or more computing devices include instructions that upon execution on a processor cause the one or more computing devices to:
        provide, via a programmatic interface, an indication of a plurality of categories of isolated read channels configurable for one or more data streams, including at least a first real-time category and a first non-real-time category;
        in response to a first channel establishment request received via a programmatic interface, wherein the first channel establishment request indicates (a) at least a first target data stream and (b) the first real time category, perform one or more operations to
            verify that a first storage configuration of the first target data stream meets a first performance capability criterion corresponding to the first real-time category; and
            store metadata indicating that a first isolated read channel of the first real-time category has been established and associated with the first target data stream;
        in response to a second channel establishment request received via the programmatic interface, wherein the second channel establishment request indicates (a) at least a second target data stream and (b) the first non-real time category, perform one or more operations to:
            verify that a second storage configuration of the second target data stream meets a second performance capability criterion corresponding to the first non-real-time category; and
            store metadata indicating that a second isolated read channel of the first non-real-time category has been established and associated with the second target data stream;
        in response to a first read request directed to the first target data stream using the first isolated read channel, provide contents of a data record of the first target data stream using at least a portion of the first storage configuration; and
        in response to a second read request directed to the second target data stream using the second isolated read channel, provide contents of a data record of the second target data stream using at least a portion of the second storage configuration.

2. The system as recited in claim 1, wherein the instructions upon execution on the processor cause the one or more computing devices to:
    in response to a third channel establishment request, wherein the third channel establishment request indicates a particular category of isolated read channels optimized to enable lagging readers to catch up with writes of a data stream, store metadata indicating that a third isolated read channel of the particular category has been established; and in response to a third read request indicating the third isolated read channel, provide contents of a plurality of data records from a particular set of storage devices in which the plurality of data records is stored contiguously.

3. The system as recited in claim 1, wherein the instructions upon execution on the processor cause the one or more computing devices to:
in response to a third channel establishment request, wherein the third channel establishment request indicates (a) at least the first target data stream and (b) at least the first non-real-time category of isolated read channels, storing metadata indicating that a third isolated read channel of the first non-real-time category has been established and associated with the first target data stream; and
in response to a third read request directed to the first target data stream using the third isolated read channel, providing contents of a data record of the first target data stream.

4. The system as recited in claim 1, wherein the instructions upon execution on the processor cause the one or more computing devices to:
provide, via a programmatic interface, an indication of a first storage device type associated with a particular category of isolated read channels; and
in response to a read request indicating an isolated read channel of the particular category, obtaining contents of one or more data records from a storage device of the first storage device type.

5. The system as recited in claim 1, wherein the instructions upon execution on the processor cause the one or more computing devices to:
obtain an indication, via a programmatic interface, of one or more targeted properties of isolated read channels, including at least a first performance-related property;
identify, based at least in part on the one or more targeted properties, a particular isolated read channel category from among a plurality of supported isolated read channel categories of a stream management service; and
provide an indication of the particular isolated read channel category via a programmatic interface.

6. A method, comprising:
performing, by one or more computing devices:
in response to a first programmatic channel establishment request, wherein the first programmatic channel establishment request indicates (a) at least a first target data stream and (b) at least a first real-time category of isolated read channels, storing metadata indicating that a first isolated read channel of the first real-time category has been established and associated with the first target data stream;
in response to a second programmatic channel establishment request, wherein the second programmatic channel establishment request indicates (a) at least a second target data stream and (b) at least a first non-real-time category of isolated read channels, storing metadata indicating that a second isolated read channel of the first non-real-time category has been established and associated with the second target data stream;
in response to a first read request directed to the first target data stream using the first isolated read channel, providing, from a first storage configuration, contents of a data record of the first target data stream; and in response to a second read request directed to the second target data stream using the second isolated read channel, providing, from a second storage configuration, contents of a data record of the second target data stream.

7. The method as recited in claim 6, further comprising performing, by the one or more computing devices:
in response to a third programmatic channel establishment request, wherein the third programmatic channel establishment request indicates (a) at least the first target data stream and (b) at least the first non-real-time category of isolated read channels, storing metadata indicating that a third isolated read channel of the first non-real-time category has been established and associated with the first target data stream; and
in response to a third read request directed to the first target data stream using the third isolated read channel, providing contents of a data record of the first target data stream.

8. The method as recited in claim 6, further comprising performing, by the one or more computing devices:
providing, via a programmatic interface, an indication of a first storage device type associated with a particular category of isolated read channels; and
in response to a read request indicating an isolated read channel of the particular category, obtaining contents of one or more data records from a storage device of the first storage device type.

9. The method as recited in claim 6, further comprising performing, by the one or more computing devices:
in response to a third programmatic channel establishment request, wherein the third programmatic channel establishment request indicates a particular category of isolated read channels optimized to enable lagging readers to catch up with writes of a data stream, storing metadata indicating that a third isolated read channel of the particular category has been established; and
in response to a third read request using the third isolated read channel, obtaining contents of a plurality of data records from a storage configuration in which the plurality of data records is stored contiguously.

10. The method as recited in claim 6, wherein the plurality of data records is part of a third target data stream, wherein at least some data records of the second data stream are stored non-contiguously in a first storage repository, and wherein the plurality of data records is stored contiguously in a second storage repository.

11. The method as recited in claim 6, further comprising performing, by the one or more computing devices:
obtaining an indication, via a programmatic interface, of one or more properties of a first client-customized category of isolated read channels;
storing an indication of the first client-customized category;
in response to a third programmatic channel establishment request, wherein the third programmatic channel establishment request indicates the first client-customized category of isolated read channels, storing metadata indicating that a third isolated read channel of the first client-customized category has been established; and
in response to a third read request using the third isolated read channel, providing contents of a plurality of data records.

12. The method as recited in claim 6, further comprising performing, by the one or more computing devices:

obtaining an indication, via a programmatic interface, of one or more targeted properties of isolated read channels, including at least a first performance-related property;

identifying, based at least in part on the one or more targeted properties, a particular isolated read channel category from among a plurality of supported isolated read channel categories of a stream management service; and providing an indication of the particular isolated read channel category via a programmatic interface.

13. The method as recited in claim 6, further comprising performing, by the one or more computing devices:

obtaining an indication, via a programmatic interface, of a requested change of a category of an isolated read channel which has been established and associated with the first target data stream; and initiating one or more re-configuration operations in accordance with the requested change of the category.

14. The method as recited in claim 6, further comprising performing, by the one or more computing devices:

providing, via a programmatic interface, (a) a first set of performance metrics associated with the first real-time category of isolated read channels associated with the first target data stream and (b) a second set of performance metrics associated with the first non-real-time category of isolated read channels associated with the first target data stream.

15. The method as recited in claim 6, further comprising performing, by the one or more computing devices:

in response to a third programmatic channel establishment request, wherein the third programmatic channel establishment request indicates a first tenancy-based category of isolated read channels for which resources configured in a particular tenancy mode are to be used, wherein the particular tenancy mode is selected from a set comprising a single-tenant mode and a multi-tenant mode, storing metadata indicating that a third isolated read channel of the first tenancy-based category has been established; and in response to a third read request using the third isolated read channel, obtaining contents of a plurality of data records from a storage configuration corresponding to the particular tenancy mode.

16. One or more non-transitory computer-accessible storage media storing program instructions that when executed on or across one or more processors cause the one or more processors to:

in response to a first programmatic channel establishment request, wherein the first programmatic channel establishment request indicates (a) at least a first target data stream and (b) at least a first real-time category of isolated read channels, store metadata indicating that a first isolated read channel of the first real-time category has been established and associated with the first target data stream;

in response to a second programmatic channel establishment request, wherein the second programmatic channel establishment request indicates (a) at least a second target data stream and (b) at least a first non-real-time category of isolated read channels, store metadata indicating that a second isolated read channel of the first non-real-time category has been established and associated with the second target data stream;

in response to a first read request directed to the first target data stream using the first isolated read channel, provide contents of a data record of the first target data stream; and in response to a second read request directed to the second target data stream using the second isolated read channel, providing contents of a data record of the second target data stream.

17. The one or more non-transitory computer-accessible storage media as recited in claim 16, wherein the instructions when executed on or across the one or more processors cause the one or more processors to:

in response to a third programmatic channel establishment request, wherein the third programmatic channel establishment request indicates a particular category of isolated read channels optimized to enable lagging readers to catch up with writes of a data stream, store metadata indicating that a third isolated read channel of the particular category has been established; and in response to a third read request using the third isolated read channel, obtain contents of a plurality of data records from a storage configuration in which the plurality of data records is stored contiguously.

18. The one or more non-transitory computer-accessible storage media as recited in claim 16, wherein the instructions when executed on or across the one or more processors cause the one or more processors to:

in response to a third programmatic channel establishment request, wherein the third programmatic channel establishment request indicates (a) at least the first target data stream and (b) at least the first non-real-time category of isolated read channels, store metadata indicating that a third isolated read channel of the first non-real-time category has been established and associated with the first target data stream; and in response to a third read request directed to the first target data stream using the third isolated read channel, provide contents of a data record of the first target data stream.

19. The one or more non-transitory computer-accessible storage media as recited in claim 16, wherein the instructions when executed on or across the one or more processors cause the one or more processors to:

provide, via a programmatic interface, an indication of a first storage device type associated with a particular category of isolated read channels; and in response to a read request indicating an isolated read channel of the particular category, obtain contents of one or more data records from a storage device of the first storage device type.

20. The one or more non-transitory computer-accessible storage media as recited in claim 16, wherein the instructions when executed on or across the one or more processors cause the one or more processors to:

obtain an indication, via a programmatic interface, of a requested change of a category of an isolated read channel which has been established and associated with the first target data stream; and initiate one or more re-configuration operations in accordance with the requested change of the category.

* * * * *